US012684051B2

(12) United States Patent
Chang et al.

(10) Patent No.: US 12,684,051 B2
(45) Date of Patent: Jul. 14, 2026

(54) DATA TRANSMISSION METHOD AND ELECTRONIC DEVICE

(71) Applicant: Huawei Technologies Co., Ltd., Shenzhen (CN)

(72) Inventors: Ming Chang, Shanghai (CN); Siqing Du, Nanjing (CN); Peiyu Yue, Nanjing (CN); Maobin Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 539 days.

(21) Appl. No.: 18/323,854

(22) Filed: May 25, 2023

(65) Prior Publication Data

US 2023/0308530 A1 Sep. 28, 2023

Related U.S. Application Data

(63) Continuation of application No. PCT/CN2021/133218, filed on Nov. 25, 2021.

(30) Foreign Application Priority Data

Nov. 26, 2020 (CN) .......................... 202011347808.9

(51) Int. Cl.
*H04L 69/22* (2022.01)
*H04L 69/18* (2022.01)
(Continued)

(52) U.S. Cl.
CPC .............. *H04L 69/22* (2013.01); *H04L 69/18* (2013.01); *H04N 7/035* (2013.01); *H04N 23/45* (2023.01); *H04N 23/60* (2023.01)

(58) Field of Classification Search
CPC ......... H04L 69/18; H04L 69/22; H04N 7/035; H04N 23/45; H04N 23/54; H04N 23/57; H04N 23/60; H04N 23/665; H04N 23/90
See application file for complete search history.

(56) References Cited

U.S. PATENT DOCUMENTS 10,274,758 B1 * 4/2019 Liu ......................... G02F 1/025
2002/0016875 A1 2/2002 Yokoyama
(Continued)

FOREIGN PATENT DOCUMENTS

CN 106921523 A 7/2017
CN 211580072 U 9/2020
(Continued)

*Primary Examiner* — Thomas R Cairns
*Assistant Examiner* — Kai Chang
(74) *Attorney, Agent, or Firm* — Slater Matsil, LLP

(57) ABSTRACT

A data transmission method and an electronic device are provided. One uplink interface and one downlink interface are deployed on each input device of the electronic device. The uplink interface is connected to a processor or an upper-level input device, and the downlink interface is connected to a lower-level input device. A processing module in each input device may process image data collected by the current-level device and data sent by a lower-level input device connected to a downlink interface, and then transmit processed data to the processor or an upper-level input device through an uplink interface. Thus the plurality of input devices are connected in a cascade manner, and only one of the plurality of input devices needs to be connected to the processor.

20 Claims, 32 Drawing Sheets

(51) Int. Cl.
    *H04N 7/035*        (2006.01)
    *H04N 23/45*       (2023.01)
    *H04N 23/60*       (2023.01)

(56)               References Cited

U.S. PATENT DOCUMENTS

| | | | |
|---|---|---|---|
| 2009/0210596 A1 | 8/2009 | Furuya | |
| 2011/0057979 A1* | 3/2011 | Takahashi | B41J 3/54 |
| | | | 347/16 |
| 2012/0287291 A1* | 11/2012 | McMahon | H04N 23/957 |
| | | | 348/207.1 |
| 2013/0135656 A1* | 5/2013 | Fukuda | H04N 1/00278 |
| | | | 358/1.13 |
| 2014/0285681 A1* | 9/2014 | Kanou | H04N 5/77 |
| | | | 348/218.1 |
| 2016/0234404 A1* | 8/2016 | Kishi | G06F 13/4282 |
| 2020/0053417 A1* | 2/2020 | Choi | H04N 21/631 |
| 2020/0077053 A1* | 3/2020 | Steeley | H04N 5/772 |
| 2020/0186841 A1* | 6/2020 | Yoshimochi | H04N 23/665 |
| 2020/0333993 A1* | 10/2020 | Yoshimochi | H04N 23/60 |
| 2023/0017778 A1* | 1/2023 | Sinha | G06N 3/0442 |

FOREIGN PATENT DOCUMENTS

| | | | |
|---|---|---|---|
| JP | H11331823 A | 11/1999 |
| JP | 2009194731 A | 8/2009 |
| JP | 2012205107 A | 10/2012 |
| JP | 2016529844 A | 9/2016 |

* cited by examiner

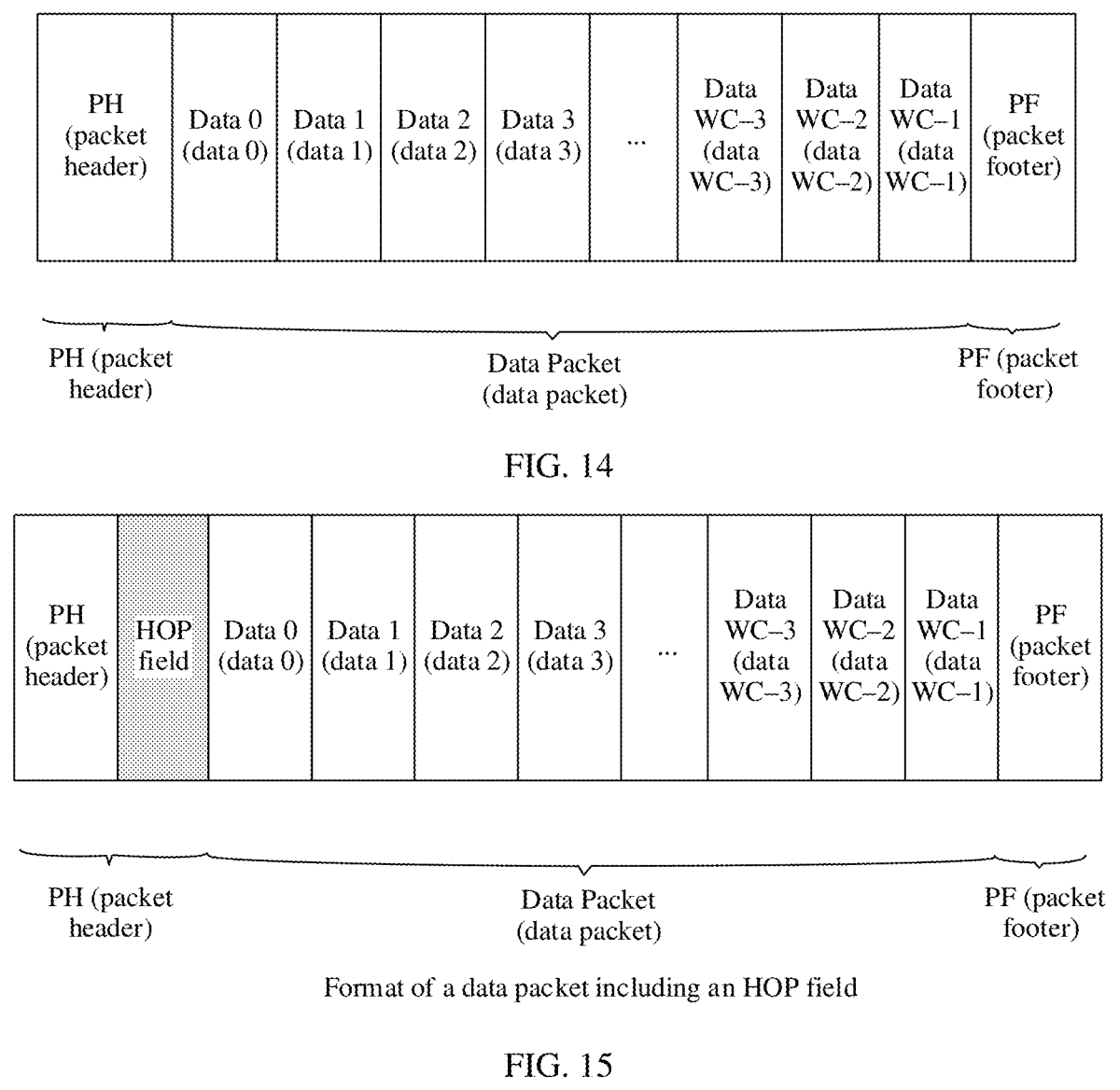

| PH (packet header) | Data 0 (data 0) | Data 1 (data 1) | Data 2 (data 2) | Data 3 (data 3) | ... | Data WC-3 (data WC-3) | Data WC-2 (data WC-2) | Data WC-1 (data WC-1) | PF (packet footer) |
|---|---|---|---|---|---|---|---|---|---|

PH (packet header)       Data Packet (data packet)       PF (packet footer)

FIG. 14

| PH (packet header) | HOP field | Data 0 (data 0) | Data 1 (data 1) | Data 2 (data 2) | Data 3 (data 3) | ... | Data WC-3 (data WC-3) | Data WC-2 (data WC-2) | Data WC-1 (data WC-1) | PF (packet footer) |
|---|---|---|---|---|---|---|---|---|---|---|

PH (packet header)       Data Packet (data packet)       PF (packet footer)

Format of a data packet including an HOP field

FIG. 15

DATA TRANSMISSION METHOD AND ELECTRONIC DEVICE

CROSS-REFERENCE TO RELATED APPLICATIONS

This application is a continuation of International Application No. PCT/CN2021/133218, filed on Nov. 25, 2021, which claims priority to Chinese Patent Application No. 202011347808.9, filed on Nov. 26, 2020.

TECHNICAL FIELD

This application relates to the field of electronic technologies, and in particular, to a data transmission method and an electronic device.

BACKGROUND

With a continuous increase in photographing requirements for electronic devices such as smartphones and tablets, cameras of electronic devices continue to develop toward multi-camera, high resolution, and the like.

Currently, in a circuit structure of a camera module, a processor in an electronic device performs data transmission with the camera module through a mobile industry processor interface (MIPI). Generally, one camera module needs to communicate with the processor through four pairs of data differential signal lines. When one front-facing camera module and one rear-facing camera module are separately disposed in an electronic device, eight pairs of data differential signal lines are required for communication with a processor. As photographing precision is improved, quantities of front-facing camera modules and rear-facing camera modules also increase, and a quantity of MIPI differential signal lines on a processor side and a quantity of interfaces on the processor side increase. This is unfavorable to system integration.

SUMMARY

This application provides a data transmission method and an electronic device. In the method, a plurality of input devices are connected in a cascade manner, and only one input device needs to be connected to a processor. Therefore, a quantity of interfaces on a processor side and a quantity of signal lines between the input device and the processor are greatly reduced. In addition, the plurality of input devices are connected in a cascade manner, and an added input device only needs to be connected to existing input devices in a cascade manner, so that subsequent operation of adding an input device is simple.

According to a first aspect, this application provides a data transmission method. The method includes: After receiving a first instruction sent by a processor, a first camera module receives a first data packet sent by a second camera module, where the first data packet includes an identification field, and a value of the identification field in the first data packet indicates a quantity of forwarding times of the first data packet; the first camera module identifies that the value of the identification field in the first data packet is a first value, and modifies the first value to a second value, where a difference between the second value and the first value is a preset value; and the first camera module sends a first data packet obtained by modifying the value of the identification field in the first data packet to the second value to the processor.

The method may be applied to an electronic device configured with a camera module. One uplink interface and one downlink interface are deployed on each camera module of the electronic device. The uplink interface is connected to a processor or an upper-level camera module, and the downlink interface is connected to a lower-level camera module or is not connected. A processing module in each input device may process image data collected by the current input device and data sent by a lower-level camera module connected to a downlink interface, and then transmit processed data to the processor or an upper-level camera module through an uplink interface. In this way, the plurality of camera modules are connected in a cascade manner, and only one of the plurality of input devices needs to be connected to the processor. Therefore, a quantity of interfaces between the processor and the plurality of camera modules and a quantity of signal pins are reduced, and system integration on the processing side is facilitated. In addition, adding or subtracting camera modules is easy to operate.

In addition to being applied to an electronic device 100 on which a camera module is disposed, the method may also be applied to a device such as a sensor, a radar, and the like. This is not limited herein in this application.

With reference to the first aspect, in a possible implementation of the first aspect, the first camera module includes a first application layer, a first protocol layer, and a first physical layer, and the first physical layer includes a first uplink interface and a first downlink interface. That a first camera module receives a first data packet sent by a second camera module specifically includes: The first camera module receives, through the first downlink interface, the first data packet sent by the second camera module. That the first camera module modifies the value of the identification field in the first data packet from the first value to a second value specifically includes: The first camera module modifies the value of the identification field in the first data packet from the first value to the second value by using the first protocol layer. That the first camera module sends a first data packet obtained by modifying the value of the identification field in the first data packet to the second value to the processor specifically includes: The first camera module sends the first data packet obtained by modifying the value of the identification field in the first data packet to the second value to the processor through the first uplink interface. In this way, the first camera module is connected to the second camera module through the first downlink interface, and the first uplink interface of the first camera module is connected to the processor, so that the plurality of camera modules are connected to the processor in a cascade manner, a quantity of signal pins on the processor side is reduced, and system integration on the processor side is facilitated. In addition, when the second camera module collects data and the first camera module does not need to collect data, the first application layer of the first camera module is not enabled, and the first physical layer and the first protocol layer of the first camera module are enabled, so that consumption of the first camera module can be reduced.

With reference to the first aspect, in a possible implementation of the first aspect, the first camera module collects first data, and generates a second data packet based on the first data, where the second data packet includes an identification field, and a value of the identification field in the second data packet is a third value; and the first camera module sends the second data packet to the processor. In this way, the second camera module and the first camera module can collect data simultaneously. The processor identifies, based on the value of the identification field in the data packet, which camera module collects the data packet.

With reference to the first aspect, in a possible implementation of the first aspect, the first camera module includes a first application layer, a first protocol layer, and a first physical layer, and the first physical layer includes a first uplink interface and a first downlink interface. After that the first camera module collects first data, and before that the first camera generates a second data packet based on the first data, the method further includes: The first camera module encodes the first data by using the first application layer. That the first camera module generates a second data packet based on the first data specifically includes: The first camera module generates the second data packet based on encoded first data by using the first protocol layer. That the first camera module sends the second data packet to the processor specifically includes: The first camera module sends the second data packet to the processor through the first uplink interface. In this way, when the first camera module collects data, the first application layer, the first physical layer, and the first protocol layer of the first camera module are all enabled.

With reference to the first aspect, in a possible implementation of the first aspect, the first data packet includes a packet header, a data packet, and a packet footer; and the identification field in the first data packet is located in the packet header of the first data packet. The processor may identify a value of an identification field in a packet header, and identify, based on the value of the identification field, that the data packet is from the first camera module.

Similarly, the second data packet includes a packet header, a data packet, and a packet footer; and the identification field in the second data packet is located in the packet header of the second data packet. The processor may identify a value of an identification field in a packet header, and identify, based on the value of the identification field, that the data packet is from the second camera module.

With reference to the first aspect, in a possible implementation of the first aspect, that the first camera module receives a first instruction sent by the processor specifically includes: The first camera module receives, through a first control interface, the first instruction sent by the processor. In this way, after the first camera module receives the first instruction sent by the processor through the first control interface, the first camera module enables the first physical layer and the first protocol layer, and receives the data packet sent by the second camera module. After the second camera module receives a second instruction sent by the processor through a second control interface, the second camera module enables an application layer of the second camera module, a physical layer of the second camera module, and a protocol layer of the second camera module, and the second camera module starts to collect data and pack the data into a data packet, and send the data packet to the first camera module.

Similarly, each camera module in the electronic device is configured with a control interface, and the control interface is different from the uplink interface and the downlink interface. The control interface is configured to receive a control instruction sent by the processor. The uplink interface and the downlink interface are configured to send and receive data packets.

According to a second aspect, this application provides an electronic device. The electronic device includes a processor, a first camera module, and a second camera module. The first camera module is configured to: after receiving a first instruction sent by the processor, receive a first data packet sent by the second camera module, where the first data packet includes an identification field, and a value of the identification field in the first data packet indicates a quantity of forwarding times of the first data packet. The first camera module is further configured to: identify that the value of the identification field in the first data packet is a first value, and modify the first value to a second value, where a difference between the second value and the first value is a preset value; and send a first data packet obtained by modifying the value of the identification field in the first data packet to the second value to the processor.

The method may be applied to an electronic device configured with a camera module. One uplink interface and one downlink interface are deployed on each camera module of the electronic device. The uplink interface is connected to a processor or an upper-level camera module, and the downlink interface is connected to a lower-level camera module or is not connected. A processing module in each input device may process image data collected by the current input device and data sent by a lower-level input device connected to a downlink interface, and then transmit processed data to the processor or an upper-level input device through an uplink interface. In this way, the plurality of camera modules are connected in a cascade manner, and only one of the plurality of input devices needs to be connected to the processor. Therefore, a quantity of interfaces between the processor and the plurality of camera modules and a quantity of signal pins are reduced, and system integration on the processing side is facilitated. In addition, adding or subtracting an input device is easy to operate.

With reference to the second aspect, in a possible implementation of the second aspect, the first camera module includes a first application layer, a first protocol layer, and a first physical layer, and the first physical layer includes a first uplink interface and a first downlink interface. The first camera module is further configured to: receive, through the first downlink interface, the first data packet sent by the second camera module; modify the value of the identification field in the first data packet from the first value to the second value by using the first protocol layer; and send the first data packet obtained by modifying the value of the identification field in the first data packet to the second value to the processor through the first uplink interface. In this way, the first camera module is connected to the second camera module through the first downlink interface, and the first uplink interface of the first camera module is connected to the processor, so that the plurality of camera modules are connected to the processor in a cascade manner, a quantity of signal pins on the processor side is reduced, and system integration on the processor side is facilitated. In addition, when the second camera module collects data and the first camera module does not need to collect data, the first application layer of the first camera module is not enabled, and the first physical layer and the first protocol layer of the first camera module are enabled, so that consumption of the first camera module can be reduced.

With reference to the second aspect, in a possible implementation of the second aspect, the first camera module is further configured to: collect first data, and generate a second data packet based on the first data, where the second data packet includes an identification field, and a value of the identification field in the second data packet is a third value; and send the second data packet to the processor. In this way, the second camera module and the first camera module can collect data simultaneously. The processor identifies, based on the value of the identification field in the data packet, which camera module collects the data packet.

With reference to the second aspect, in a possible implementation of the second aspect, the first camera module includes a first application layer, a first protocol layer, and a first physical layer, the first physical layer includes a first uplink interface and a first downlink interface, and the first uplink interface is connected to a first receive port of the processor. The first camera module is further configured to: encode the first data by using the first application layer; generate the second data packet based on encoded first data by using the first protocol layer, where the second data packet includes the identification field, and the value of the identification field in the second data packet is the third value; and send the second data packet to the processor through the first uplink interface. In this way, when the first camera module collects data, the first application layer, the first physical layer, and the first protocol layer of the first camera module are all enabled.

With reference to the second aspect, in a possible implementation of the second aspect, the electronic device further includes a third camera module.

The third camera module is configured to: collect second data, and generate a third data packet based on the second data, where the third data packet includes an identification field, and a value of the identification field in the third data packet is a third value. The third camera module is further configured to send the third data packet to the processor. In this way, in one aspect, when there are a plurality of camera modules in the electronic device, a front-facing camera module is separated from a rear-facing camera module, to reduce a burden of the processor receiving, through one interface, data that is collected simultaneously by the plurality of cascaded camera modules. A plurality of cascaded front-facing camera modules are connected to the first receive port of the processor, and a plurality of cascaded rear-facing camera modules are connected to a second receive port of the processor. That is, the plurality of cascaded front-facing camera modules and the plurality of cascaded rear-facing camera modules are connected to the processor in parallel.

With reference to the second aspect, in a possible implementation of the second aspect, the third camera module includes a second application layer, a second protocol layer, and a second physical layer, the second physical layer includes a second uplink interface and a second downlink interface, and the second uplink interface is connected to a second receive port of the processor. The third camera module is further configured to: encode the second data by using the second application layer; generate the third data packet based on encoded second data by using the second protocol layer, where the third data packet includes the identification field, and the value of the identification field in the third data packet is the third value; and send the third data packet to the processor through the second uplink interface. In this way, when the third camera module collects data, the second application layer, the second physical layer, and the second protocol layer of the third camera module are all enabled. In addition, the third data packet is sent to the second receive port of the processor through the second uplink interface, to reduce pressure on the processor to receive a large amount of data on a same port at the same time when there is only one port on the processor side.

With reference to the second aspect, in a possible implementation of the second aspect, the first camera module includes a first application layer, a first protocol layer, and a first physical layer, the first physical layer includes a first uplink interface and a first downlink interface, and the first uplink interface is connected to a first receive port of the processor. The third camera module includes the second application layer, the second protocol layer, and the second physical layer, the second physical layer includes second uplink interface and the second downlink interface, and the second uplink interface is connected to the second receive port of the processor. The first receive port is different from the second receive port.

With reference to the second aspect, in a possible implementation of the second aspect, the electronic device further includes a fourth camera module.

The fourth camera module is configured to: collect third data, and generate a fourth data packet based on the third data, where the fourth data packet includes an identification field, and a value of the identification field in the fourth data packet is the third value. The fourth camera module is further configured to send the fourth data packet to the third camera module. The third camera module is further configured to: receive the fourth data packet sent by the fourth camera module; and identify that the value of the identification field in the first data packet is the third value, and modify the value of the identification field in the fourth data packet to a fourth value, where a difference between the fourth value and the third value is a preset value.

With reference to the second aspect, in a possible implementation of the second aspect, the fourth camera module includes a third application layer, a third protocol layer, and a third physical layer, the third physical layer includes a third uplink interface and a third downlink interface, and the third uplink interface is connected to a second downlink interface. The fourth camera module is further configured to: encode the third data by using the third application layer; generate the fourth data packet based on encoded third data by using the third protocol layer, where the fourth data packet includes the identification field, and the value of the identification field in the fourth data packet is the third value; and send the fourth data packet to the third camera module through the third uplink interface. The third camera module is further configured to: receive, through the second downlink interface, the fourth data packet sent through the third uplink interface; identify, by using the second protocol layer, that the value of the identification field in the fourth data packet is the third value, and modify the third value to the fourth value, where a difference between the third value and the fourth value is a preset value; and send a fourth data packet obtained by modifying the value of the identification field in the fourth data packet to the fourth value to the processor through the second uplink interface. In this way, when a camera module needs to be added subsequently, only the third uplink interface of the fourth camera module needs to be connected to the second downlink interface of the third camera module, and an original circuit structure does not need to be changed, and an operation is simple.

With reference to the second aspect, in a possible implementation of the second aspect, the first data packet includes a packet header, a data packet, and a packet footer; and the identification field in the first data packet is located in the packet header of the first data packet. The processor may identify a value of an identification field in a packet header, and identify, based on the value of the identification field, that the data packet is from the first camera module.

Similarly, the second data packet includes a packet header, a data packet, and a packet footer; and the identification field in the second data packet is located in the packet header of the second data packet. The processor may identify a value of an identification field in a packet header, and identify, based on the value of the identification field, that the data packet is from the second camera module.

Similarly, the third data packet includes a packet header, a data packet, and a packet footer; and the identification field in the third data packet is located in the packet header of the third data packet. The processor may identify a value of an identification field in a packet header, and identify, based on the value of the identification field, that the data packet is from the third camera module.

Similarly, the fourth data packet includes a packet header, a data packet, and a packet footer; and the identification field in the second data packet is located in the packet header of the fourth data packet. The processor may identify a value of an identification field in a packet header, and identify, based on the value of the identification field, that the data packet is from the fourth camera module.

In addition, data packets received by the first receive port of the processor are from the first camera module and the second camera module, and data packets received by the second receive port of the processor are from the third camera module and the fourth camera module. When values of identification fields in data packets are the same, the processor may determine, based on whether a data packet is received by the first receive port or the second receive port, that the data packet is from the first camera module or the third camera module. Alternatively, the processor may determine, based on whether a data packet is received by the first receive port or the second receive port, that the data packet is from the second camera module or the fourth camera module.

With reference to the second aspect, in a possible implementation of the second aspect, the first camera module is further configured to receive, through a first control interface, the first instruction sent by the processor. In this way, after the first camera module receives the first instruction sent by the processor through the first control interface, the first camera module enables the first physical layer and the first protocol layer, and receives the data packet sent by the second camera module. After the second camera module receives a second instruction sent by the processor through a second control interface, the second camera module enables an application layer of the second camera module, a physical layer of the second camera module, and a protocol layer of the second camera module, and the second camera module starts to collect data and pack the data into a data packet, and send the data packet to the first camera module.

Similarly, each camera module in the electronic device is configured with a control interface, and the control interface is different from the uplink interface and the downlink interface. The control interface is configured to receive a control instruction sent by the processor. The uplink interface and the downlink interface are configured to send and receive data packets.

According to a third aspect, this application provides a computer-readable storage medium, including instructions. When the instructions are run on a camera module, the camera module is enabled to perform the data transmission method according to the first aspect or with reference to any one of the implementations of the first aspect.

In the method, a plurality of input devices are connected in a cascade manner, and only one input device needs to be connected to a processor. Therefore, a quantity of interfaces on a processor side and a quantity of signal lines between the input device and the processor are greatly reduced. In addition, the plurality of input devices are connected in a cascade manner, and an added input device only needs to be connected to existing input devices in a cascade manner, so that subsequent operation of adding an input device is simple.

BRIEF DESCRIPTION OF THE DRAWINGS

FIG. 14 is a schematic diagram of a structure of a data packet according to an embodiment of this application;

FIG. 15 is a schematic diagram of a structure of another data packet according to an embodiment of this application;

DETAILED DESCRIPTION OF ILLUSTRATIVE EMBODIMENTS

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes a hardware architecture of an electronic device 100 mentioned in embodiments of this application.

Figure 1:
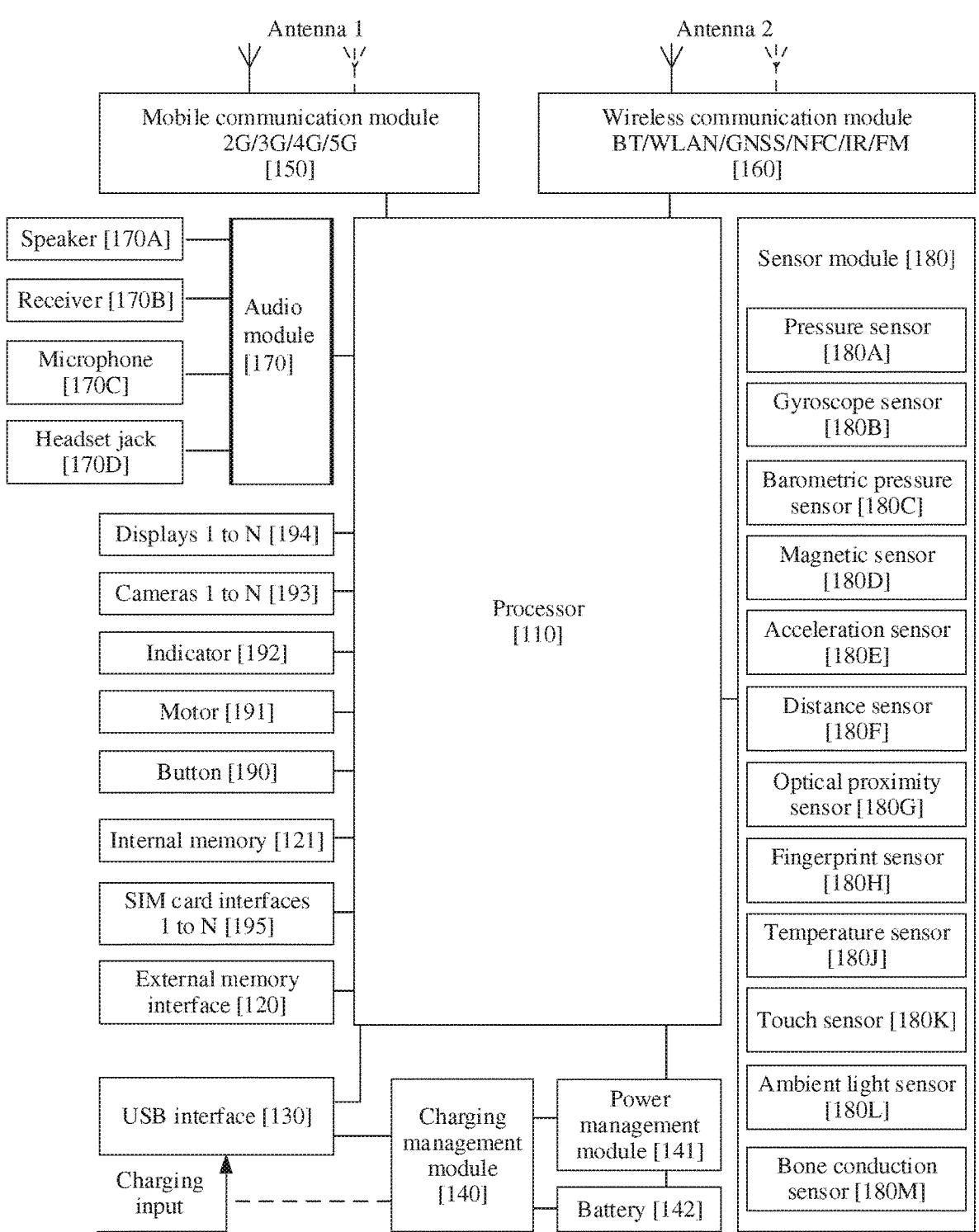
FIG. 1 is a schematic diagram of a structure of an electronic device 100 according to an embodiment of this application.

FIG. 1 is a schematic diagram of a structure of the electronic device 100.

The electronic device 100 is used as an example below to describe embodiments in detail. A device type of the electronic device 100 may include a mobile phone, a television, a tablet computer, a sound box, a watch, a desktop computer, a laptop computer, a handheld computer, a notebook computer, an ultra-mobile personal computer (UMPC), a netbook, a personal digital assistant (PDA), an augmented reality (AR)/virtual reality (VR) device, and the like.

In some embodiments, the electronic device 100 may alternatively be a monitoring system, and the monitoring system includes a system of a plurality of cameras, a plurality of sensors, or a plurality of radars and processors and other devices.

A device type of the electronic device 100 is not specially limited in embodiments of this application.

It should be understood that the electronic device 100 shown in FIG. 1 is merely an example, and the electronic device 100 may have more or fewer components than those shown in FIG. 1, or may combine two or more components, or may have different component configurations. Components shown in the figure may be implemented by hardware that includes one or more signal processing and/or application-specific inter-integrated circuits, software, or a combination of hardware and software.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the camera 193 through an I2C interface, so that the processor 110 communicates with the camera 193 through an I2C bus interface, to implement a photographing function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, and the one or more GPUs execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

In some embodiments, the electronic device 100 may include a front-facing camera and a rear-facing camera. There may be one or more front-facing cameras; and there may be one or more rear-facing cameras. The front-facing camera and the rear-facing camera can work simultaneously. For example, when a person uses a front-facing camera to take distant images and wants to use a front-facing camera to record personal images, the front-facing camera and the rear-facing camera may simultaneously perform image capture. Alternatively, a user may choose to enable any one or more front-facing cameras in the plurality of front-facing cameras, or the user may choose to enable any one or more rear-facing cameras in the plurality of rear-facing cameras.

The digital signal processor is configured to process a digital signal, and may process another digital signal in addition to a digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation through the pressure sensor 180A. The electronic device 100 may also calculate a touch location based on a detection signal of the pressure sensor 180A.

The gyroscope sensor 180B may be configured to determine a moving posture of the electronic device 100. In some embodiments, angular velocities of the electronic device 100 around three axes (namely, axes x, y, and z) may be determined through the gyroscope sensor 180B. The gyroscope sensor 180B may be configured to implement image stabilization during photographing.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D.

The acceleration sensor 180E may detect accelerations of the electronic device 100 in various directions (usually on three axes). A magnitude and a direction of gravity may be detected when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption for thermal protection. In some other embodiments, when the temperature is lower than another threshold, the electronic device 100 heats the battery 142, to avoid abnormal shutdown of the electronic device 100 caused by a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external memory card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

To facilitate understanding of this application, the following explains terms in this application.

A mobile industry processor interface (MIPI) is an open standard for mobile application processors initiated by the MIPI Alliance. The MIPI completes a camera serial interface (CSI) specification in a camera working group.

CSI-2 protocol: A CSI-2 protocol defines standard data for data control and data transmission interfaces between a transmit end and a receive end. The transmit end is a primary device, and the receive end is a secondary device. The CSI-2 protocol transmits data and clock signals through a unidirectional differential serial interface.

The CSI-2 protocol includes three layers: an application layer, a CSI-2 protocol layer, and a data physical layer.

The application layer may be configured to perform processing such as encoding and decoding on data.

The CSI-2 protocol layer includes a pixel/byte packing/unpacking layer, a low level protocol (LLP) layer, and a channel management layer.

The CSI-2 protocol supports image applications of various pixel formats with 6-bit to 12-bit pixel width. At the transmit end, the pixel/byte packing/unpacking layer packs data transmitted from the application layer into byte data from pixel data. At the receive end, the pixel/byte packing/unpacking layer unpacks the data sent from the LLP layer, that is, unpacks the byte data into the pixel data, and then the pixel/byte packing/unpacking layer sends the pixel data to the application layer. The low level protocol layer includes methods for transmitting events for serial data between a start and an end of transmission, transferring data to a next layer, and establishing bit-level and byte-level synchronization. In a channel management layer, a number of data channels may be 1, 2, 3, or 4. The transmit end of an interface allocates data streams to one or more data channels. At the receive end, the interface collects bytes from the data channel and combines the bytes into a recombined data stream that restores to an original data stream sequence.

The data physical layer defines a transmission medium, an electrical characteristic, an I/O circuit, and a synchronization mechanism. A port data physical layer (port physics layer, PHY) is compatible with a C-PHY interface, an M-PHY interface, and a D-PHY interface. The C-PHY interface and the D-PHY interface are now widely used in parts such as an application processor, a display screen, and a video interface. The D-PHY interface includes at most four data channels for transmitting data streams and one channel for transmitting clock signals, and each channel includes two differential signal lines.

The following describes an architecture of a D-PHY interface between a camera module and a processor.

Figure 2:
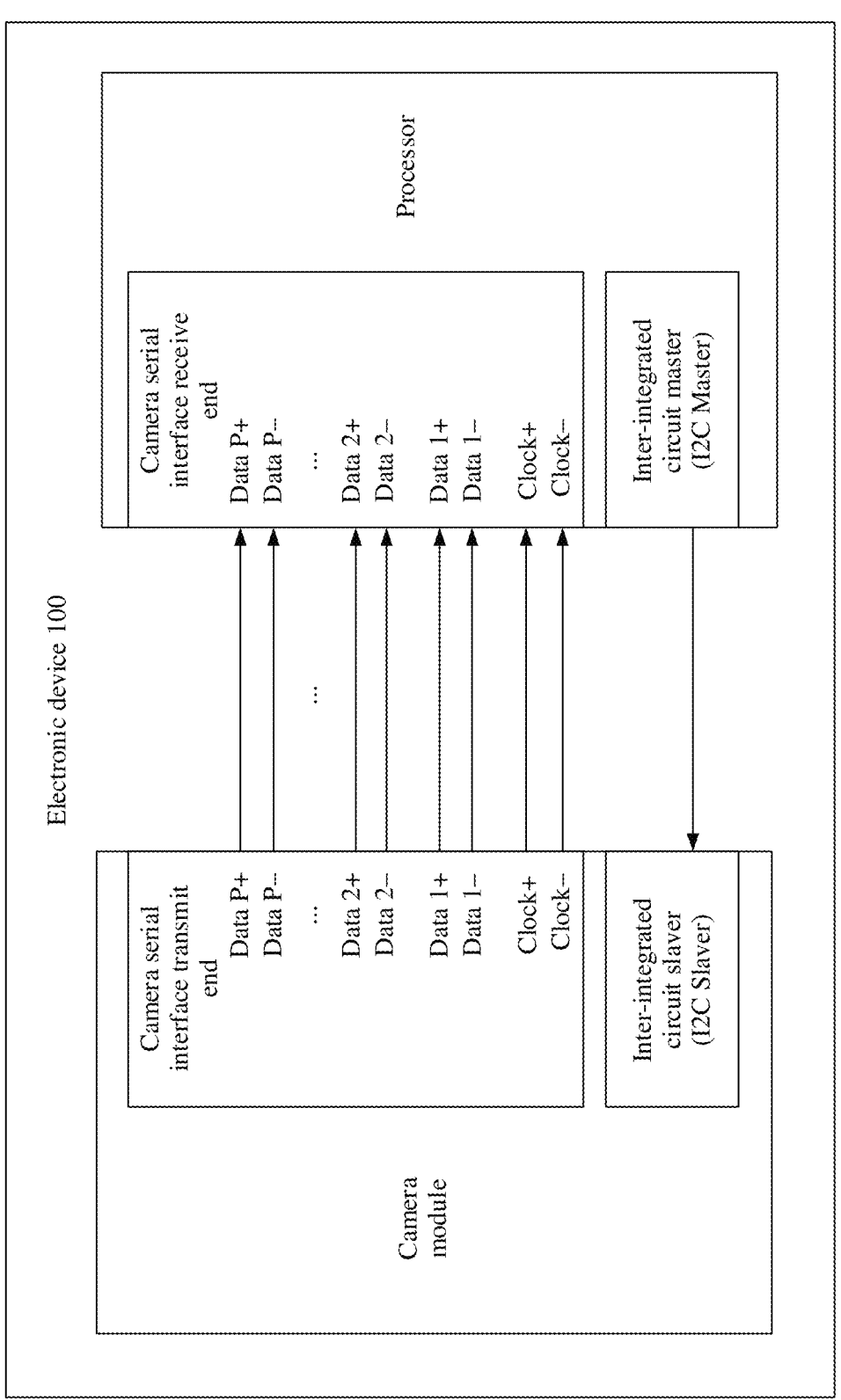
FIG. 2 is a schematic diagram of an architecture of a D-PHY interface between a camera module and a processor according to an embodiment of this application.

FIG. 2 is a schematic diagram of an architecture of a D-PHY interface between a camera module and a processor.

As shown in FIG. 2, a camera serial interface transmit end includes P data channels for transmitting data streams and one channel for transmitting clock signals. A camera serial interface receive end also includes P data channels for transmitting data streams and one channel for transmitting clock signals. P is a positive integer greater than or equal to 1 and less than or equal to 4.

Each data channel includes two differential signal lines, and each channel for transmitting clock signals also includes two differential signal lines. That is, when there are P data channels for transmitting data streams and one channel for transmitting clock signals, there are (P+1)*2 differential signal lines. For the D-PHY interface, a maximum of 10 differential signal lines are required.

When there may be a plurality of camera modules in an electronic device 100, the D-PHY interface shown in FIG. 2 is used between each of the plurality of camera modules and the processor. Details are not described again in this application.

The C-PHY interface includes a maximum of three data channels for data streams. Because the C-PHY interface embeds clock signals into the data channels, no additional clock channels are required. Each channel includes three differential signal lines.

The following describes an architecture of a C-PHY interface between a camera module and a processor.

Figure 3:
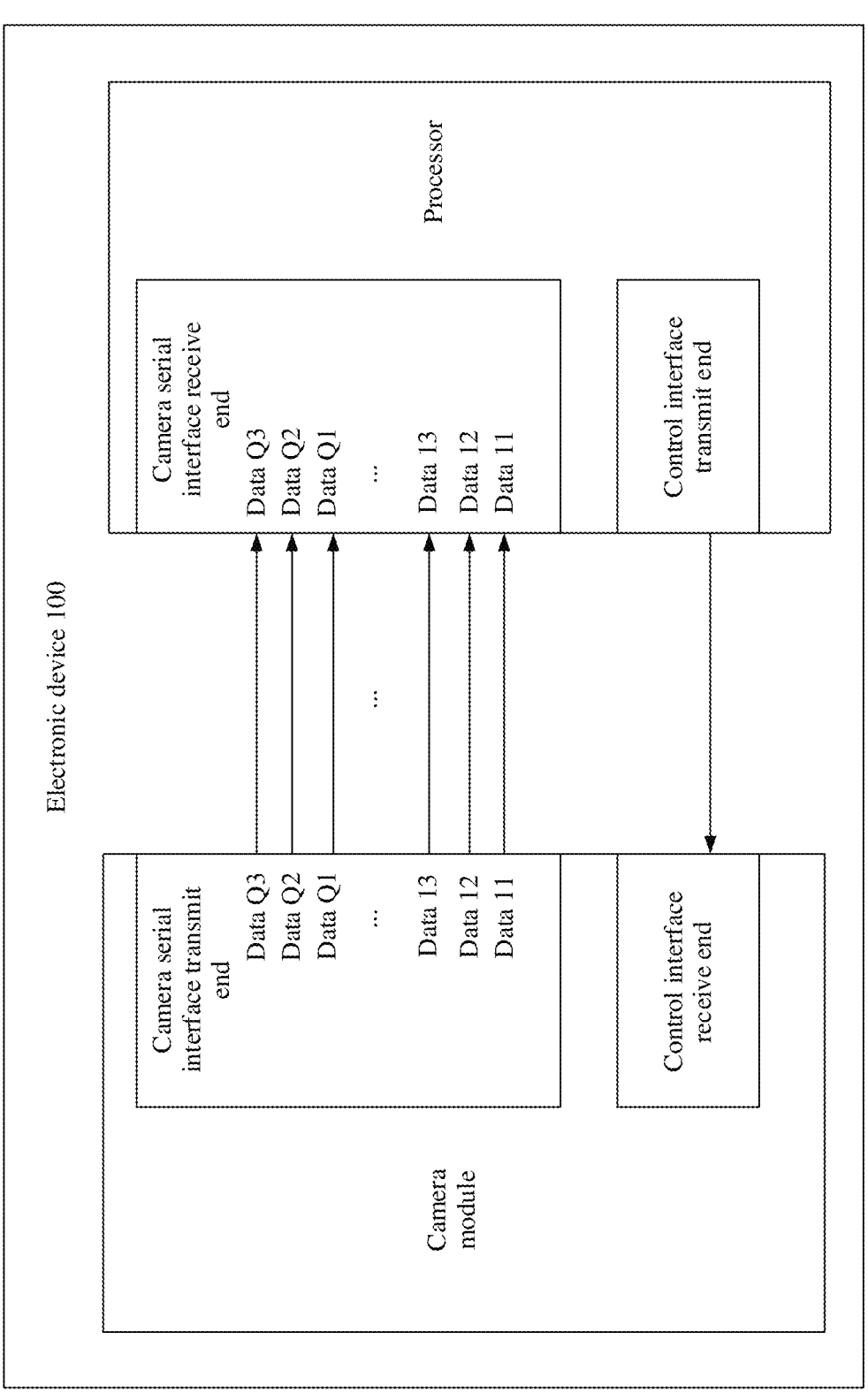
FIG. 3 is a schematic diagram of an architecture of a C-PHY interface between a camera module and a processor according to an embodiment of this application.

FIG. 3 is a schematic diagram of an architecture of a C-PHY interface between a camera module and a processor.

As shown in FIG. 3, a camera serial interface transmit end includes Q data channels for transmitting data streams. A camera serial interface receive end also includes Q data channels for transmitting data streams. Q is a positive integer greater than or equal to 1 and less than or equal to 3.

Each data channel includes three differential signal lines. That is, when there are Q data channels for transmitting data streams, there are Q*3 differential signal lines. For the C-PHY interface, a maximum of 9 differential signal lines are required.

When there may be a plurality of camera modules in an electronic device 100, the C-PHY interface shown in FIG. 3 is used between each of the plurality of camera modules and the processor. Details are not described again in this application.

Figure 4:
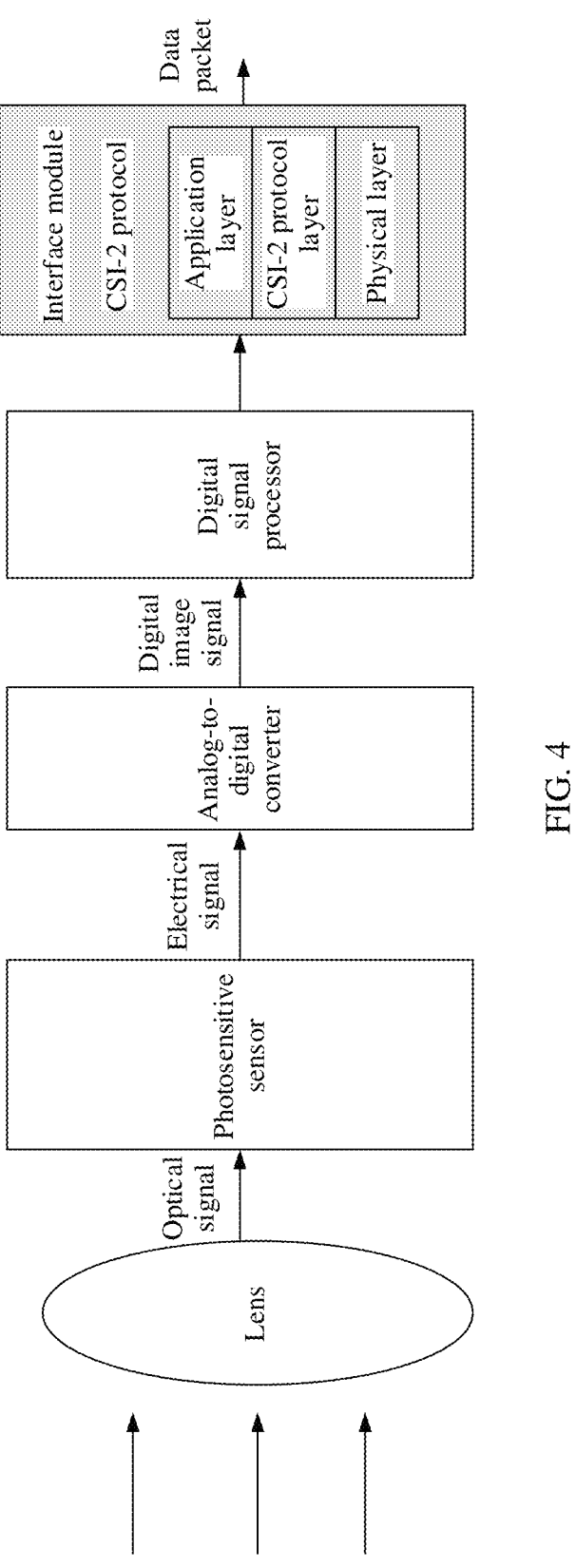
FIG. 4 is a schematic diagram of a structure of a camera module according to an embodiment of this application.

Camera module: As shown in FIG. 4, a camera module includes a lens, a photosensitive sensor, an analog-to-digital converter, a digital signal processor, and an interface module.

Specifically, a scene is projected onto the photosensitive sensor through the lens, and the photosensitive sensor converts an optical signal into an electrical signal. After the electrical signal is transmitted to the analog-to-digital converter, the electrical signal is converted into a digital image signal by using the analog-to-digital converter. Then, the digital image signal is transmitted to the digital signal processor. The digital signal processor is mainly used to perform post-processing on the digital image signal. The post-processing may include linear correction, noise removal, dead pixel removal, interpolation, white balance, automatic exposure control, and the like.

The interface module is encapsulated with the CSI-2 protocol. The CSI-2 protocol includes an application layer, a CSI-2 protocol layer, and a data physical layer. The interface module is configured to encode or decode pixel data by using the application layer of the CSI-2 protocol. The CSI-2 protocol layer packs the encoded pixel data into a data packet, and then the interface module transmits the data packet to the application processor by using the data physical layer of the CSI-2 protocol.

The following describes an application scenario in which there are a plurality of cameras.

Figure 5:
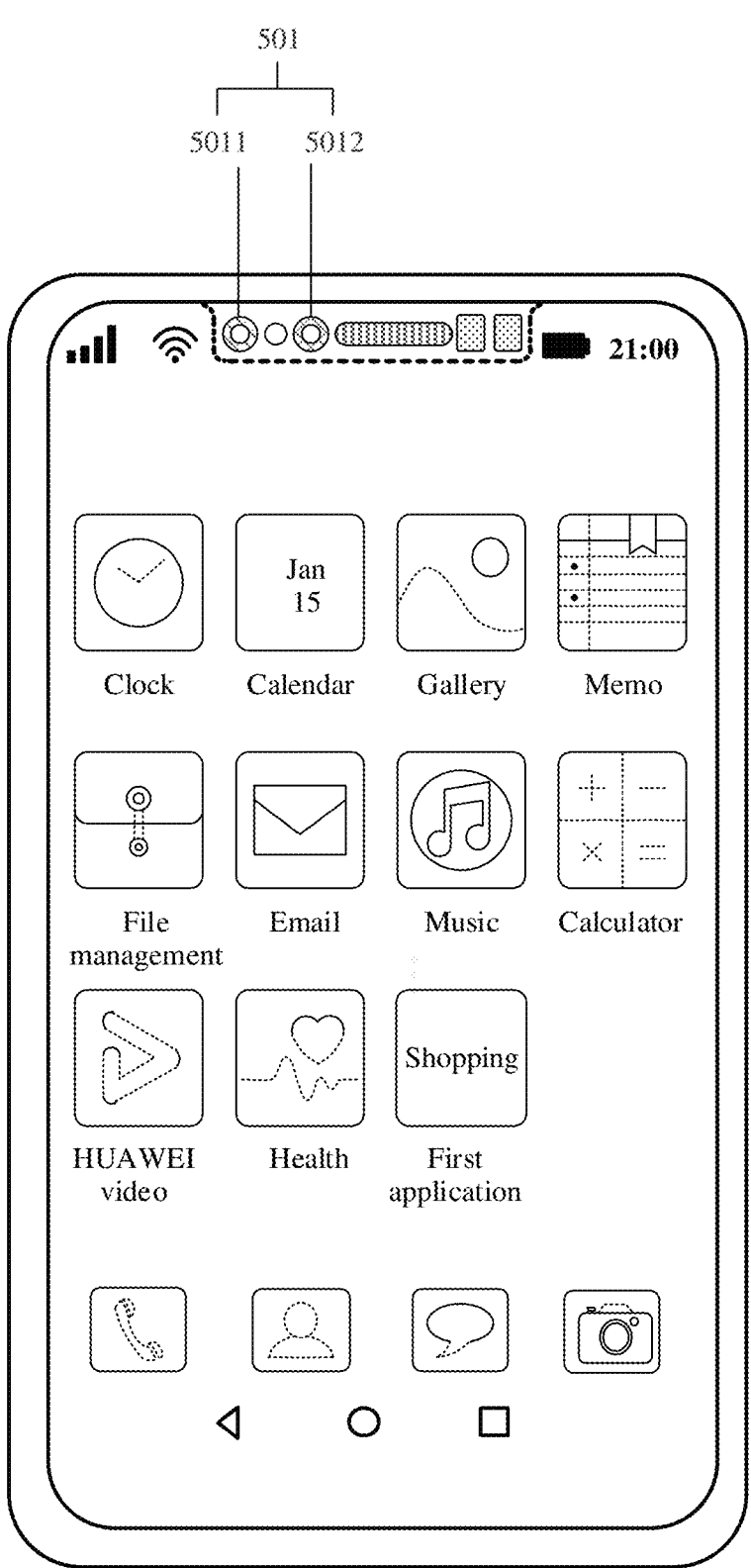
FIG. 5 and FIG. 6 are schematic diagrams of a multi-camera system of an electronic device 100 according to an embodiment of this application.
Figure 6:
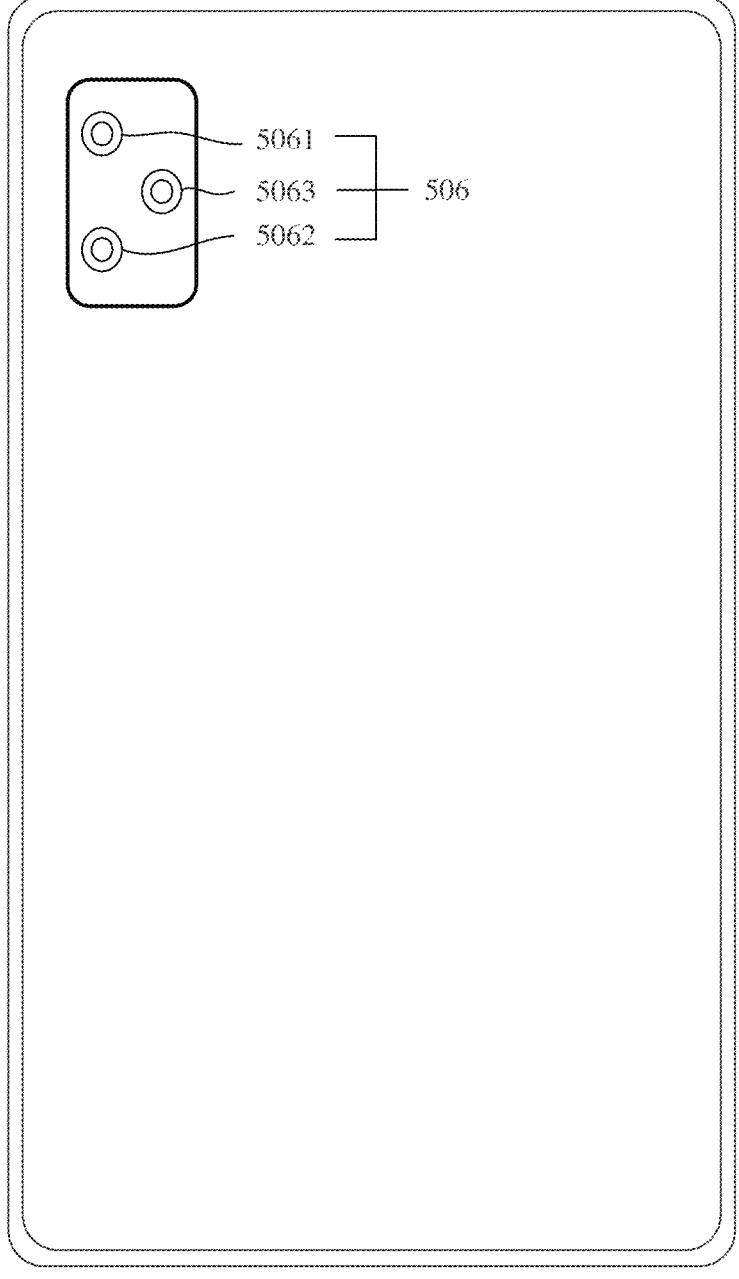

FIG. 5 and FIG. 6 are schematic diagrams of a multi-camera system of an electronic device 100 according to an embodiment of this application. The multi-camera system shown in FIG. 5 is merely an example. In specific implementation, the multi-camera system may include more or fewer camera modules.

FIG. 5 is a schematic diagram of a front-facing camera module 501 of the electronic device 100. The front-facing camera module 501 includes a camera module 5011 and a camera module 5022. The camera module 5011 and the camera module 5022 may be enabled simultaneously to record an image of a user.

FIG. 6 is a schematic diagram of a rear-facing camera module 506 of the electronic device 100. The rear-facing camera module 506 includes a camera module 5061, a camera module 5062, and a camera module 5063. For example, the camera module 5063 may be a main camera module, the camera module 5061 may be an ultra-wide-angle camera module, and the camera module 5062 may be a telephoto camera. When the user wants to photograph a distant scene, the camera module 5063 is in an enabled state. When the user wants to photograph a distant scene by using an ultra-wide-angle function, the camera module 5063 and the camera module 5061 are in an enabled state. When the user wants to photograph a more distant scene, the camera module 5063 and the camera module 5062 are in an enabled state. The camera module 5061, the rear-facing camera module 5062, and the rear-facing camera module 5063 may also be enabled simultaneously to record a distant scene.

In some embodiments, when the user wants to take a distant scene and record an image of the user, the front-facing camera module 501 and the rear-facing camera module 506 may be enabled simultaneously.

For another example, currently, to assist a driver in driving, a plurality of cameras (sensors or radars) are installed outside a vehicle body to monitor road conditions outside a vehicle. Therefore, monitoring data of the plurality of cameras outside the vehicle body can expand the driver's view, so that the driver can see more road conditions outside the vehicle. In addition, the plurality of sensors installed outside the vehicle body can also detect road conditions of the vehicle, and when the sensors or radars detect that a distance between the vehicle body and an obstacle is less than a predetermined value, an alarm or a brake device is triggered to prompt the driver to prevent an accident.

Figure 7:
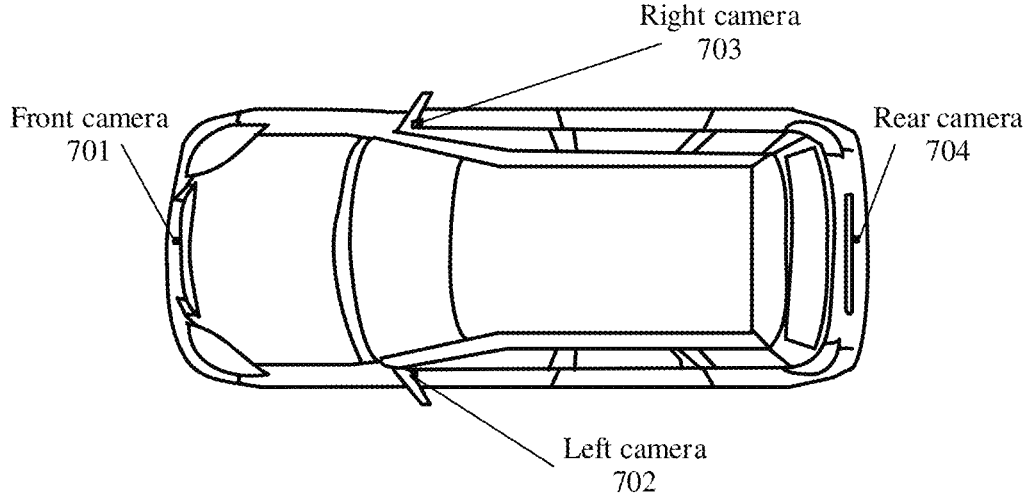
FIG. 7 is a schematic diagram of a vehicle-mounted monitoring system according to an embodiment of this application.

FIG. 7 is a schematic diagram of a vehicle-mounted monitoring system. FIG. 7 is merely an example of a schematic diagram of a vehicle-mounted monitoring system. This is not limited in this application.

As shown in FIG. 7, there are four cameras in a vehicle external monitoring system, which are respectively a front camera 701, a left camera 702, a right camera 703, and a rear camera 704. The front camera 701 is configured to record a road condition in front of the vehicle, the left camera 702 is configured to record a road condition on a left side of the vehicle, the right camera 703 is configured to record a road condition on a right side of the vehicle, and the rear camera 704 is configured to record a road condition behind the vehicle. The plurality of cameras summarize road conditions and display the road conditions on a display screen in the vehicle, to assist the driver in driving. In this way, the driver can be prompted to avoid obstacles in front of, behind, on the left side of, and on the right side of the vehicle during driving, and the user can be assisted in parking.

In some embodiments, the vehicle external monitoring system may further include more or fewer cameras, and monitoring cameras may also be disposed inside the vehicle. This is not limited herein in this application.

For another example, video surveillance technologies are widely used in schools, shopping malls, hospitals, public transportation, unattended stores, temporary deployment of public security investigations, and the like. This is described by using a video surveillance system at a crossroad in this application. The video surveillance technologies may be further applied to more scenarios, and details are not described herein again in this application.

Figure 8A:
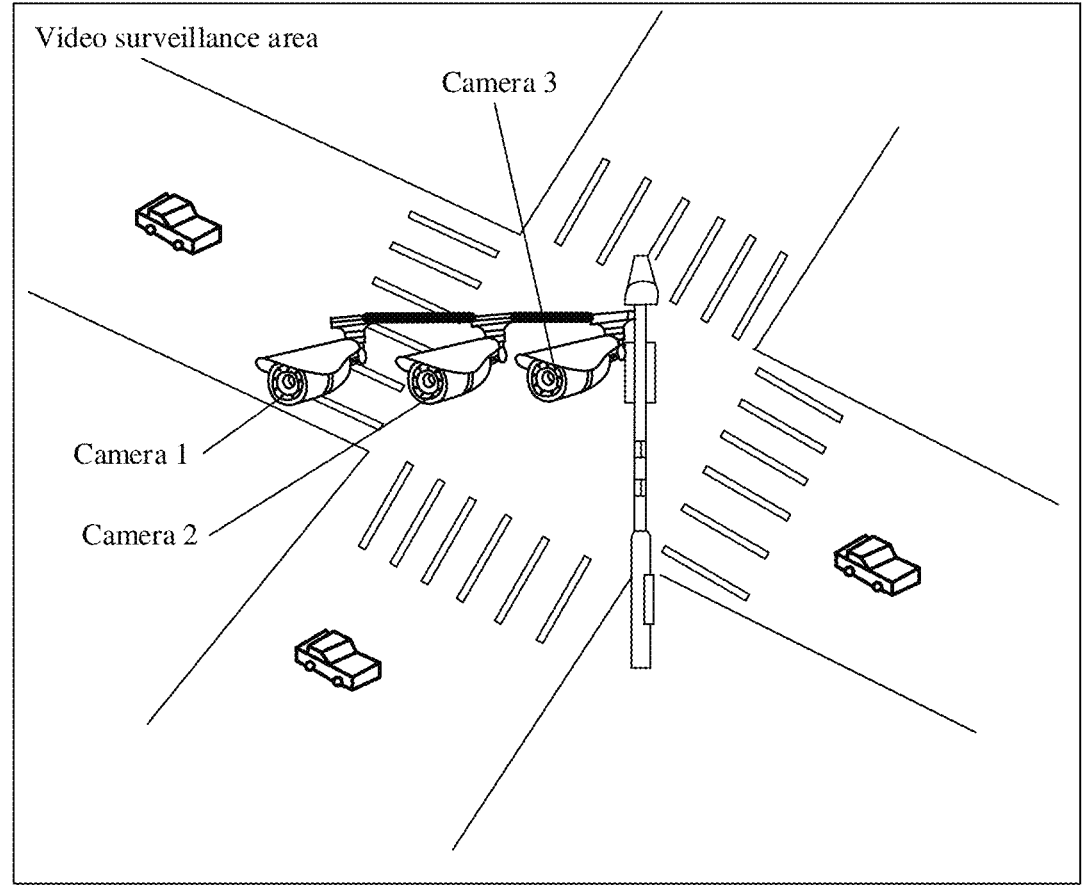
FIG. 8A and FIG. 8B are schematic diagrams of a video surveillance system at a crossroad according to an embodiment of this application.
Figure 8B:
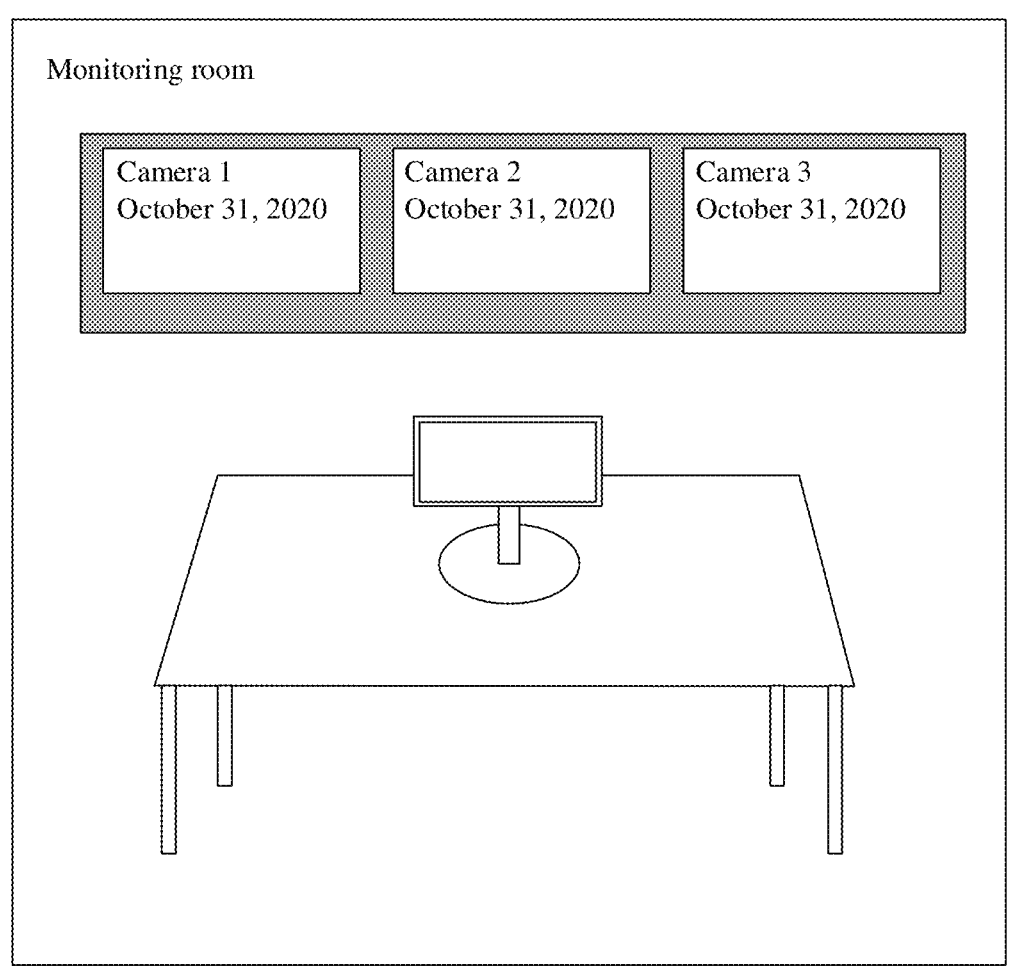

FIG. 8A and FIG. 8B are example schematic diagrams of a video surveillance system at a crossroad.

FIG. 8A is a schematic diagram of a video surveillance area at a crossroad. For example, there are three cameras (a camera 1, a camera 2, and a camera 3) at the crossroads to monitor a traffic situation at the crossroads in real time. As shown in FIG. 8B, real-time data detected by the camera 1, the camera 2, and the camera 3 are respectively displayed on a display screen in a monitoring room. A technician can see the monitoring data of each camera on the display screen in the monitoring room.

In some embodiments, the video surveillance system may further include more cameras. This is not limited in this application.

Currently, in the foregoing various application scenarios, the plurality of cameras are connected to the processor in a parallel manner. When there are N cameras, there needs to be N interfaces on a processor side to be separately connected to each camera. As a quantity of cameras increases, a quantity of interfaces on the processor side increases. As a result, cabling on the processor side is complex, and integration on the processor side is unfavorable.

The following describes a structure in which a five-camera system (three rear-facing camera modules and two front-facing camera modules) of the electronic device 100 are connected to the processor in a parallel manner.

Figure 9:
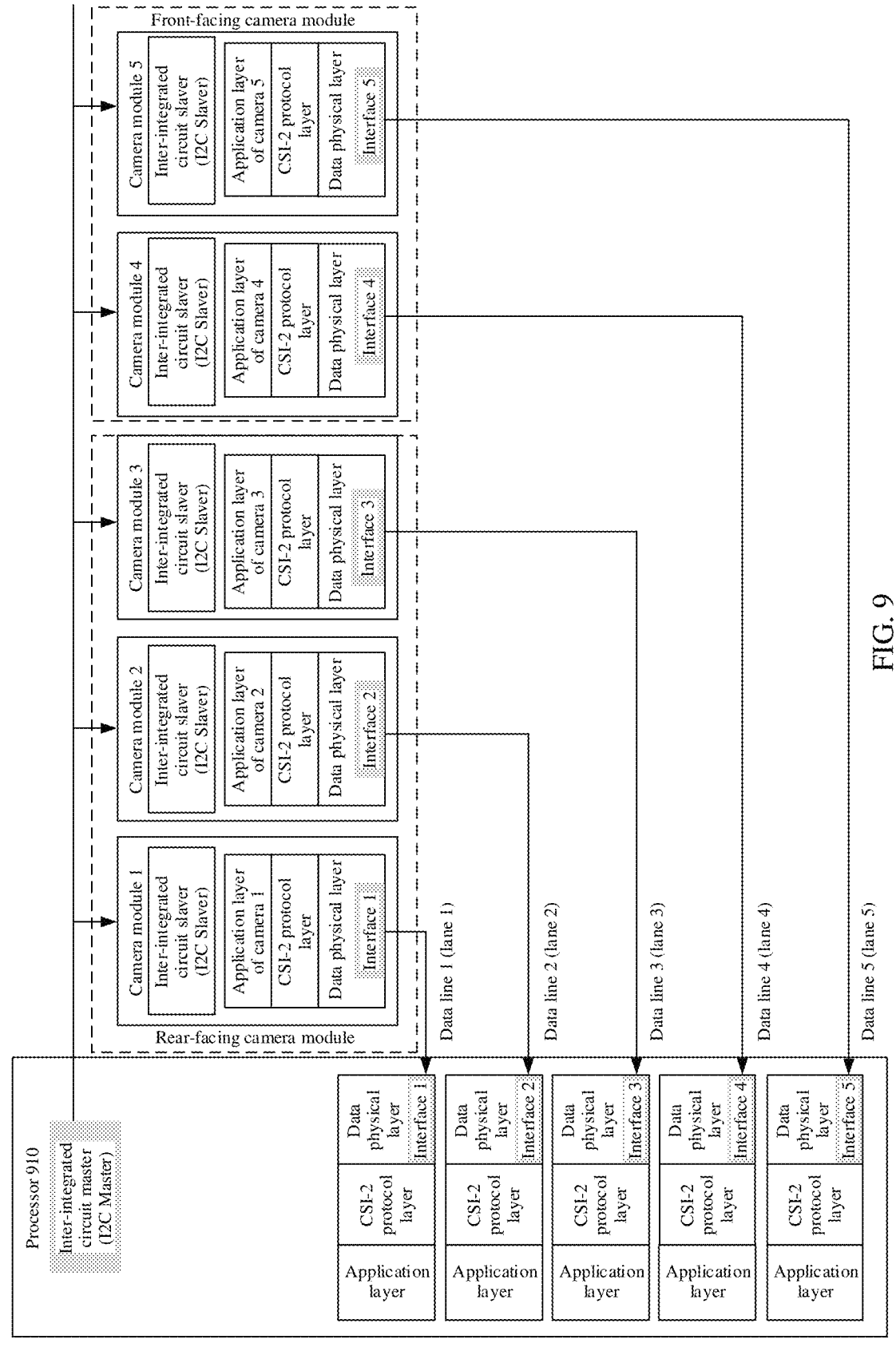
FIG. 9 is a schematic diagram of a plurality of camera modules connected to a processor by using a parallel topology structure according to an embodiment of this application.

FIG. 9 is a schematic diagram of a plurality of camera modules connected to a processor by using a parallel topology structure. The three rear-facing camera modules are respectively a camera module 1, a camera module 2, and a camera module 3. The two front-facing camera modules are respectively a camera module 3 and a camera module 5.

An inter-integrated circuit master (I2C Master) is deployed on the processor 910, and the processor 910 is separately connected to each camera module.

Each camera module is deployed with an inter-integrated circuit slaver (I2C Slaver). Each camera module performs data transmission with the processor 910 based on the I2C specification.

The camera module 1 is connected to an interface 1 of the processor 910 through the interface 1, and the camera module 1 transmits, through the interface 1, a data packet of the camera module 1 to the interface 1 of the processor 910 through a data line 1 (lane 1). The camera module 2 is connected to an interface 2 of the processor 910 through the interface 2, and the camera module 2 transmits, through the interface 2, a data packet of the camera module 2 to the interface 2 of the processor 910 through a data line 2 (lane 2). The camera module 3 is connected to an interface 3 of the processor 910 through the interface 3, and the camera module 3 transmits, through the interface 3, a data packet of the camera module 3 to the interface 3 of the processor 910 through a data line 3 (lane 3). The camera module 4 is connected to an interface 4 of the processor 910 through the interface 4, and the camera module 4 transmits, through the interface 4, a data packet of the camera module 4 to the interface 4 of the processor 910 through a data line 4 (lane 4). The camera module 5 is connected to an interface 5 of the processor 910 through the interface 5, and the camera module 5 transmits, through the interface 5, a data packet of the camera module 5 to the interface 5 of the processor 910 through a data line 5 (lane 5).

The following uses a data transmission process between the camera module 1 and the processor 910 as an example for description.

As shown in FIG. 9, the CSI-2 protocol used by the camera module 1 includes an application layer of the camera 1, a CSI-2 protocol layer, and a data physical layer. The data physical layer includes the interface 1. The application layer of the camera 1 is configured to encode pixel data collected by the camera 1. Then, the application layer of the camera 1 transmits the pixel data to the CSI-2 protocol layer. The CSI-2 protocol layer is configured to receive the pixel data transmitted by the application layer of the camera 1, and pack the pixel data into a data packet. Then, the CSI-2 protocol layer transmits the data packet to the data physical layer. The data physical layer is configured to receive the data packet transmitted by the data protocol layer, and the data physical layer sends the data packet to the processor 910 through the interface 1 and the data line 1 (lane 1). The interface 1 may be any one of the foregoing C-PHY interface, the M-PHY interface, and the D-PHY interface. This is not limited herein in this application.

The CSI-2 protocol used by the processor 910 includes an application layer, a CSI-2 protocol layer, and a data physical layer. The data physical layer includes the interface 1. The processor 910 receives, through the interface 1 of the data physical layer, the data packet sent by the camera module 1. Then, the data physical layer sends the data packet to the CSI-2 protocol layer. The CSI-2 protocol layer receives the data packet sent by the data physical layer, and unpacks the data packet into encoded pixel data. Then, the CSI-2 protocol layer transmits the encoded pixel data to the application layer. The application layer may be configured to decode the encoded pixel data to obtain the pixel data. Then, the application layer performs operations such as pixel data compression, pixel data combination, and image compression on the pixel data. For example, when a user photographs a distant scene and presses a shooting button, the application layer integrates pixel data into a picture, and saves the picture to a gallery of the electronic device 100.

For a process in which the camera module 2, the camera module 3, the camera module 4, and the camera module 5 perform data transmission with the processor 910 shown in FIG. 9, refer to the foregoing process in which the camera module 1 performs data transmission with the processor. Details are not described herein again.

Figure 10:
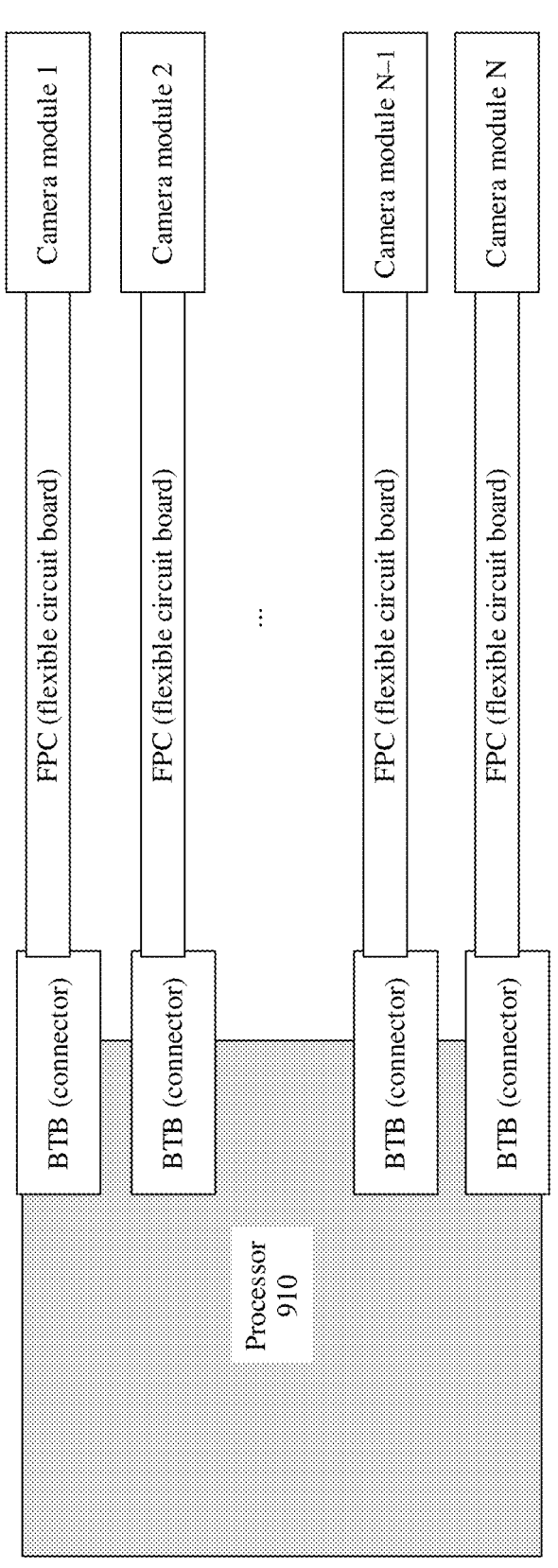
FIG. 10 is a schematic diagram of an engineering structure of a plurality of camera modules connected in parallel to a processor of an electronic device 100 according to an embodiment of this application.

FIG. 10 is a schematic diagram of an engineering structure of a plurality of camera modules connected in parallel to a processor of an electronic device 100.

Each camera module is connected to a connector (board to board, BTB) of the processor 910 by using a flexible circuit board (Flexible circuit board, FPC).

Specifically, a camera module N is connected to a connector of the processor 910 by using a flexible circuit board. A camera module N−1 is connected to a connector of the processor 910 by using a flexible circuit board. By analogy, a camera module 2 is connected to a connector of the processor 910 by using a flexible circuit board. A camera module 1 is connected to a connector of the processor 910 by using a flexible circuit board.

It can be learned that, when a plurality of camera modules are connected in parallel to the processor 910 in the electronic device 100, each camera module needs to be connected to the processor 910 through an interface. When there are N camera modules, the processor 910 needs to be connected to each camera module through N interfaces.

When a plurality of camera modules are connected to the processor in parallel, as a quantity of camera modules increases, a quantity of interfaces and a quantity of signal pins on the processor side also increase, resulting in complex cabling and unfavorable system integration on the processor side.

Therefore, this application provides a data transmission method and an electronic device. The method may be applied to an electronic device 100 configured with a plurality of input devices (for example, camera modules). One uplink interface and one downlink interface are deployed on each input device of the electronic device 100. The uplink interface is connected to a processor or an upper-level input device, and the downlink interface is connected to a lower-level input device or is not connected. A processing module in each input device may process image data collected by a current input device and data sent by a lower-level input device connected to a downlink interface, and then transmit processed data to the processor or an upper-level input device through an uplink interface. In this way, the plurality of input devices are connected in a cascade manner, and only one of the plurality of input devices needs to be connected to the processor. Therefore, a quantity of interfaces between the processor and the plurality of input devices and a quantity of signal pins are reduced, and system integration on the processing side is facilitated. In addition, adding or subtracting an input device is easy to operate.

The input device may be a device such as a camera module, a sensor, a radar, or the like. Alternatively, the input device may be another device. This is not limited herein in this application.

The method may be applicable to a camera system in the electronic device 100. To improve photographing precision, a quantity of camera modules in the electronic device 100 (for example, a mobile phone) increases. When the electronic device 100 (for example, a mobile phone) has a plurality of camera modules, the plurality of camera modules may be connected in a cascade manner, and only one camera module needs to be connected to a processor in the electronic device 100 (for example, a mobile phone). In this way, the processor needs only one interface to be connected to the one camera module. Therefore, a quantity of interfaces and data pins on the processor side is reduced, and system integration is facilitated. In addition, when a camera module needs to be added subsequently, only the added camera module needs to be connected with existing camera modules in a cascade manner, and an operation is simple.

The method may also be applicable to the vehicle-mounted monitoring system shown in FIG. 7, and a plurality of vehicle-mounted cameras (sensors or radars) are connected in a cascade manner. Therefore, only one of the plurality of cameras needs to be connected to a processor, so that a quantity of interfaces and data pins on the processor side is reduced. In addition, when a vehicle-mounted camera needs to be added, only the added camera needs to be connected with a last camera in a cascade manner, and an operation is simple.

The method may also be applicable to the video surveillance system in a security area shown in FIG. 8A and FIG. 8B. A plurality of surveillance cameras need to be installed in the security area to perform all-round surveillance, to prevent an accident. When a surveillance camera needs to be added to the surveillance area, the surveillance camera that needs to be added may be directly connected with a last camera in a cascade manner, so that modification is simple and unnecessary operations are reduced.

The following describes a data transmission method provided in this embodiment of this application by using a multi-camera module in an electronic device 100.

In some application scenarios, the electronic device 100 is configured with a plurality of camera modules, and the plurality of camera modules may include a plurality of front-facing camera modules and a plurality of rear-facing camera modules. For example, the electronic device 100 includes two front-facing camera modules and three rear-facing camera modules, and the two front-facing camera modules and the three rear-facing camera modules are all connected to a processor in a cascade manner.

A cascaded structure of a plurality of camera modules in the electronic device 100 is first described.

Figure 11:
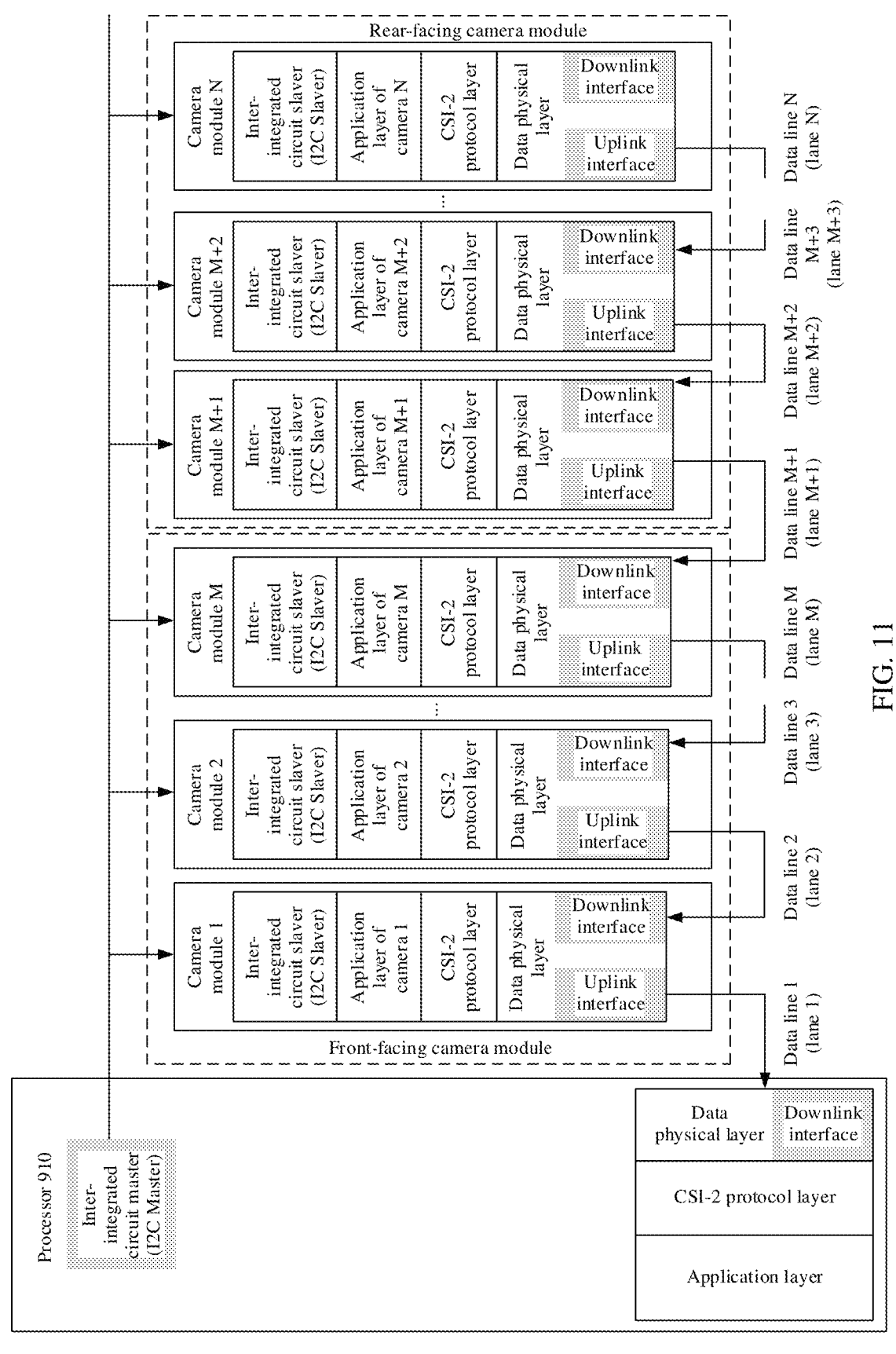
FIG. 11 is a schematic diagram of cascaded connection of a plurality of camera modules in an electronic device 100 according to an embodiment of this application.

FIG. 11 is a schematic diagram of cascaded connection of a plurality of camera modules in an electronic device 100.

A front-facing camera module includes a camera module 1, a camera module 2, . . . , and a camera module M. There are M camera modules in total. The front-facing camera module may also include more or fewer camera modules. This is not limited herein in this application.

A rear-facing camera module includes a camera module M+1, a camera module M+2, . . . , and a camera module N. There are N−M camera modules in total. The rear-facing camera module may also include more or fewer camera modules. This is not limited herein in this application.

For example, when M is 2 and N is 5, the electronic device 100 has two front-facing camera modules and three rear-facing camera modules.

An inter-integrated circuit master (I2C Master) is deployed on a processor 910, and the processor 910 is separately connected to each camera module.

An inter-integrated circuit slaver (I2C Slaver) is deployed on each camera module, and the inter-integrated circuit slaver (I2C Slaver) deployed on each camera module is connected to the inter-integrated circuit master (I2C Master) deployed on the processor 910. The processor 910 may send a control signal by using the inter-integrated circuit master (I2C Master), and the inter-integrated circuit slaver (I2C Slaver) receives the control signal, and configures and controls each camera module. Data is transmitted between every two camera modules, and between the camera module and the processor 910 by using a CSI-2 protocol.

As shown in FIG. 11, a CSI-2 protocol used by the camera module N includes an application layer of the camera N, a CSI-2 protocol layer, and a data physical layer. The data physical layer includes an uplink interface and a downlink interface, and the downlink interface of the camera module N is not connected. The uplink interface of the camera module N is connected to a downlink interface of the camera module N–1. The application layer of the camera N is configured to perform further processing on pixel data collected by the camera module, for example, processing such as pixel data encoding. Then, the application layer of the camera N transmits the pixel data to the CSI-2 protocol layer. The CSI-2 protocol layer is configured to receive the pixel data transmitted by the application layer of the camera, and pack the pixel data into a data packet. Then, the CSI-2 protocol layer transmits the data packet to the data physical layer. The data physical layer is configured to receive the data packet transmitted by the data protocol layer. The data physical layer sends the data packet to a data physical layer of the camera module N–1 through the uplink interface and a data line N (lane N).

By analogy, a downlink interface of the camera module M+2 is connected to an uplink interface of the camera module M+3. The camera module M+2 receives data packets of the camera module N to the camera module M+3 through the downlink interface and a data line M+3 (lane M+3). Then, the camera module M+2 sends a data packet of the camera module M+2 and the data packets of the camera module N to the camera module M+3 to the camera module M+1 through an uplink interface and a data line M+2 (lane M+2).

A downlink interface of the camera module M+1 is connected to the uplink interface of the camera module M+2. The camera module M+1 receives data packets of the camera module M+2 to the camera module N through the downlink interface and a data line M+2 (lane M+2). Then, the camera module M+1 sends a data packet of the camera module M+1 and the data packets of the camera module N to the camera module M+2 to the camera module M through an uplink interface and a data line M+1 (lane M+1).

A downlink interface of the camera module M is connected to the uplink interface of the camera module M+1. The camera module M receives data packets of the camera module N to the camera module M+1 through the downlink interface and a data line M+1 (lane M+1). Then, the camera module M sends a data packet of the camera module M and the data packets of the camera module N to the camera module M+1 to the camera module M–1 through an uplink interface and a data line M (lane M).

By analogy, a downlink interface of the camera module 2 is connected to an uplink interface of the camera module 3. The camera module 2 receives data packets of the camera module N to the camera module 3 through the downlink interface and a data line 3 (lane 3). Then, the camera module 2 sends a data packet of the camera module 2 and the data packets of the camera module N to the camera module 3 to the camera module 1 through an uplink interface and a data line 2 (lane 2).

A downlink interface of the camera module 1 is connected to the uplink interface of the camera module 2. The camera module 1 receives the data packets of the camera module 2 to the camera module N through the downlink interface. Then, the camera module 1 sends a data packet of the camera module 1 and the data packets of the camera module 2 to the camera module N to the processor 910 through an uplink interface and a data line 1 (lane 1).

The CSI-2 protocol used by the camera module M+2, the camera module M+1, the camera module M, . . . , the camera module 2, and the camera module 1 is the same as the CSI-2 protocol used by the camera module N. In addition, processes of collecting pixel data, packing the pixel data, and transmitting a data packet of the camera module M+1, the camera module M+2, the camera module M, . . . , the camera module 2, and the camera module 1 are the same as those of the camera module N. Details are not described again in this application.

The CSI-2 protocol used by the processor 910 includes an application layer, a CSI-2 protocol layer, and a data physical layer. The processor 910 receives, through a downlink interface of the data physical layer, data packets that are of the camera module 1 to the camera module N and that are transmitted by the camera module 1. The data packets of the camera module 1 to the camera module N are unpacked into encoded pixel data of the camera module 1 to the camera module N by using the CSI-2 protocol layer of the processor 910. Then, the CSI-2 protocol layer transmits the encoded pixel data to the application layer. The application layer may be configured to decode the encoded pixel data to obtain the pixel data. Then, the application layer performs operations such as pixel data compression, pixel data combination, and image compression on the pixel data of the camera module 1 to the camera module N. For example, when a user photographs a distant scene and presses a shooting button, the application layer integrates pixel data of the camera module M+1 to the camera module N into a picture, and saves the picture to a gallery of the electronic device 100. When the user also photographs a selfie image of the user while photographing a distant scene, and the user presses a shooting button, the application layer integrates pixel data of the camera module 1 to the camera module M into a picture, and stores the picture in a gallery of the electronic device 100.

In some embodiments, pixel data collected by each camera module may be separately synthesized into one picture and stored in a gallery. For example, when the processor receives pixel data collected by a total of N–M camera modules from the camera module M+1 to the camera module N, the processor separately integrates the pixel data collected by the camera module M+1 to the camera module N into pictures by using the application layer, to generate a total of N–M pictures. The processor saves the N–M pictures to the gallery.

It should be noted that a form of a picture generated by a camera module is not limited in this application. Pixel data collected by each camera module may be integrated into one picture, or pixel data collected by a plurality of camera modules may be integrated into one picture, or pixel data collected by any one or two or more camera modules may be integrated into one picture. This is not limited herein in this application.

The uplink interface and the downlink interface of each camera module and the interface of the processor in the foregoing embodiment may be any one of a C-PHY interface, an M-PHY interface, or a D-PHY interface. This is not limited herein in this application.

Figure 12:
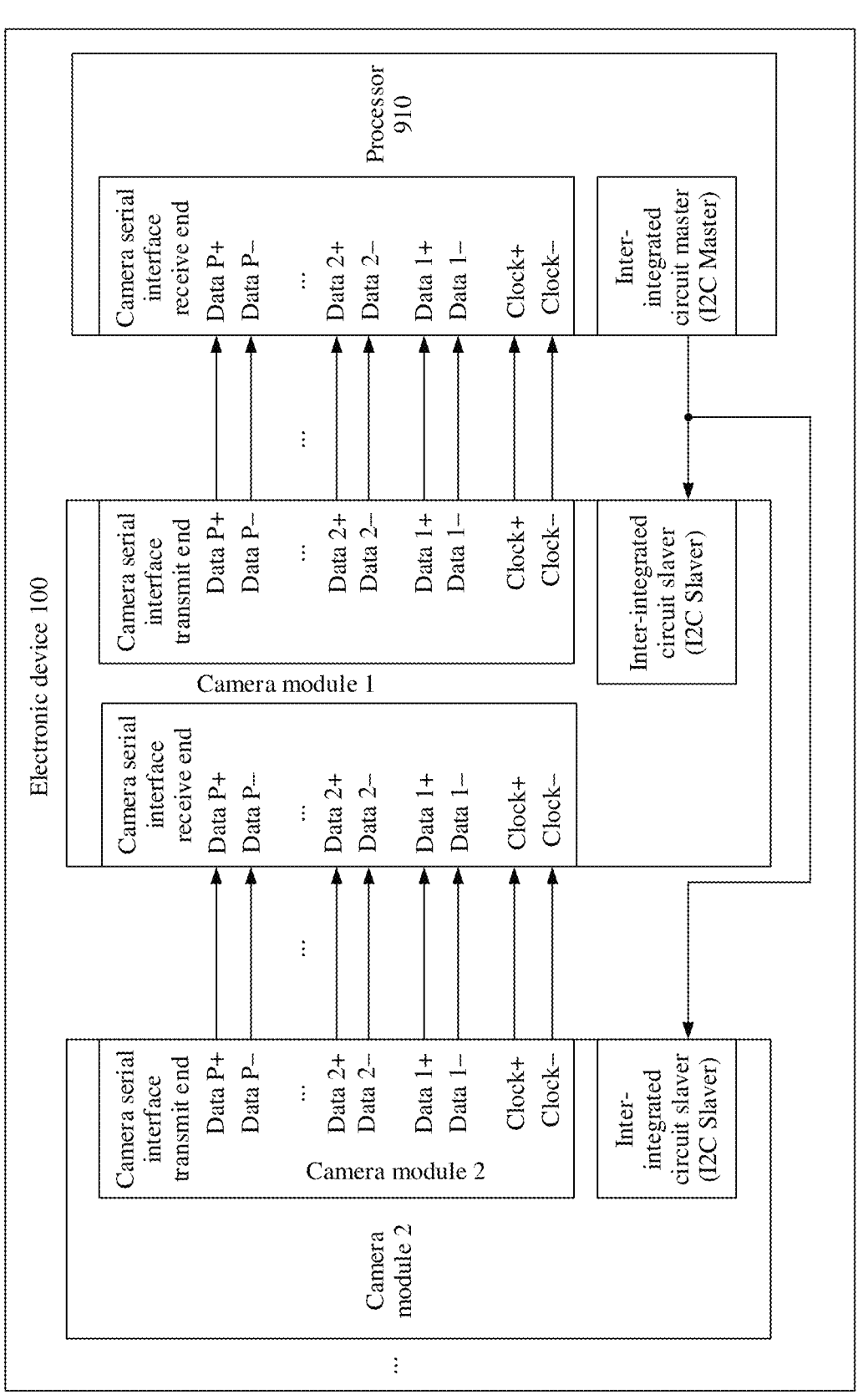
FIG. 12 is a schematic diagram of an architecture of a D-PHY interface between cascaded camera modules and a processor according to an embodiment of this application.

FIG. 12 is a schematic diagram of an architecture of a D-PHY interface between cascaded camera modules and a processor according to an embodiment of this application.

As shown in FIG. 12, a camera module 1 is connected to a processor 910. A camera serial interface transmit end of the camera module 1 includes P data channels for transmitting data streams and one channel for transmitting clock signals. A camera serial interface receive end on the processor 910 side also includes P data channels for transmitting data streams and one channel for transmitting clock signals. P is a positive integer greater than or equal to 1 and less than or equal to 4.

Each data channel includes two differential signal lines, and each channel for transmitting clock signals also includes two differential signal lines. That is, when there are P data channels for transmitting data streams and one channel for transmitting clock signals, there are (P+1)*2 differential signal lines. For the D-PHY interface, a maximum of 10 differential signal lines are required.

An inter-integrated circuit master (I2C Master) on the processor 910 side sends a control signal to an inter-integrated circuit slaver (I2C Slaver) through an I2C bus.

When there are a plurality of camera modules in an electronic device 100, the plurality of camera modules are connected in a cascade manner. For example, for a camera module 2, the camera module 2 is connected to the camera module 1 in a cascade manner.

As shown in FIG. 12, the camera module 2 is connected to the camera module 1 in a cascade manner. A camera serial interface receive end of the camera module 2 includes P data channels for transmitting data streams and one channel for transmitting clock signals. A camera serial interface receive end of the camera module 1 includes P data channels for transmitting data streams and one channel for transmitting clock signals. P is a positive integer greater than or equal to 1 and less than or equal to 4.

When there are a plurality of camera modules, connections are established between the plurality of camera modules in a cascade manner between the camera modules 1 and the camera modules 2. Details are not described herein again.

An inter-integrated circuit slaver (I2C Slaver) is deployed on each camera module, and the inter-integrated circuit master (I2C Master) is deployed on the processor 910. The processor 910 sends a control signal to the inter-integrated circuit slaver (I2C Slaver) of each camera module through the I2C bus. The inter-integrated circuit slaver (I2C Slaver) receives the control signal to control the enabling and disabling of the camera module.

Similarly, in this embodiment of this application, a C-PHY interface may also be used between the cascaded camera modules and the processor. A manner in which cascaded camera modules are connected to the processor 910 through the C-PHY interface is similar to a manner in which cascaded camera modules are connected to the processor 910 through the C-PHY interface. Details are not described herein again.

Figure 13:
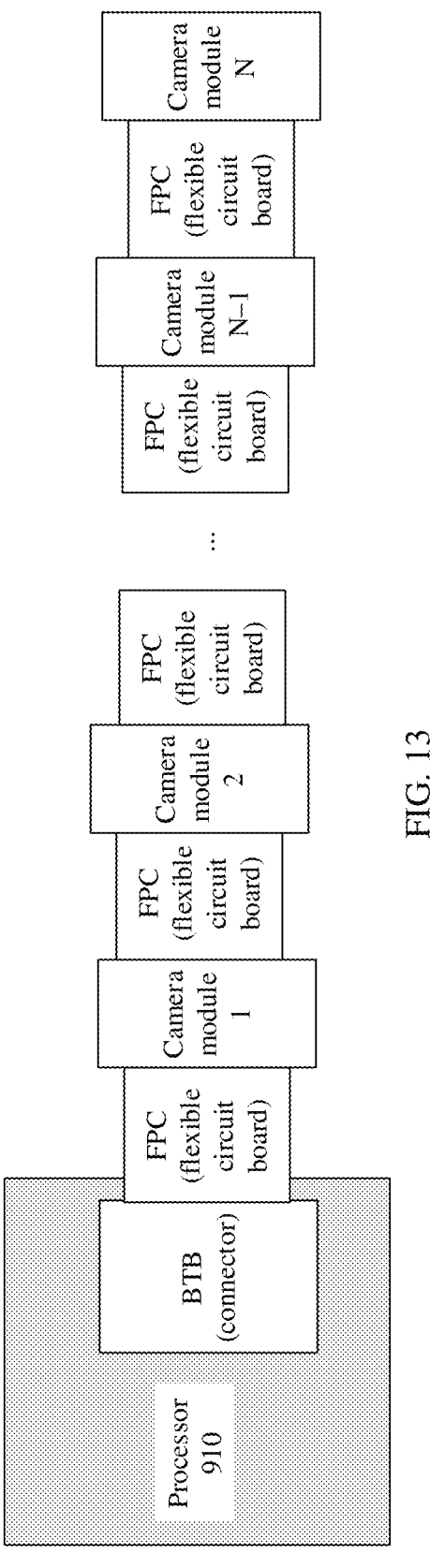
FIG. 13 is a schematic diagram of an engineering structure of a plurality of cascaded camera modules connected to a processor 910 according to an embodiment of this application.

FIG. 13 is a schematic diagram of an engineering structure of a plurality of cascaded camera modules connected to a processor 910.

Every two camera modules are connected by using a flexible circuit board (Flexible circuit board, FPC), and a first camera module is connected to a connector of the processor 910 by using a flexible circuit board.

Specifically, a camera module N is connected to a camera module N−1 by using an FPC. By analogy, a camera module 3 is connected to a camera module 2 by using an FPC, the camera module 2 is connected to a camera module 1 by using an FPC, and the camera module 1 is connected to a connector on the processor 910 side by using a flexible circuit board.

For example, when M is 2 and N is 5, the electronic device 100 has two front-facing camera modules and three rear-facing camera modules. Two front-facing camera modules are connected to three rear-facing camera modules in a cascade manner, and only one camera module (for example, one front-facing module) needs to be connected to the connector on the processor 910 side by using a flexible circuit board. In this way, the processor 910 only needs 10 differential signal lines to be connected to one camera module. When the processor 910 performs data transmission with the one camera module by using four data channels and one clock channel, only 10 differential signal lines are required on the processor 910 side. Compared with the conventional technology in which the processor 910 is separately connected to five camera modules in parallel, 40 differential signal lines are reduced on the processor 910 side.

Therefore, in this embodiment of this application, only one camera module needs to be connected to the processor 910, so that a quantity of interfaces and data pins of the processor 910 is reduced. Therefore, system integration of the processor 910 is facilitated. In addition, this facilitates later addition of a device, only the added device needs to be cascaded with existing devices, so that modification is simple.

The electronic device 100 may control the front-facing camera module and the rear-facing camera module to be enabled simultaneously.

In some embodiments, when a user wants to enable the rear-facing camera module to photograph a distant scene and also wants to enable the front-facing camera module to record an image of the user, the electronic device 100 may control the front-facing camera module and the rear-facing camera module to be enabled simultaneously.

When the front-facing camera module and the rear-facing camera module need to be enabled simultaneously, addresses of N camera modules are stored in the processor. The processor first finds the addresses of the N camera modules. Then, the inter-integrated circuit master (I2C Master) sends the addresses of the N camera modules to an inter-integrated circuit slaver (I2C Slaver) of each camera module through the I2C bus. After receiving the addresses of the N camera modules, each inter-integrated circuit slaver (I2C Slaver) compares the addresses with an address of a camera module of the inter-integrated circuit slaver. If an address of a camera module in the addresses of the N camera modules matches the address of the camera module of the inter-integrated circuit slaver, the N camera modules send confirmation information to the inter-integrated circuit master (I2C Master) by using the inter-integrated circuit slavers (I2C Slaver) through the I2C bus. After receiving the confirmation information, the inter-integrated circuit master (I2C Master) controls the N camera modules to be enabled.

When a camera module is enabled, an application layer, a CSI-2 protocol layer, and a data physical layer of the camera module are all enabled.

The electronic device 100 may control the front-facing camera module to be enabled or the rear-facing camera module to be enabled.

That the electronic device 100 controls the rear-facing camera module to be enabled is first described.

In some embodiments, the user may choose to enable only the rear-facing camera module to photograph a distant scene; or the user can choose to enable only the front-facing camera module to record an image of the user.

For example, the camera module 1 to the camera module M are front-facing camera modules, and the camera module M−1 to the camera module N are rear-facing camera modules. Certainly, the camera module 1 to the camera module M may alternatively be rear-facing camera modules, and the camera module M−1 to the camera module N are front-facing camera modules. This is not limited in this application.

When the user chooses to enable only the rear-facing camera module to photograph a distant scene, the processor 910 stores addresses of the N camera modules. The processor 910 first finds the addresses of the camera module M−1 to the camera module N. Then, the inter-integrated circuit master (I2C Master) sends the addresses of the camera module M−1 to the camera module N to the inter-integrated circuit slaver (I2C Slaver) of each camera module through the I2C bus. After receiving the addresses of the camera module M−1 to the camera module N, each inter-integrated circuit slaver (I2C Slaver) compares the addresses with an address of a camera module of the inter-integrated circuit slaver. If an address of a camera module in the addresses of the camera module M−1 to the camera module N matches the address of the camera module of the inter-integrated circuit slaver, the camera module M−1 to the camera module N send first confirmation information to the inter-integrated circuit master (I2C Master) by using respective inter-integrated circuit slavers (I2C Slaver) through the I2C bus. After receiving the first confirmation information, the inter-integrated circuit master (I2C Master) controls the camera module M−1 to the camera module N to be enabled. If none of the addresses of the camera module 1 to the camera module N matches an address of a camera module of the inter-integrated circuit slaver, none of the camera module 1 to the camera module N sends confirmation information to the inter-integrated circuit master (I2C Master), and none of the camera module 1 to the camera module N is enabled.

Because pixel data collected by the camera M−1 to the camera module N needs to be transmitted to the processor 910 through the camera module 1 to the camera module M, CSI-2 protocol layers and data physical layers of the camera module 1 to the camera module N need to be enabled, and none of application layers of the camera module 1 to the camera module N is enabled.

Specifically, after the inter-integrated circuit master (I2C Master) controls the camera module M−1 to the camera module N to be enabled, the inter-integrated circuit master (I2C Master) sends the addresses of the camera module 1 to the camera module M to inter-integrated circuit slavers (I2C Slaver) of the camera module 1 to the camera module M through the I2C bus. After receiving the addresses of the camera module 1 to the camera module M, the inter-integrated circuit slavers (I2C Slaver) of the camera module 1 to the camera module M compare the addresses with addresses of the inter-integrated circuit slavers of the camera module 1 to the camera module M. If one of the addresses of the camera module 1 to the camera module M matches an address of a camera module of the inter-integrated circuit slaver, the camera module 1 to the camera module N send second confirmation information to the inter-integrated circuit master (I2C Master) by using respective inter-integrated circuit slavers (I2C Slaver) through the I2C bus. After receiving the second confirmation information, the integrated circuit master (I2C Master) controls the CSI-2 protocol layers and the data physical layers of the camera module 1 to the camera module N to be enabled, and the application layers of the camera module 1 to the camera module N to be not enabled. In this way, it can be ensured that pixel data collected by the camera M−1 to the camera module N is transmitted to the processor through the camera module 1 to the camera module N, and energy consumption of the camera modules 1 to N can be reduced.

It should be noted that the processor may simultaneously control the camera module M−1 to the camera module N to be enabled and control the CSI-2 protocol layers and the data physical layers of the camera module 1 to the camera module N to be enabled. In this way, a response speed of the camera module and processing efficiency of the processor can be improved.

In some embodiments, the electronic device 100 may determine by default that CSI-2 protocol layers and data physical layers of the N camera modules from the camera module 1 to the camera module N are in an always enabled state. When the user chooses to enable only the rear-facing camera module to photograph a distant scene, the processor stores addresses of the N camera modules. The processor first finds addresses of the camera module M−1 to the camera module N. Then, the inter-integrated circuit master (I2C Master) sends the addresses of the camera module M−1 to the camera module N to each inter-integrated circuit slaver (I2C Slaver) through the I2C bus. After receiving the addresses of the camera module M−1 to the camera module N, each inter-integrated circuit slaver (I2C Slaver) compares the addresses with an address of a camera module of the inter-integrated circuit slaver. If an address of a camera module in the addresses of the camera module M−1 to the camera module N matches the address of the camera module of the inter-integrated circuit slaver, the camera module M−1 to the camera module N send third confirmation information to the inter-integrated circuit master (I2C Master) by using respective inter-integrated circuit slavers (I2C Slaver) through the I2C bus. After receiving the third confirmation information, the inter-integrated circuit master (I2C Master) controls the application layers of the camera module M−1 to the camera module N to be enabled. If none of the addresses of the camera module 1 to the camera module N matches an address of a camera module of the inter-integrated circuit slaver, none of the camera module 1 to the camera module N sends confirmation information to the inter-integrated circuit master (I2C Master), and none of the camera module 1 to the camera module N is enabled. Pixel data collected by the camera M−1 to the camera module N needs to be transmitted to the processor through the camera module 1 to the camera module N, but the CSI-2 protocol layers and the data physical layers of the camera module 1 to the camera module N are enabled, therefore, the integrated circuit master (I2C Master) does not need to enable the CSI-2 protocol layers and the data physical layers of the camera module 1 to the camera module N by configuring addresses. In this way, operation steps of the processor are reduced.

When the user only needs to enable a primary camera (for example, a camera module X, where X is greater than M and less than or equal to N) of the rear-facing camera module, the manner in which the electronic device 100 enables the camera module X is the same as the manner in which the electronic device 100 enables the rear-facing camera module, and details are not described herein again.

Next, that the electronic device 100 controls the rear-facing camera module to be enabled is described.

When the user chooses to enable only the front-facing camera module to record an image of the user, the processor stores addresses of the N camera modules. The processor first finds the addresses of the camera module 1 to the camera module M−1. Then, the inter-integrated circuit master (I2C Master) sends the addresses of the camera module 1 to the camera module M−1 to each inter-integrated circuit slaver (I2C Slaver) through the I2C bus. After receiving the addresses of the camera module 1 to the camera module M−1, each inter-integrated circuit slaver (I2C Slaver) compares the addresses with an address of a camera module of the inter-integrated circuit slaver. If an address of a camera module in the addresses of the camera module 1 to the camera module M−1 matches the address of the camera module of the inter-integrated circuit slaver, the camera module 1 to the camera module M−1 send fourth confirmation information to the inter-integrated circuit master (I2C Master) by using respective inter-integrated circuit slavers (I2C Slaver) through the I2C bus. After receiving the fourth confirmation information, the inter-integrated circuit master (I2C Master) controls the camera module 1 to the camera module M−1 to be enabled. If none of the addresses of the camera module M−1 to the camera module N matches an address of a camera module of the inter-integrated circuit slaver, none of the camera module M−1 to the camera module N sends confirmation information to the inter-integrated circuit master (I2C Master), and none of the camera module M−1 to the camera module N is enabled.

Because pixel data collected by the camera 1 to the camera module M−1 does not need to be transmitted to the processor through the camera module M−1 to the camera module N, none of the CSI-2 protocol layers and the data physical layers of the camera M−1 to the camera module N needs to be enabled.

The following describes a data packet transmission process from the camera module 1 to the camera module N.

Currently, when the N camera modules are connected to the processor by using a parallel structure, a format of a data packet of each camera module is shown in FIG. 14.

As shown in FIG. 14, a format of a data packet includes a packet header, a data packet, and a packet footer.

The packet header may include a data identifier, a data packet size (word count), error correcting code (ECC), and the like. The data packet includes pixel data to be transmitted. The packet footer includes data packet additional information, such as a verification codeword.

In this embodiment of this application, when the N camera modules are connected to the processor by using a cascaded structure, a data packet of the camera module N is transmitted to the processor through N−1 camera modules. To identify which camera module the data packet received by the processor is from, in this application, an identification field is added to a packet header in the data packet format, to identify a camera module to which the data packet belongs. For example, the field may be referred to as an HOP field. It may be understood that the field may be added at any location, for example, a data packet or a packet footer. A specific location of the identification field is not limited in this application.

FIG. 15 is a schematic diagram of a format of a data packet that includes an identification field (for example, an HOP field).

The data packet including an identification field shown in FIG. 15 may be applicable to the data packet described in the embodiments of FIG. 11 to FIG. 13.

As shown in FIG. 15, a format of a data packet includes a packet header, a data packet, and a packet footer.

The packet header may include a data identifier, a data packet size (word count), error correcting code (ECC), and the like. The packet header further includes an identification field (for example, an HOP field), and a value of the HOP field is used to identify a location of the camera module. That is, the processor may identify, based on the value of the HOP field in the packet header, which camera module the data packet is from.

In some embodiments, an identification field (for example, an HOP field) may be added to a tail of the packet header, or may be added to a header of the packet header, or may be added to a middle of the packet header. This is not limited herein.

The data packet includes pixel data to be transmitted. The packet footer includes data packet additional information, such as a verification codeword.

Figure 16:
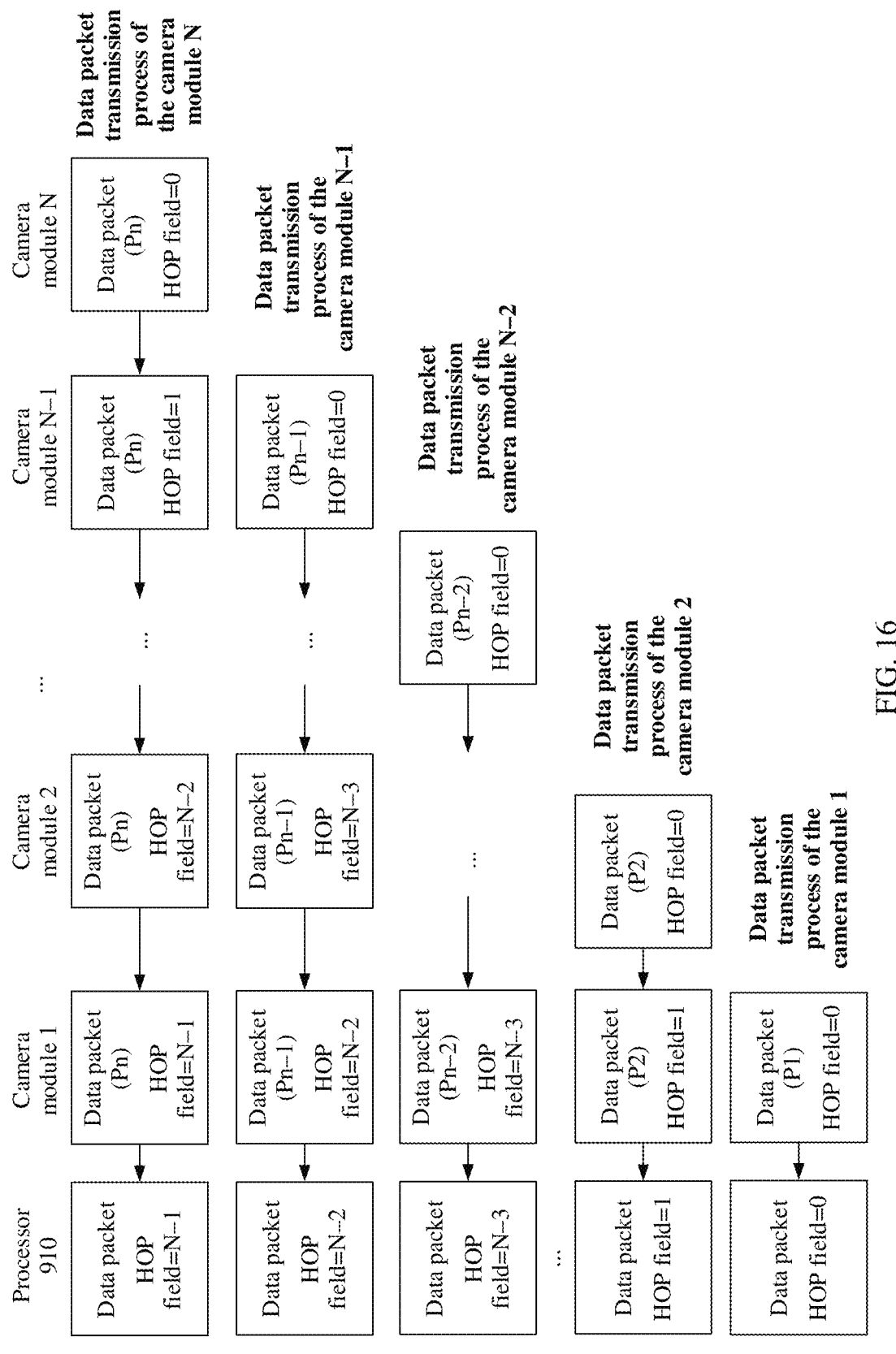
FIG. 16 is a data packet transmission process of N camera modules according to an embodiment of this application.

FIG. 16 shows an example of a data packet transmission process of N camera modules.

The data packet transmission process of the N camera modules shown in FIG. 16 may be applicable to the data packet transmission process described in the embodiment shown in FIG. 11.

For ease of description, a data packet of a camera module N is denoted as Pn, a data packet of a camera module N−1 is denoted as Pn−1. By analogy, a data packet of a camera module 2 is denoted as P2, and a data packet of a camera module 1 is denoted as P1.

For the Camera Module N:

The camera module N collects pixel data, packs the pixel data into a data packet (Pn), and sets a value of an identification field (an HOP field) in the Pn to 0, that is, the HOP field=0. Then, the camera module N transmits the Pn to a downlink interface of the camera module N−1 through an uplink interface and a data line N (lane N).

For example, when N is 5, the camera module 5 collects pixel data, packs the pixel data into a data packet (P5), and sets a value of an identification field (an HOP field) in the P5 to 0, that is, the HOP field=0. Then, the camera module 5 transmits the P5 to a downlink interface of a camera module 4 through an uplink interface and a data line 5 (lane 5).

For the Camera Module N−1:

Processing of Data of the Camera Module N−1:

The camera module N−1 collects pixel data, packs the pixel data into a data packet (Pn−1), and sets a value of an identification field (an HOP field) in the Pn−1 to 0, that is, the HOP field=0. Then, the camera module N−1 transmits the Pn−1 to a downlink interface of the camera module N−2 through an uplink interface and a data line N−1 (lane N−1).

For example, when N is 5, the camera module 4 collects pixel data, packs the pixel data into a data packet (P4), and sets a value of an identification field (an HOP field) in the P4 to 0, that is, the HOP field=0. Then, the camera module 4 transmits the P4 to a downlink interface of a camera module 3 through an uplink interface and a data line 4 (lane 4).

Processing of Pn:

The camera module N−1 receives the Pn through the downlink interface, and unpacks the Pn into a data block. Then, the camera module N−1 detects an HOP field of the data block of the camera module N, and adds 1 to the HOP field, so that the HOP field is 1. Then, the data block is packed into a data packet Pn. Then, the camera module N−1 transmits the Pn to the uplink interface of the camera module N−1 through the downlink interface. Finally, the Pn is transmitted from the uplink interface of the camera module N−1 to a downlink interface of a camera module N−2 through the data line N−1 (lane N−1).

It should be noted that the camera module N−1 may process the data of the camera module N−1 and process the Pn synchronously, to improve data transmission efficiency of each camera module.

For example, when N is 5, the camera module 4 receives the P5 through the downlink interface, and unpacks the P5 into a data block. Then the camera module 4 detects an HOP field of the data block of the camera module 5, and adds 1 to the HOP field, so that the HOP field is 1. Then, the data block is packed into a data packet P5. Then, the camera module 4 transmits the P5 to the uplink interface of the camera module 4 through the downlink interface. Finally, the P5 is transmitted from the uplink interface of the camera module 4 to a downlink interface of a camera module 3 through the data line 4 (lane 4).

For the Camera Module N-2:

Processing of Data of the Camera Module N-2:

The camera module N-2 collects pixel data, packs the pixel data into a data packet (Pn-2), and sets a value of an identification field (an HOP field) in the Pn-2 to 0, that is, the HOP field=0. Then, the camera module N-2 transmits the Pn-2 to a downlink interface of the camera module N-3 through an uplink interface and a data line N-2 (lane N-2).

For example, when N is 5, the camera module 3 collects pixel data, packs the pixel data into a data packet (P3), and sets a value of an identification field (an HOP field) in the P3 to 0, that is, the HOP field=0. Then, the camera module 3 transmits the P3 to a downlink interface of a camera module 2 through an uplink interface and a data line 3 (lane 3).

Processing of Pn-1:

The camera module N-2 receives the Pn-1 through the downlink interface, and unpacks the Pn-1 into a data block. Then, the camera module N-2 detects the HOP field of the data block of the camera module N-1, and adds 1 to the HOP field, so that the HOP field is 1. Then, the data block is packed into a data packet Pn-1. Then, the camera module N-2 transmits the Pn-1 to the uplink interface of the camera module N-2 through the downlink interface. Finally, the Pn-1 is transmitted from the uplink interface of the camera module N-2 to a downlink interface of a camera module N-3 through the data line N-2 (lane N-2).

For example, when N is 5, the camera module 3 receives the P4 through the downlink interface, and unpacks the P4 into a data block. Then the camera module 3 detects an HOP field of the data block of the camera module 4, and adds 1 to the HOP field, so that the HOP field is 1. Then, the data block is packed into a data packet P4. Then, the camera module 3 transmits the P4 to the uplink interface of the camera module 3 through the downlink interface. Finally, the P4 is transmitted from the uplink interface of the camera module 3 to a downlink interface of a camera module 2 through the data line 3 (lane 3).

Processing of Pn:

The camera module N-2 receives the Pn through the downlink interface, and unpacks the Pn into a data block. Then, the camera module N-2 detects the HOP field of the data block of the camera module N, and adds 1 to the HOP field, so that the HOP field is 2. Then, the data block is packed into a data packet Pn. Then, the camera module N-2 transmits the Pn to the uplink interface of the camera module N-2 through the downlink interface. Finally, the Pn is transmitted from the uplink interface of the camera module N-2 to a downlink interface of a camera module N-3 through the data line N-2 (lane N-2).

For example, when N is 5, the camera module 3 receives the P5 through the downlink interface, and unpacks the P5 into a data block. Then the camera module 3 detects an HOP field of the data block of the camera module 5, and adds 1 to the HOP field, so that the HOP field is 2. Then, the data block is packed into a data packet P5. Then, the camera module 3 transmits the P5 to the uplink interface of the camera module 3 through the downlink interface. Finally, the P5 is transmitted from the uplink interface of the camera module 3 to the downlink interface of the camera module 2 through the data line 3 (lane 3).

It should be noted that the camera module N-2 may process the data of the camera module N-2, process the Pn-1, and process the Pn synchronously, to improve data transmission efficiency of each camera module.

By analogy, for data processing processes of the camera module N-3, the camera module N-4, to the camera module 3, refer to the data processing process of the camera module N-2. Details are not described herein again in this application.

For the Camera Module 2:

Processing of Data of the Camera Module 2:

The camera module 2 collects pixel data, packs the pixel data into a data packet (P2), and sets a value of an identification field (an HOP field) in the P2 to 0, that is, the HOP field=0. Then, the camera module 2 transmits the P2 to a downlink interface of a camera module 1 through an uplink interface and a data line 2 (lane 2).

Processing of Pn to P3:

The camera module 2 receives the Pn to the P3 through the downlink interface, where there are N-2 data packets in total from the Pn to the P3. First, the Pn to the P3 are separately unpacked into data blocks, and the camera module 2 detects HOP fields of the camera module 3 to the camera module N. The HOP fields of the camera module 3 to the camera module N are separately added by 1, and then the camera module 2 packs the data blocks of the camera module 3 to the camera module N into data packets. Then, the camera module 2 transmits the Pn to the P3 to the uplink interface of the camera module 2 through the downlink interface. Finally, the Pn is transmitted from the uplink interface of the camera module 2 to the P3 to a downlink interface of the camera module 1 through the data line 2 (lane 2).

For example, when N is 5, the camera module 2 receives the P5 through the downlink interface, and unpacks the P5 into a data block. Then the camera module 2 detects an HOP field of the data block of the camera module 5, and adds 1 to the HOP field, so that the HOP field is 3. Then, the data block is packed into a data packet P5. Then, the camera module 2 transmits the P5 to the uplink interface of the camera module 2 through the downlink interface. Finally, the P5 is transmitted from the uplink interface of the camera module 2 to the downlink interface of the camera module 1 through the data line 2 (lane 2).

Similarly, when N is 5, the camera module 2 receives the P4 through the downlink interface, and unpacks the P4 into a data block. Then the camera module 2 detects an HOP field of the data block of the camera module 4, and adds 1 to the HOP field, so that the HOP field is 2. Then, the data block is packed into a data packet P4. Then, the camera module 2 transmits the P4 to the uplink interface of the camera module 2 through the downlink interface. Finally, the P4 is transmitted from the uplink interface of the camera module 2 to the downlink interface of the camera module 1 through the data line 2 (lane 2).

Similarly, when N is 5, the camera module 2 receives the P3 through the downlink interface, and unpacks the P3 into a data block. Then the camera module 2 detects an HOP field of the data block of the camera module 3, and adds 1 to the HOP field, so that the HOP field is 1. Then, the data block is packed into a data packet P3. Then, the camera module 2 transmits the P3 to the uplink interface of the camera module 2 through the downlink interface. Finally, the P3 is transmitted from the uplink interface of the camera module 2 to the downlink interface of the camera module 1 through the data line 2 (lane 2). It should be noted that the camera module 1 may process the data of the camera module 1 and process the Pn to the P3 synchronously, and this improves data transmission efficiency of each camera module.

For the Camera Module 1:

Processing of Data of the Camera Module 1:

The camera module 1 collects pixel data, packs the pixel data into a data packet (P1), and sets a value of an identification field (an HOP field) in the P1 to 0, that is, the HOP field=0. Then, the camera module 1 transmits the P1 to a downlink interface of a processor through an uplink interface and a data line 1 (lane 1).

Processing of Pn to P2:

The camera module 1 receives the Pn to the P2 through the downlink interface, where there are N−1 data packets in total from the Pn to the P2. First, the Pn to the P2 are separately unpacked into data blocks, and the camera module 1 detects HOP fields of the camera module 2 to the camera module N. The HOP fields of the camera module 2 to the camera module N are separately added by 1, and then the camera module 1 packs the data blocks of the camera module 2 to the camera module N into data packets. Then, the camera module 1 transmits the Pn to the P2 to the uplink interface of the camera module 1 through the downlink interface. Finally, the Pn to the P2 are transmitted from the uplink interface of the camera module 1 to the downlink interface of the processor through the data line 1 (lane 1).

For example, when N is 5, the camera module 1 receives the P5 through the downlink interface, and unpacks the P5 into a data block. Then the camera module 1 detects an HOP field of the data block of the camera module 5, and adds 1 to the HOP field, so that the HOP field is 4. Then, the data block is packed into a data packet P5. Then, the camera module 1 transmits the P5 to the uplink interface of the camera module 1 through the downlink interface. Finally, the P5 is transmitted from the uplink interface of the camera module 1 to the downlink interface of the processor through the data line 1 (lane 1).

Similarly, when N is 5, the camera module 1 receives the P4 through the downlink interface, and unpacks the P4 into a data block. Then the camera module 1 detects an HOP field of the data block of the camera module 4, and adds 1 to the HOP field, so that the HOP field is 3. Then, the data block is packed into a data packet P4. Then, the camera module 1 transmits the P4 to the uplink interface of the camera module 1 through the downlink interface. Finally, the P4 is transmitted from the uplink interface of the camera module 1 to the downlink interface of the processor through the data line 1 (lane 1).

Similarly, when N is 5, the camera module 1 receives the P3 through the downlink interface, and unpacks the P3 into a data block. Then the camera module 1 detects an HOP field of the data block of the camera module 3, and adds 1 to the HOP field, so that the HOP field is 2. Then, the data block is packed into a data packet P3. Then, the camera module 1 transmits the P3 to the uplink interface of the camera module 1 through the downlink interface. Finally, the P3 is transmitted from the uplink interface of the camera module 1 to the downlink interface of the processor through the data line 1 (lane 1).

Similarly, when N is 5, the camera module 1 receives the P2 through the downlink interface, and unpacks the P2 into a data block. Then the camera module 1 detects an HOP field of the data block of the camera module 2, and adds 1 to the HOP field, so that the HOP field is 1. Then, the data block is packed into a data packet P2. Then, the camera module 1 transmits the P2 to the uplink interface of the camera module 1 through the downlink interface. Finally, the P2 is transmitted from the uplink interface of the camera module 1 to the downlink interface of the processor through the data line 1 (lane 1).

It should be noted that the camera module 1 may process the data of the camera module 1 and process the Pn to the P2 synchronously, and this improves data transmission efficiency of each camera module.

Figure 17A:
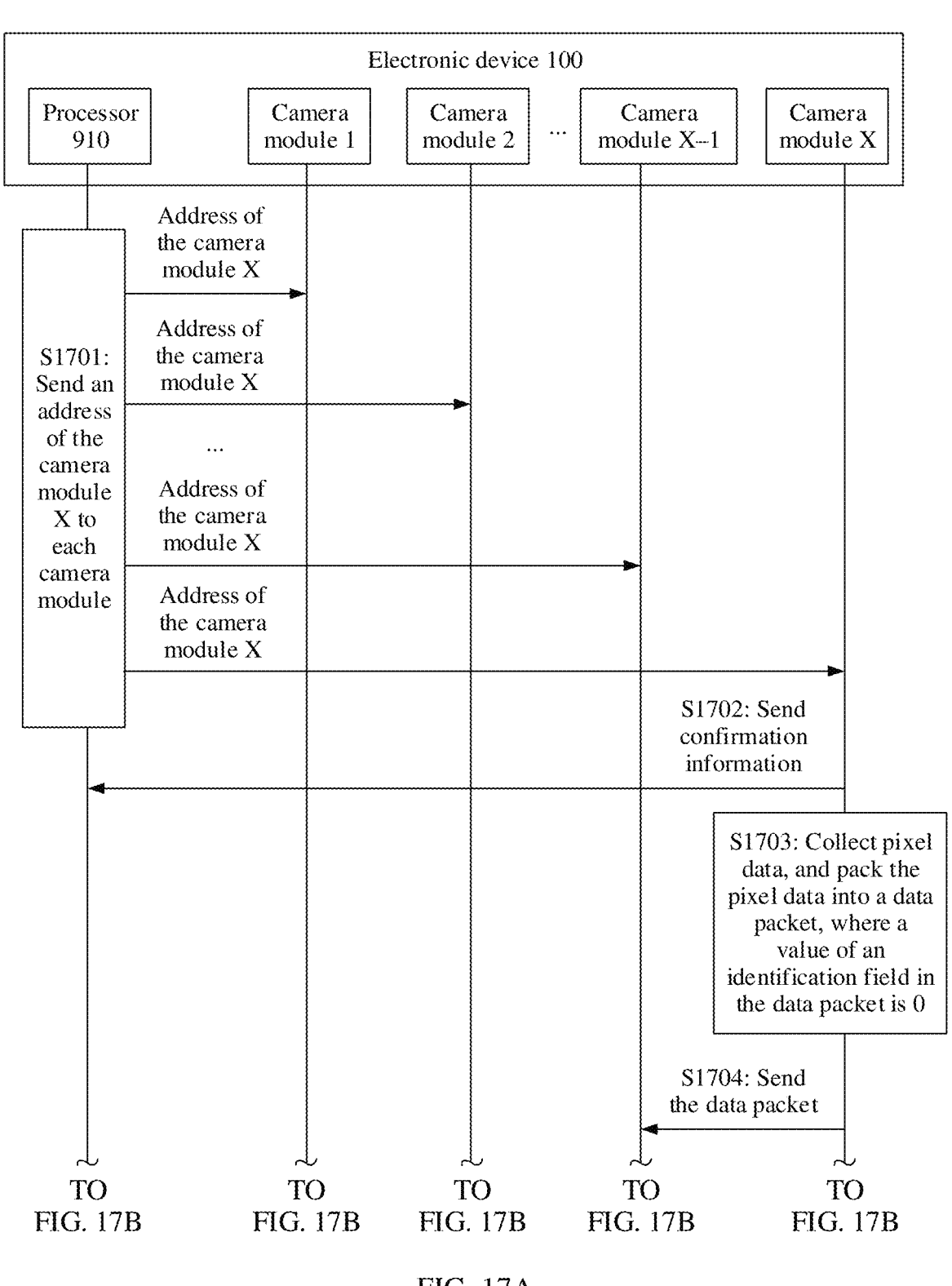
FIG. 17A and FIG. 17B are a flowchart of a data transmission method according to an embodiment of this application.
Figure 17B:
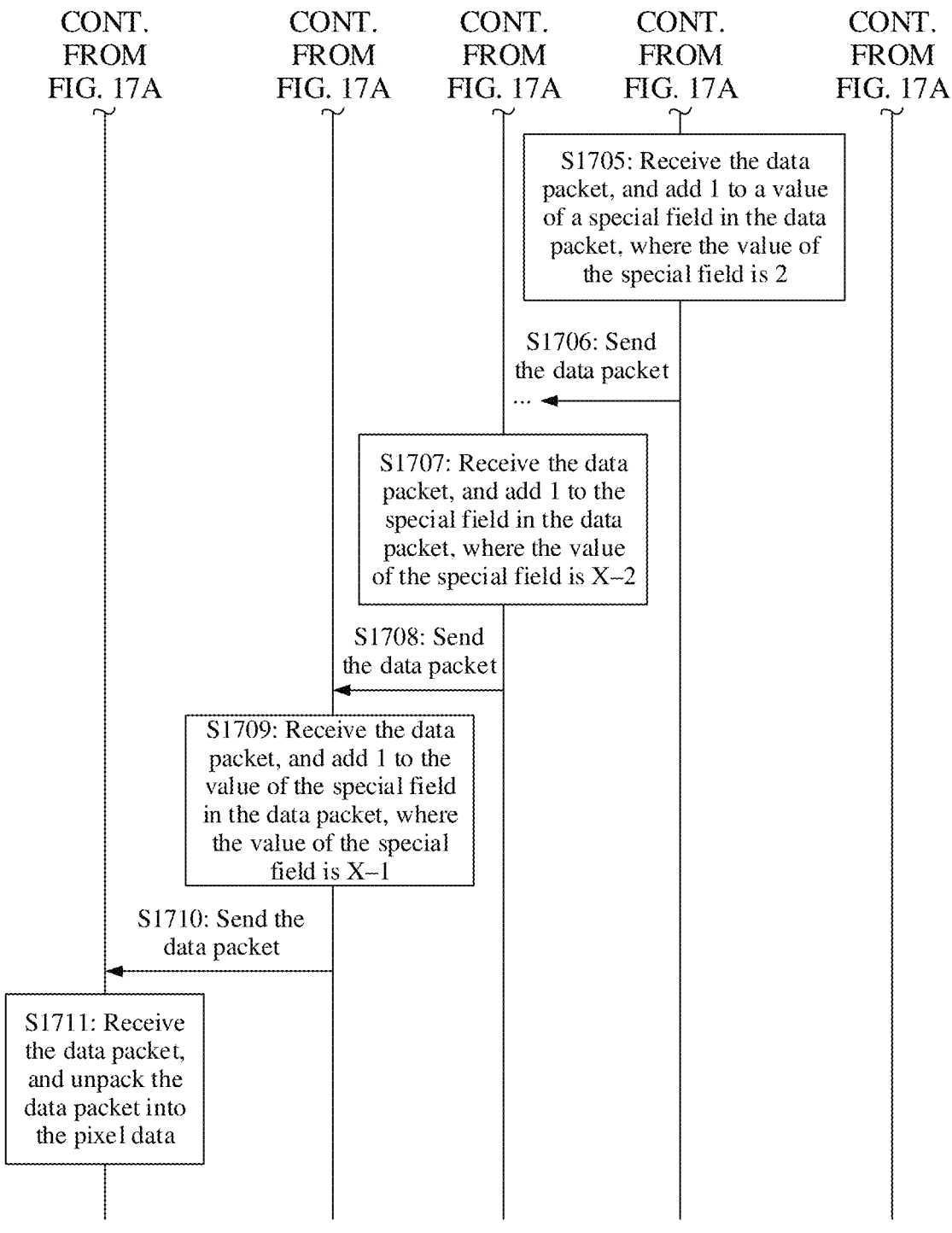

FIG. 17A and FIG. 17B are a flowchart of a data transmission method according to an embodiment of this application.

The data transmission method shown in FIG. 17A and FIG. 17B may be applied to a data packet transmission process in which a plurality of camera modules are cascaded in the multi-camera module cascaded structure shown in FIG. 11.

In some implementations, when a user needs to enable only a primary camera (for example, a camera module X, where X is a positive integer greater than M and less than or equal to N) in a rear-facing camera module to photograph a distant scene, the following describes a process in which pixel data collected by the camera module X is transmitted to a processor 910.

Because a data packet of the camera module X needs to be transmitted to the processor 910 by using CSI-2 protocol layers and data physical layers of a camera module 1 to a camera module X−1, the CSI-2 protocol layers and the data physical layers of the camera module 1 to the camera module X−1 need to be enabled, and none of application layers of the camera module 1 to the camera module X−1 is enabled.

For example, when X is 3, M is 2, and N is 5, after a camera module 3 is enabled and collects pixel data, a data packet of the camera module 3 needs to be transmitted to the processor 910 by using the CSI-2 protocol layers and the data physical layers of the camera module 1 and the camera module 2. Therefore, the CSI-2 protocol layers and the data physical layers of the camera module 1 and the camera module 2 need to be enabled, and neither of the application layers of the camera module 1 and the camera module 2 is enabled.

S1701: The processor 910 sends an address of the camera module X to each camera module.

An electronic device 100 stores an address of each camera module, and the electronic device 100 may control a camera module to be enabled or disabled based on the address of the camera module.

When a user requests to enable the primary camera (for example, the camera module X) in the rear-facing camera module, the processor 910 first obtains the address of the camera module X, and sends the address of the camera module X to each camera module. If N camera modules are disposed in the electronic device 100, the processor 910 separately sends the address of the camera module X to the N camera modules.

For example, when the user requests to enable the camera module 3 in the rear-facing camera module, the processor 910 first obtains an address of the camera module 3, and sends the address of the camera module 3 to each camera module. If five camera modules are disposed in the electronic device 100, the processor 910 separately sends the address of the camera module 3 to the five camera modules.

S1702: The camera module X sends confirmation information to the processor 910.

After the N camera modules receive the address of the camera module X, each camera module matches the received address of the camera module X with an address of the camera module. If the address of the camera module X does not match the address of the camera module, the camera module does not make any response. If the address of the camera module X matches the address of the camera modules, the camera module X sends the confirmation information to the processor 910.

The processor 910 receives and responds to the confirmation information sent by the camera module X, and the processor 910 controls the camera module X to be enabled. When the camera module X is enabled, an application layer, a CSI-2 protocol layer, and a data physical layer of the camera module X are all enabled.

For example, after the five camera modules receive the address of the camera module 3, each camera module matches the received address of the camera module 3 with an address of the camera module. If the address of the camera module 3 does not match the address of the camera module, the camera module does not make any response. If the address of the camera module 3 matches the address of the camera modules, the camera module 3 sends the confirmation information to the processor 910.

The processor 910 receives and responds to the confirmation information sent by the camera module 3, and the processor 910 controls the camera module 3 to be enabled. When the camera module 3 is enabled, an application layer, a CSI-2 protocol layer, and a data physical layer of the camera module 3 are all enabled.

S1703: The camera module X starts to collect pixel data, and packs the pixel data into a data packet, where a value of an identification field in the data packet is 0.

For example, the camera module 3 starts to collect pixel data, and packs the pixel data into a data packet.

To enable the processor 910 to identify a camera module to which the data packet belongs, an identification field is added to the data packet. Specifically, for a format of the data packet to which the identification field is added, refer to the embodiment shown in FIG. 15. Details are not described herein again in this application.

The camera module X sets a value of an identification field of a current-level data packet to 0.

For example, the camera module 3 sets a value of an identification field of a current-level data packet to 0.

S1704: The camera module X sends the data packet to the camera module X−1.

For example, the camera module 3 sends the data packet to the camera module 2.

S1705: The camera module X−1 receives the data packet, and adds 1 to the value of the identification field in the data packet of the camera module X.

The camera module X−1 receives the data packet of the camera module X sent by the camera module X, and first unpacks the data packet of the camera module X into a data block. The camera module X−1 detects the identification field of the camera module X, and adds 1 to the value of the identification field in the data packet of the camera module X. In this case, the value of the identification field in the data packet of the camera module X is 1, and the camera module X−1 packs the data block of the camera module X into a data packet.

S1706: The camera module X−1 sends the data packet of the camera module X to a camera module X−2.

By analogy, each camera module transmits the data packet of the camera module X to a next-level camera module, and each level of camera module adds 1 to the value of the identification field in the received data packet.

S1707: The camera module 2 receives the data packet of the camera module 3, and adds 1 to the value of identification field in the data packet of the camera module X, where the value of the identification field is X−2.

The camera module 2 receives the data packet of the camera module X sent by the camera module 3, and first unpacks the data packet of the camera module X into a data block. The camera module X−1 detects the identification field of the camera module X, and adds 1 to the value of the identification field in the data packet of the camera module X. In this case, the value of the identification field in the data packet of the camera module X is X−2, and the camera module 2 packs the data block of the camera module 3 into a data packet.

For example, the camera module 2 receives the data packet of the camera module 3 sent by the camera module 3, and first unpacks the data packet of the camera module 3 into a data block. The camera module 2 detects the identification field of the camera module 3, and adds 1 to the value of the identification field in the data packet of the camera module 3. In this case, the value of the identification field in the data packet of the camera module 3 is 1, and the camera module 2 packs the data block of the camera module 3 into a data packet.

S1708: The camera module 2 sends the data packet of the camera module X to a camera module 1.

For example, the camera module 2 sends the data packet of the camera module 3 to the camera module 1.

S1709: The camera module 1 receives the data packet, and adds 1 to the value of the identification field in the data packet of the camera module X.

The camera module 1 receives the data packet of the camera module X sent by the camera module 2, and first unpacks the data packet of the camera module X into a data block. The camera module X−1 detects the identification field of the camera module X, and adds 1 to the value of the identification field in the data packet of the camera module X. In this case, the value of the identification field in the data packet of the camera module X is X−1.

For example, the camera module 1 receives the data packet of the camera module 3 sent by the camera module 2, and first unpacks the data packet of the camera module 3 into a data block. The camera module 1 detects the identification field of the camera module 3, and adds 1 to the value of the identification field in the data packet of the camera module 3. In this case, the value of the identification field in the data packet of the camera module 3 is 2, and then, the camera module 1 packs the data block into a data packet.

S1710: The camera module 1 sends the data packet of the camera module X to the processor 910.

For example, the camera module 1 sends the data packet of the camera module 3 to the processor 910.

S1711: The processor 910 receives the data packet of the camera module X sent by the camera module 1, and the processor 910 may identify, based on the value of the identification field in the data packet, a camera module to which the data packet belongs.

When the value of the identification field in the data packet received by the processor 910 is X−1, the data packet belongs to the camera module X. When the value of the identification field in the data packet received by the processor 910 is N−1, the data packet belongs to the camera module N.

For example, when the value of the identification field in the data packet received by the processor 910 is 2, the data packet belongs to the camera module 3.

The processor 910 unpacks the data packet into an encoded data block by using the CSI-2 protocol layer. Then, the CSI-2 protocol layer transmits the encoded pixel data to the application layer. The application layer may be configured to decode the encoded pixel data to obtain the pixel data. Then, the application layer performs operations such as pixel data compression, pixel data combination, and image compression on the pixel data. For example, when a user photographs a distant scene and presses a shooting button, the application layer integrates pixel data into a picture, and saves the picture to a gallery of the electronic device 100.

In some embodiments, the user wants to add a rear-facing camera module to the electronic device 100. For ease of description, a camera module that needs to be added is referred to as a camera module N+1. In this case, the user only needs to connect an uplink interface of the camera module N+1 to a downlink interface of a camera module N, and a downlink interface of the camera module N+1 is not connected. After the camera module N+1 is enabled and collects pixel data, the camera module N+1 packs the collected pixel data into a data packet, and the camera module N+1-sets a value of an identification field in the data packet to 0. Then, the camera module N+1 transmits the data packet to the camera module N through the uplink interface of the camera module N+1 and a data line N+1. Then, the data packet of the camera module N+1 is transmitted to the processor 910 through the camera module N to the camera module 1. After the data packet of the camera module N+1 is transmitted to the processor 910, the value of the identification field in the data packet of the camera module N+1 is N, and the processor may determine, based on the value N of the identification field in the data packet, that the data packet is from the camera module N+1. For a process in which the data packet of the camera module N+1 is transmitted to the processor 910 through the camera module N to the camera module 1, refer to the embodiment shown in FIG. 16. Details are not described herein again in this application.

It can be learned from the foregoing embodiment that, when the user wants to add a camera module, the user only needs to connect the camera module that needs to be added with existing camera modules in a cascade manner, and a line connection relationship between the processor and the camera module does not need to be changed. Therefore, an operation is simple.

In some application scenarios, the electronic device 100 is configured with a plurality of camera modules, and the plurality of camera modules may include a plurality of front-facing camera modules and a plurality of rear-facing camera modules. The plurality of front-facing camera modules are connected in a cascade manner, the plurality of rear-facing camera modules are connected in a cascade manner, and the plurality of front-facing camera modules and the plurality of rear-facing camera modules are connected in parallel to an analog switch. The electronic device 100 may control, by using the analog switch, the plurality of front-facing camera modules to be enabled or the plurality of rear-facing camera modules to be enabled.

In the foregoing embodiment, the plurality of camera modules are connected in a cascade manner. It can be learned that if a camera module 1 to a camera module M are front-facing camera modules, and a camera module M−1 to a camera module N are rear-facing camera modules, when a user chooses to enable only the rear-facing camera modules to photograph a distant scene, the rear-facing camera modules from the camera M−1 to the camera module N are enabled, and none of the camera module 1 to the camera module M is enabled. Because pixel data collected by the camera M−1 to the camera module N needs to be transmitted to the processor through the camera module 1 to the camera module N, CSI-2 protocol layers and data physical layers of the camera module 1 to the camera module N need to be enabled.

The CSI-2 protocol layers and the data physical layers of the camera module 1 to the camera module N may be enabled in the following manners:

Manner 1: After the camera M−1 to the camera module N are enabled, the processor sends a control signal to control the CSI-2 protocol layers and the data physical layers of the camera module 1 to the camera module N to be enabled.

Manner 2: The CSI-2 protocol layers and data physical layers of the camera module 1 to the camera module N are always enabled by default. Then, the processor sends a control signal to control application layers of the camera M−1 to the camera module N to be enabled.

It can be learned from the foregoing manners that an operation in Manner 1 is complex, and the processor needs to send a control signal to control enabling of the CSI-2 protocol layers and the data physical layers of the camera module 1 to the camera module N; and the CSI-2 protocol layers and the data physical layers of the camera module 1 to the camera module N are always enabled by default in Manner 2, so that consumption of the camera modules increases.

Therefore, in the following embodiments of this application, the front-facing camera modules are separated from the rear-facing camera modules, and the front-facing camera modules or the rear-facing camera modules are selected to be enabled by using an analog switch.

Figure 18:
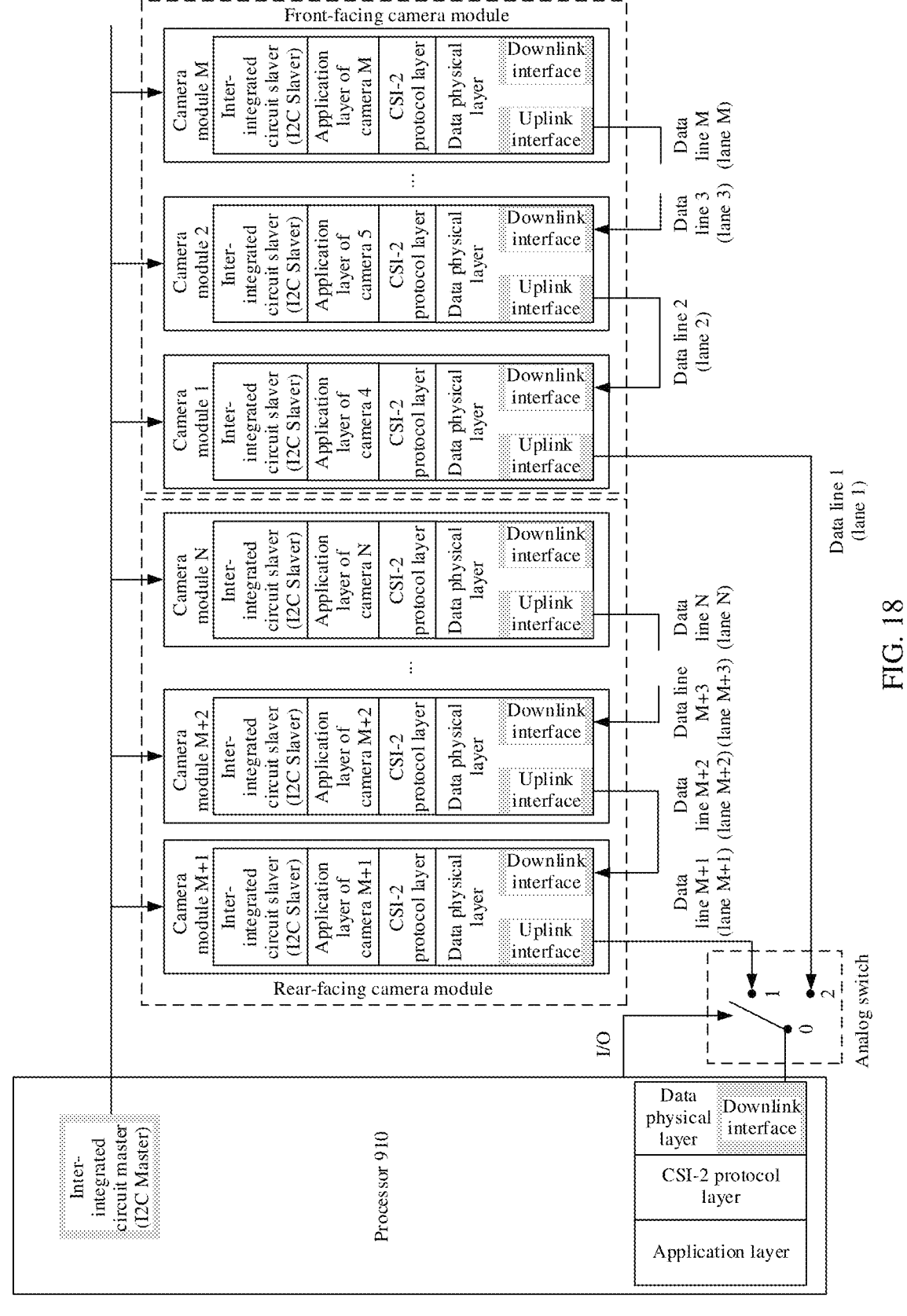
FIG. 18 is a system diagram of another cascaded connection of camera modules according to an embodiment of this application.

FIG. 18 is a system diagram of another cascaded connection of camera modules.

As shown in FIG. 18, a system includes a rear-facing camera module, a front-facing camera module, an analog switch, and a processor.

The front-facing camera module includes M camera modules such as a camera module 1, a camera module 2, . . . , and a camera module M. The rear-facing camera module includes N−M camera modules such as a camera module M+1, a camera module M+2, . . . , and a camera module N.

For the description of structures of the rear-facing camera module, the front-facing camera module, and the processor, refer to the foregoing embodiments. Details are not described herein again in this application.

As shown in FIG. 18, for the front-facing camera module, a downlink interface of the camera module M is not connected, an uplink interface of the camera module M is connected to a downlink interface of the camera module M−1. By analogy, a downlink interface of the camera module 2 is connected to an uplink interface of the camera module 3. An uplink interface of the camera module 2 is connected to a downlink interface of the camera module 1, and an uplink interface of the camera module 1 is connected to a contact 2 (a second contact) of the analog switch.

For the rear-facing camera module, a downlink interface of the camera module N is not connected, an uplink interface of the camera module N is connected to a downlink interface of the camera module N−1. By analogy, a downlink interface of the camera module M+2 is connected to an uplink interface of the camera module M+3. An uplink interface of the camera module M+2 is connected to a downlink interface of the camera module M+1, and an uplink interface of the camera module M+1 is connected to a contact 1 (a first contact) of the analog switch.

A contact 0 (a third contact) of the analog switch is connected to a downlink interface of the processor.

When a user only needs to enable the rear-facing camera module to photograph a distant scene, the processor sends a control signal by using an I/O pin to control the contact point 0 (the third contact) of the analog switch to be connected to the contact point 1 (the first contact) of the analog switch. In this way, the processor can receive pixel data from the rear-facing camera module (the camera module M+1, the camera module M+2, . . . , and the camera module N).

For a process in which the pixel data of the rear-facing camera module (the camera module M+1, the camera module M+2, . . . , and the camera module N) is transmitted to the processor, refer to Embodiment 1, and details are not described herein again.

When the user only needs to enable the front-facing camera module to record an image of the user, the processor sends a control signal by using the I/O pin to control the contact point 0 (the third contact) of the analog switch to be connected to the contact point 2 (the second contact) of the analog switch. In this way, the processor can receive pixel data from the front-facing camera module (the camera module M+1, the camera module M+2, . . . , and the camera module M).

For a process in which the pixel data of the front-facing camera module (the camera module 1, the camera module 2, . . . , and the camera module M) is transmitted to the processor, refer to Embodiment 1, and details are not described herein again.

Figure 19:
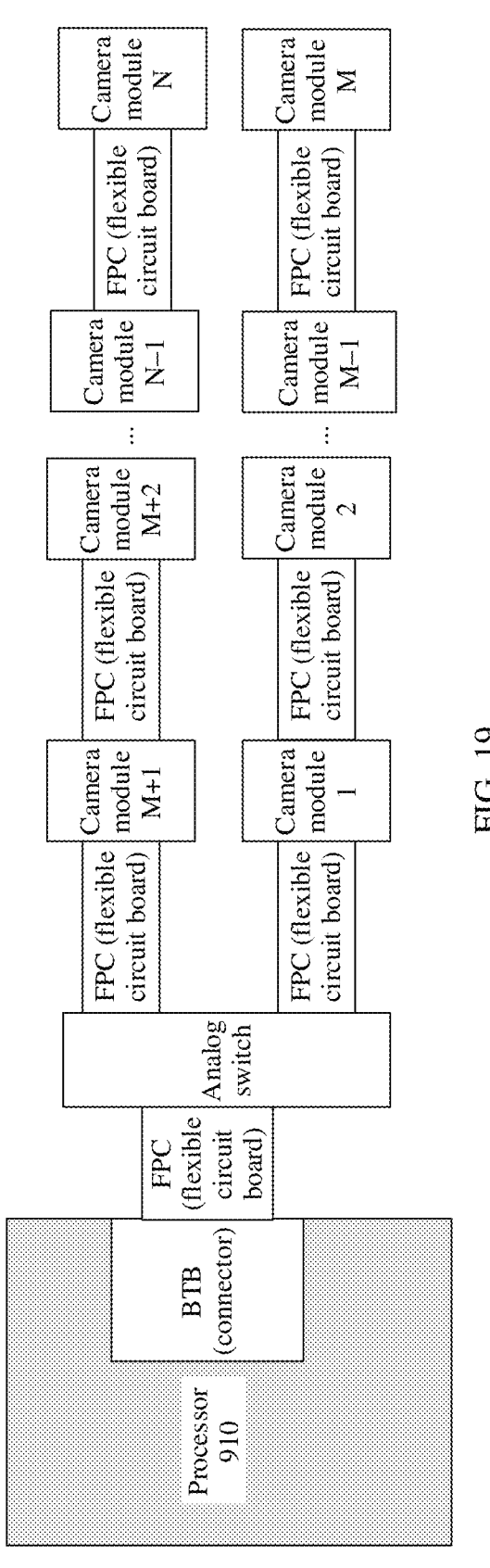
FIG. 19 is a schematic diagram of an engineering structure of a plurality of cascaded camera modules connected to a processor 910 by using an analog switch according to an embodiment of this application.

FIG. 19 is a schematic diagram of an engineering structure of a plurality of cascaded camera modules connected to a processor 910 by using an analog switch.

A front-facing camera module is connected to a first contact of the analog switch. A rear-facing camera module is connected to a second contact of the analog switch. A third contact of the analog switch is connected to the processor 910.

There are M front-facing camera modules and N−M rear-facing camera modules.

Specifically, for the front-facing camera module, a camera module M is connected to a camera module M−1 by using a flexible circuit board. By analogy, a camera module M+2 is connected to a camera module M+1 by using a flexible circuit board, and the camera module M+1 is connected to the second contact of the analog switch.

For the rear-facing camera module, a camera module N is connected to the camera module M−1 by using a flexible circuit board (Flexible circuit board, FPC). By analogy, a camera module 2 is connected to a camera module 1 by using a flexible circuit board, and the camera module 1 is connected to the first contact of the analog switch.

A third contact of the analog switch is connected to a connector on the processor 910 side by using a flexible circuit board.

In this way, the front-facing camera modules are separated from the rear-facing camera modules, and the front-facing camera modules or the rear-facing camera modules are selected to be enabled by using the analog switch. Therefore, operations of the processor 910 can be reduced, and unnecessary consumption of camera modules can be reduced.

Figure 20A:
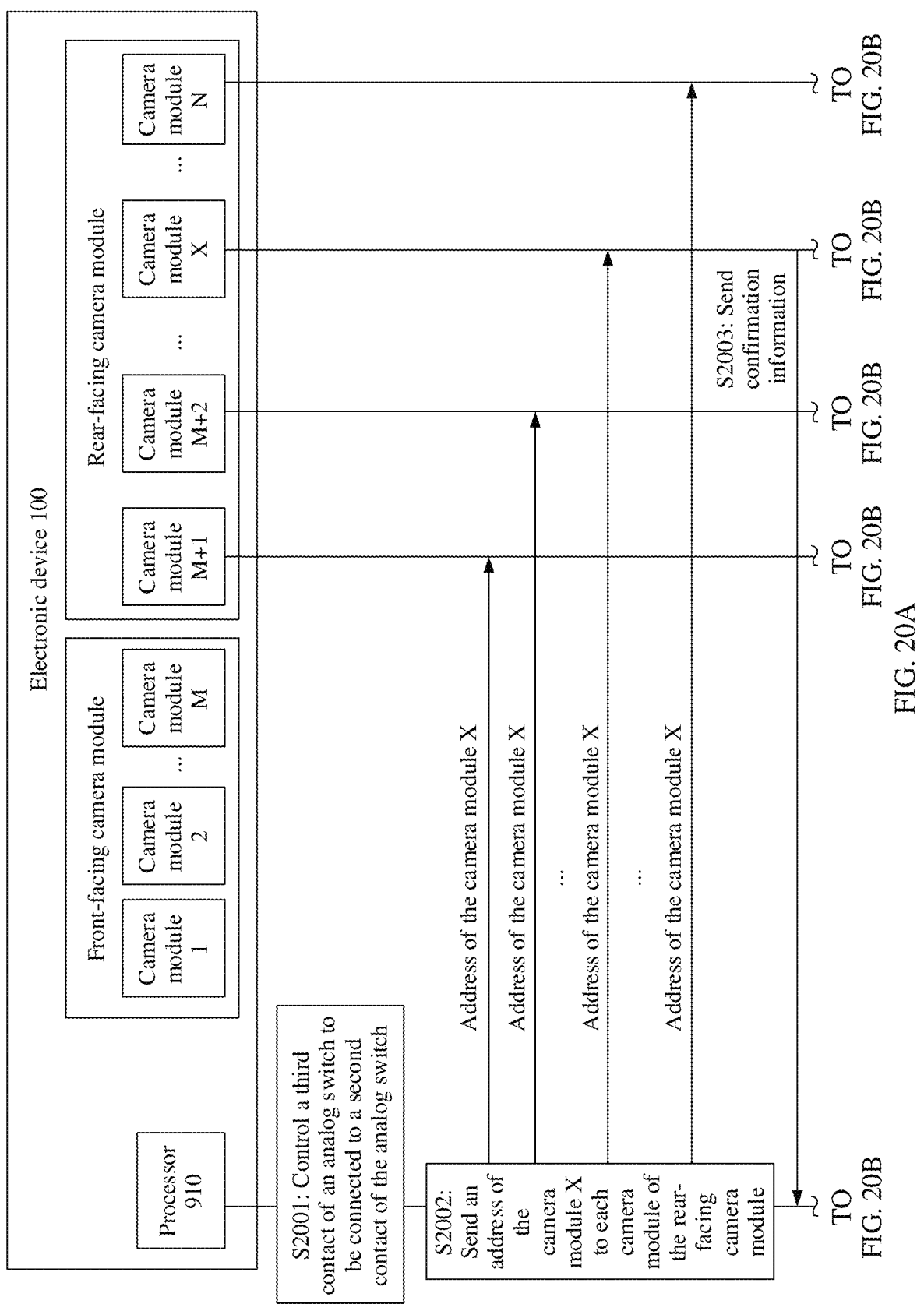
FIG. 20A and FIG. 20B are a flowchart of another data transmission method according to an embodiment of this application.
Figure 20B:
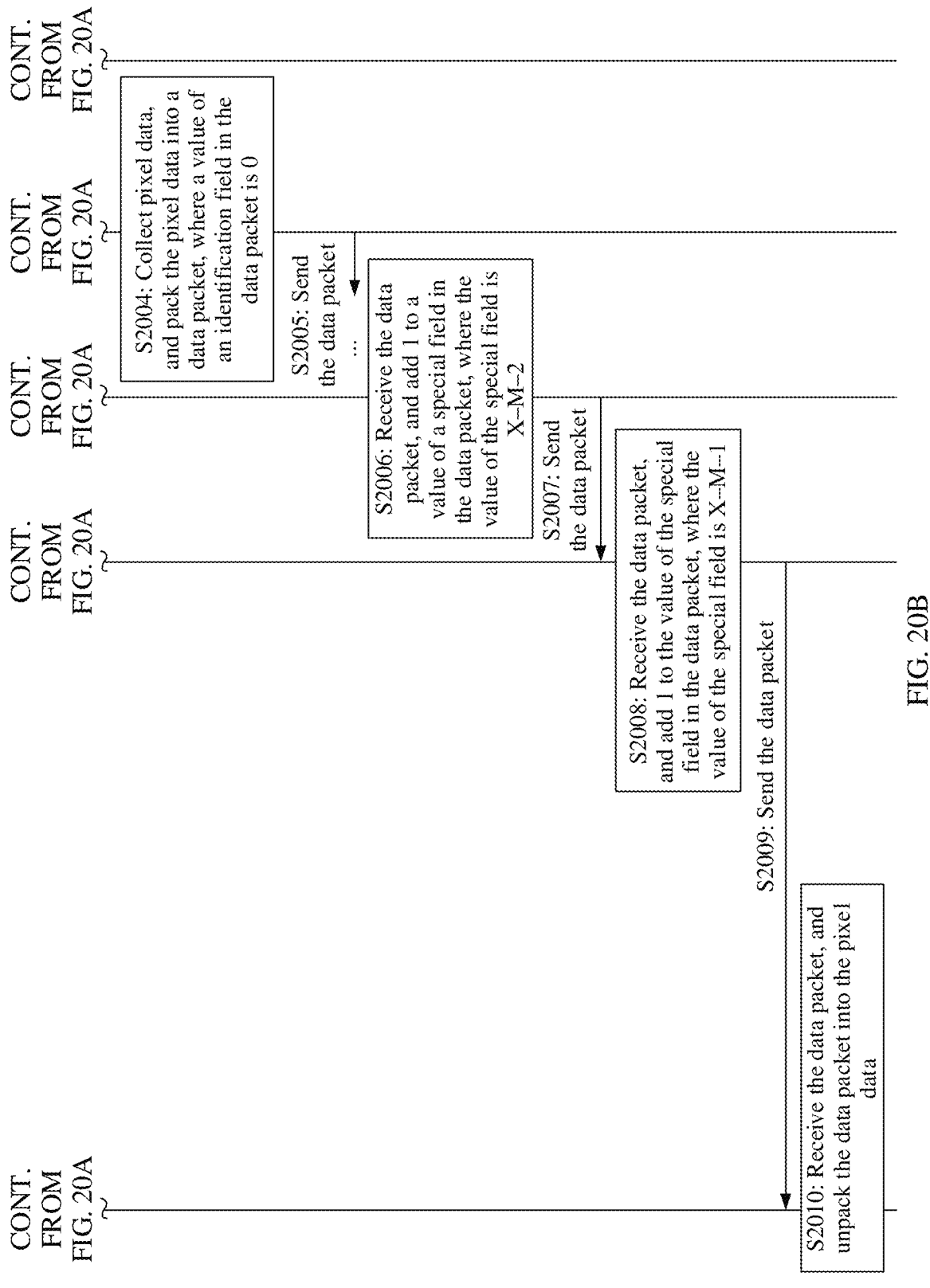

FIG. 20A and FIG. 20B are a flowchart of another data transmission method according to Embodiment 2 of this application.

An electronic device 100 is provided with a front-facing camera module and a rear-facing camera module. The front-facing camera module includes M camera modules such as a camera module 1, a camera module 2, . . . , and a camera module M. The rear-facing camera module includes N−M camera modules such as a camera module M+1, a camera module M+2, . . . , a camera module X, . . . , and a camera module N.

For example, when X is 4, M is 2, and N is 5, the front-facing camera module includes two camera modules, such as a camera module 1 and a camera module 2. The rear-facing camera module includes 3 camera modules, such as a camera module 3, a camera module 4, and a camera module 5.

The front-facing camera module and the rear-facing camera module are connected by using an analog switch. For details, refer to the embodiment shown in FIG. 18. Details are not described herein again in this application.

When a user only needs to enable a primary camera (for example, a camera module X, where X is a positive integer greater than M and less than or equal to N) in the rear-facing camera module to photograph a distant scene, the following describes a process in which pixel data collected by the camera module X is transmitted to a processor 910.

S2001: The processor 910 controls a third contact of the analog switch to be connected to a second contact of the analog switch.

In this way, the electronic device 100 may enable one or more camera modules of the rear-facing camera module through address configuration.

In some embodiments, the processor 910 may also control the second contact of the analog switch to be connected to a first contact of the analog switch. In this way, the electronic device 100 may enable one or more camera modules of the front-facing camera module through address configuration.

S2002: The processor 910 sends an address of the camera module X to each camera module of the rear-facing camera module.

Because a data packet of the camera module X needs to be transmitted to the processor 910 by using CSI-2 protocol layers and data physical layers of the camera module M+1 to the camera module X−1, the CSI-2 protocol layers and the data physical layers of the camera module 1 to the camera module X−1 need to be enabled, and none of application layers of the camera module 1 to the camera module X−1 is enabled. None of CSI-2 protocol layers, data physical layers, and application layers of the camera module X+1 to the camera module N is enabled.

For example, when X is 4, M is 2, and N is 5, after the camera module 4 is enabled and collects pixel data, a data packet of the camera module 4 needs to be transmitted to the processor 910 by using a CSI-2 protocol layer and a data physical layer of the camera module 3. Therefore, the CSI-2 protocol layer and the data physical layer of the camera module 3 need to be enabled, and an application layer of the camera module 3 is not enabled.

The electronic device 100 stores an address of each camera module, and the electronic device 100 may control a camera module to be enabled or disabled based on the address of the camera module.

When the user requests to enable the primary camera (for example, the camera module X) in the rear-facing camera module, the processor 910 first obtains the address of the camera module X, and sends the address of the camera module X to N−M camera modules from the camera module M+1 to the camera module N.

For example, when the user requests to enable the camera module 4 in the rear-facing camera module, the processor 910 first obtains an address of the camera module 4, and sends the address of the camera module 4 to three camera modules: the camera module 3, the camera module 4, and the camera module 5.

S2003: The camera module X sends confirmation information to the processor 910.

After the N–M camera modules from the camera module M+1 to the camera module N receive the address of the camera module X, the N–M camera modules from the camera module M+1 to the camera module N match the received address of the camera module X with an address of each camera module. If the address of the camera module X does not match the address of each camera module, the camera module does not make any response. If the address of the camera module X matches the address of each camera module, the camera module X sends the confirmation information to the processor 910.

The processor 910 receives and responds to the confirmation information sent by the camera module X, and the processor 910 controls the camera module X to be enabled. When the camera module X is enabled, an application layer, a CSI-2 protocol layer, and a data physical layer of the camera module X are all enabled.

For example, after the 3 camera modules from the camera module 3 to the camera module 5 receive the address of the camera module 4, the 3 camera modules from the camera module 3 to the camera module 5 match the received address of the camera module 4 with an address of each camera module. If the address of the camera module 4 does not match the address of each camera module, the camera module does not make any response. If the address of the camera module 4 matches the address of each camera module, the camera module 4 sends the confirmation information to the processor 910.

The processor 910 receives and responds to the confirmation information sent by the camera module 4, and the processor 910 controls the camera module 4 to be enabled. When the camera module 4 is enabled, an application layer, a CSI-2 protocol layer, and a data physical layer of the camera module 4 are all enabled.

S2004: The camera module X starts to collect pixel data, and packs the pixel data into a data packet, where a value of an identification field in the data packet is 0.

To enable the processor 910 to identify a camera module to which the data packet belongs, an identification field is added to the data packet. Specifically, for a format of the data packet to which the identification field is added, refer to the embodiment shown in FIG. 15. Details are not described herein again in this application.

The camera module X sets a value of an identification field of a current-level data packet to 0.

For example, the camera module 4 starts to collect pixel data, packs the pixel data into a data packet, and sets a value of an identification field in the data packet to 0.

S2005: The camera module X sends the data packet to the camera module X–1.

The camera module X–1 receives the data packet of the camera module X sent by the camera module X, and first unpacks the data packet of the camera module X into a data block. The camera module X–1 detects the identification field of the camera module X, and adds 1 to the value of the identification field in the data packet of the camera module X. In this case, the value of the identification field in the data packet of the camera module X is 2, and the camera module X–1 packs the data block of the camera module X into a data packet.

By analogy, each camera module transmits the data packet of the camera module X to a next-level camera module, and each level of camera module adds 1 to the value of the identification field in the received data packet.

S2006: The camera module M+2 receives a data packet, and adds 1 to the value of the identification field in the data packet, where the value of the identification field is X–M–2.

S2007: The camera module M+2 sends the data packet to the camera module M+1.

S2008: The camera module M+1 receives the data packet, and adds 1 to the value of the identification field in the data packet, where the value of the identification field is X–M–1.

For example, the camera module 3 receives the data packet of the camera module 4 sent by the camera module 4, and first unpacks the data packet of the camera module 4 into a data block. The camera module 3 detects the identification field of the camera module 4, and adds 1 to the value of the identification field in the data packet of the camera module 4. In this case, the value of the identification field in the data packet of the camera module 3 is 1. Then, the camera module 3 packs the data block into a data packet.

S2009: The camera module M+1 sends the data packet to the processor 910.

S2010: The processor 910 receives the data packet of the camera module X sent by the camera module M+1.

The processor 910 may identify, based on the value of the identification field in the data packet, a camera module to which the data packet belongs.

When the value of the identification field in the data packet received by the processor 910 is X–M–1, the data packet belongs to the camera module X. When the value of the identification field in the data packet received by the processor 910 is N–M–1, the data packet belongs to the camera module N.

For example, when the value of the identification field in the data packet received by the processor 910 is 2, the data packet belongs to the camera module 4.

The processor 910 unpacks the data packet into an encoded data block by using the CSI-2 protocol layer, and then the CSI-2 protocol layer transmits the encoded data block to an application layer. The application layer may be configured to decode the encoded data block to obtain pixel data. Then, the application layer performs operations such as pixel data compression, pixel data combination, and image compression on the pixel data. For example, when a user photographs a distant scene and presses a shooting button, the application layer integrates pixel data into a picture, and saves the picture to a gallery of the electronic device 100.

In some application scenarios, the electronic device 100 is configured with a plurality of camera modules, and the plurality of camera modules may include a plurality of front-facing camera modules and a plurality of rear-facing camera modules. The plurality of front-facing camera modules are connected in a cascade manner, the plurality of rear-facing camera modules are connected in a cascade manner, and the plurality of front-facing camera modules and the plurality of rear-facing camera modules are connected in parallel to the processor 910.

A plurality of camera modules used in the foregoing embodiment are connected to the processor 910 in series, and only one interface on the processor 910 side is required to be connected to the camera module. When the plurality of camera modules are enabled simultaneously, pixel data received by the interface at the same time increases, resulting in data congestion on the interface. To reduce excessive pixel data received by the interface at the same time, in the following embodiments of this application, the front-facing camera module and the rear-facing camera module are separated. The front-facing camera modules are connected to the processor 910 in a cascade manner, and the rear-facing camera modules are connected to the processor 910 in a cascade manner. In this way, data congestion caused by too much data at the interface of the processing side at the same time can be avoided. In addition, a data processing speed of the processor 910 may be improved.

Figure 21:
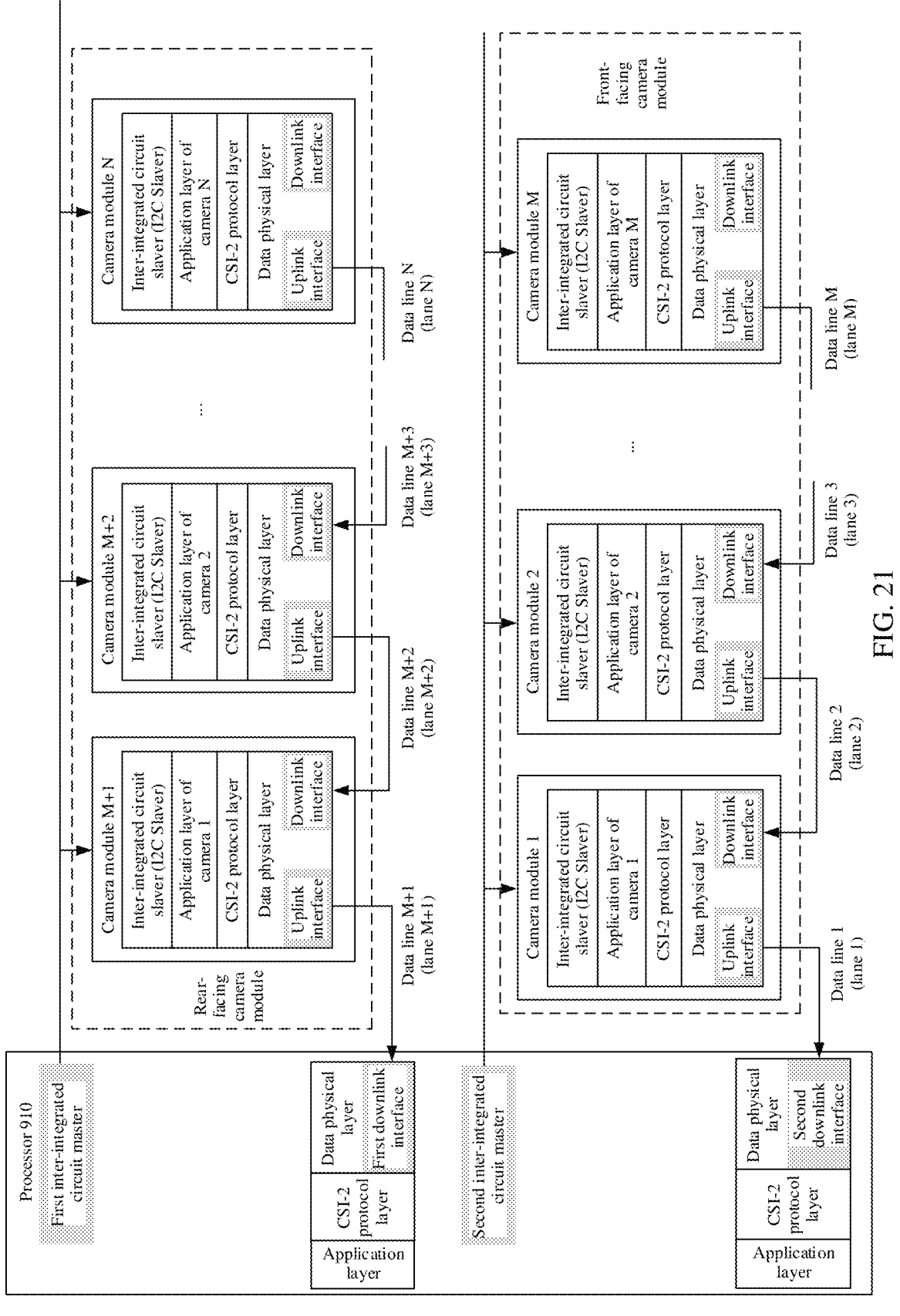
FIG. 21 is a system diagram of still another concatenation of camera modules according to an embodiment of this application.

FIG. 21 is a system diagram of another cascaded connection of camera modules.

As shown in FIG. 21, a system includes a rear-facing camera module, a front-facing camera module, and a processor 910.

The front-facing camera module includes a camera module 1, a camera module 2, . . . , and a camera module M. There are M camera modules in total. The front-facing camera module may also include more or fewer camera modules. This is not limited herein in this application.

The rear-facing camera module includes a camera module M+1, a camera module M+2, . . . , and a camera module N. There are N–M camera modules in total. The rear-facing camera module may also include more or fewer camera modules. This is not limited herein in this application.

For the description of structures of the rear-facing camera module, the front-facing camera module, and the processor 910, refer to the foregoing embodiments. Details are not described herein again in this application.

A first inter-integrated circuit master is deployed on the processor 910 side, and the first inter-integrated circuit master may be configured to control the N–M camera modules of the rear-facing camera module to be enabled or disabled.

A second inter-integrated circuit master is deployed on the processor 910 side, and the second inter-integrated circuit master may be configured to control the M camera modules of the front-facing camera module to be enabled or disabled.

In some embodiments, the front-facing camera module and the rear-facing camera module may also be controlled by a same inter-integrated circuit master, or may be controlled by different inter-integrated circuit masters. This is not limited herein.

As shown in FIG. 21, in the rear-facing camera module, a downlink interface of the camera module N is not connected, an uplink interface of the camera module N is connected to a downlink interface of the camera module N–1. By analogy, an uplink interface of the camera module M+2 is connected to a downlink interface of the camera module M+1. A downlink interface of the camera module M+1 is connected to a first downlink interface of the processor 910.

In the front-facing camera module, a downlink interface of the camera module M is not connected, an uplink interface of the camera module M is connected to a downlink interface of the camera module M–1. By analogy, an uplink interface of the camera module 2 is connected to a downlink interface of the camera module 1. An uplink interface of the camera module 1 is connected to a second downlink interface of the processor 910.

In this way, pixel data of the rear-facing camera module is transmitted to the processor 910 through the first downlink interface of the processing side, and pixel data of the front-facing camera module is transmitted to the processor 910 through the second downlink interface of the processing side. This avoids a case in which when there is only one interface on the processor 910 side, and when the front-facing camera module and the rear-facing camera module are enabled simultaneously, the interface needs to transmit an excessive amount of data at the same time, and data pressure on the interface is reduced.

Figure 22:
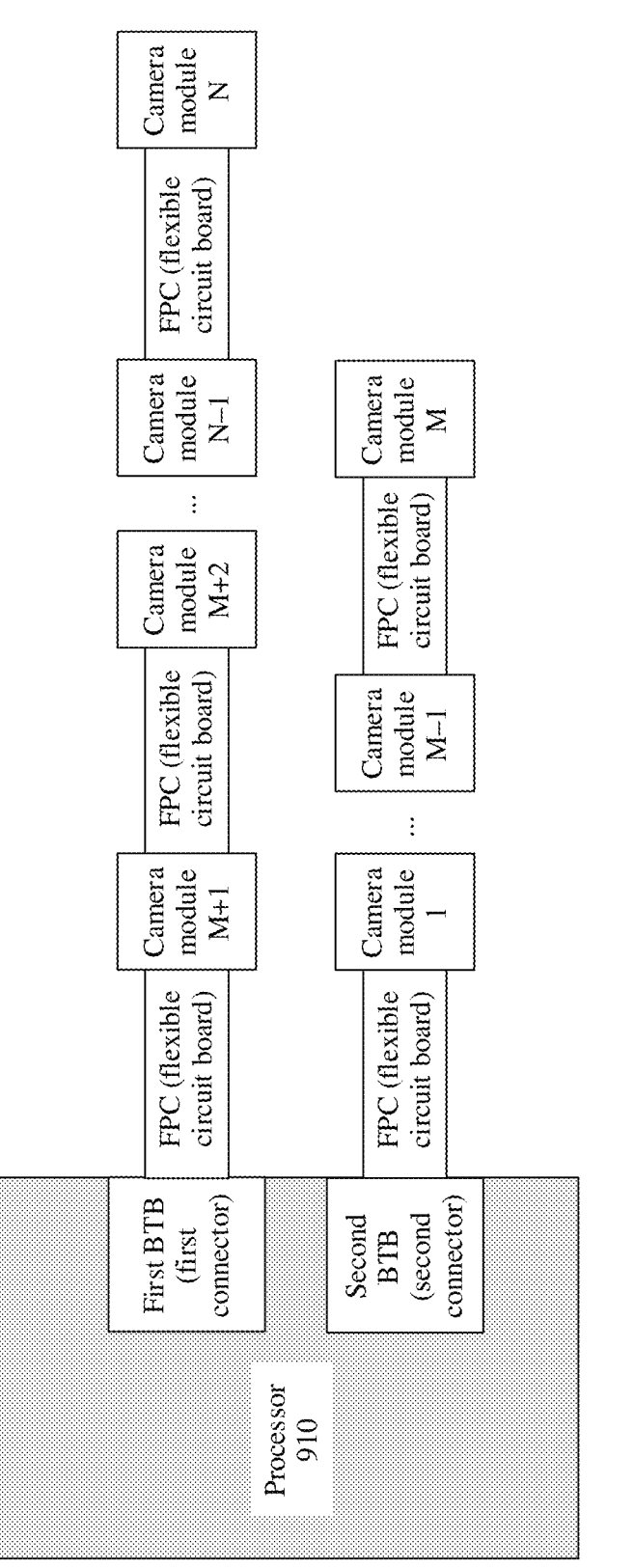
FIG. 22 is a schematic diagram of still another engineering structure of a plurality of cascaded camera modules connected in parallel to a processor 910 according to an embodiment of this application.

FIG. 22 is a schematic diagram of an engineering structure of a plurality of cascaded camera modules connected in parallel to a processor 910.

There are M front-facing camera modules, and the front-facing camera modules are connected to the processor 910. There are N–M rear-facing camera modules, and the rear-facing camera modules are connected to the processor.

In the front-facing camera module, a camera module M is connected to a camera module M–1 by using a flexible circuit board. By analogy, a camera module 1 is connected to a second connector of the processor 910 by using a flexible circuit board.

For the rear-facing camera module, a camera module N is connected to a camera module N–1 by using a flexible circuit board (Flexible circuit board, FPC). By analogy, a camera module M+2 is connected to a camera module M+1 by using a flexible circuit board, and the camera module M+1 is connected to a first connector of the processor 910 by using a flexible circuit board.

Figure 23A:
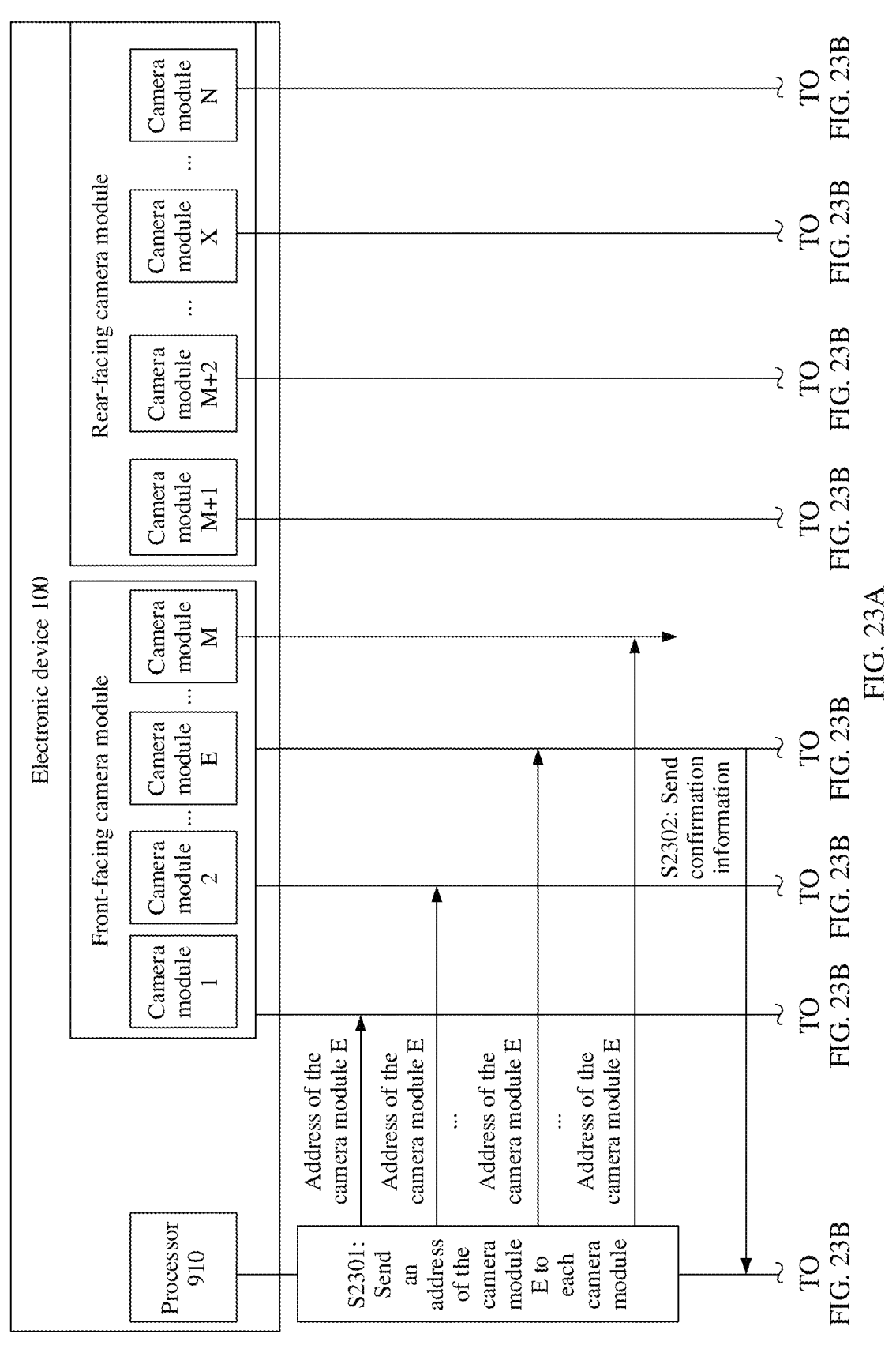
FIG. 23A to FIG. 23C are a flowchart of still another data transmission method according to an embodiment of this application.
Figure 23B:
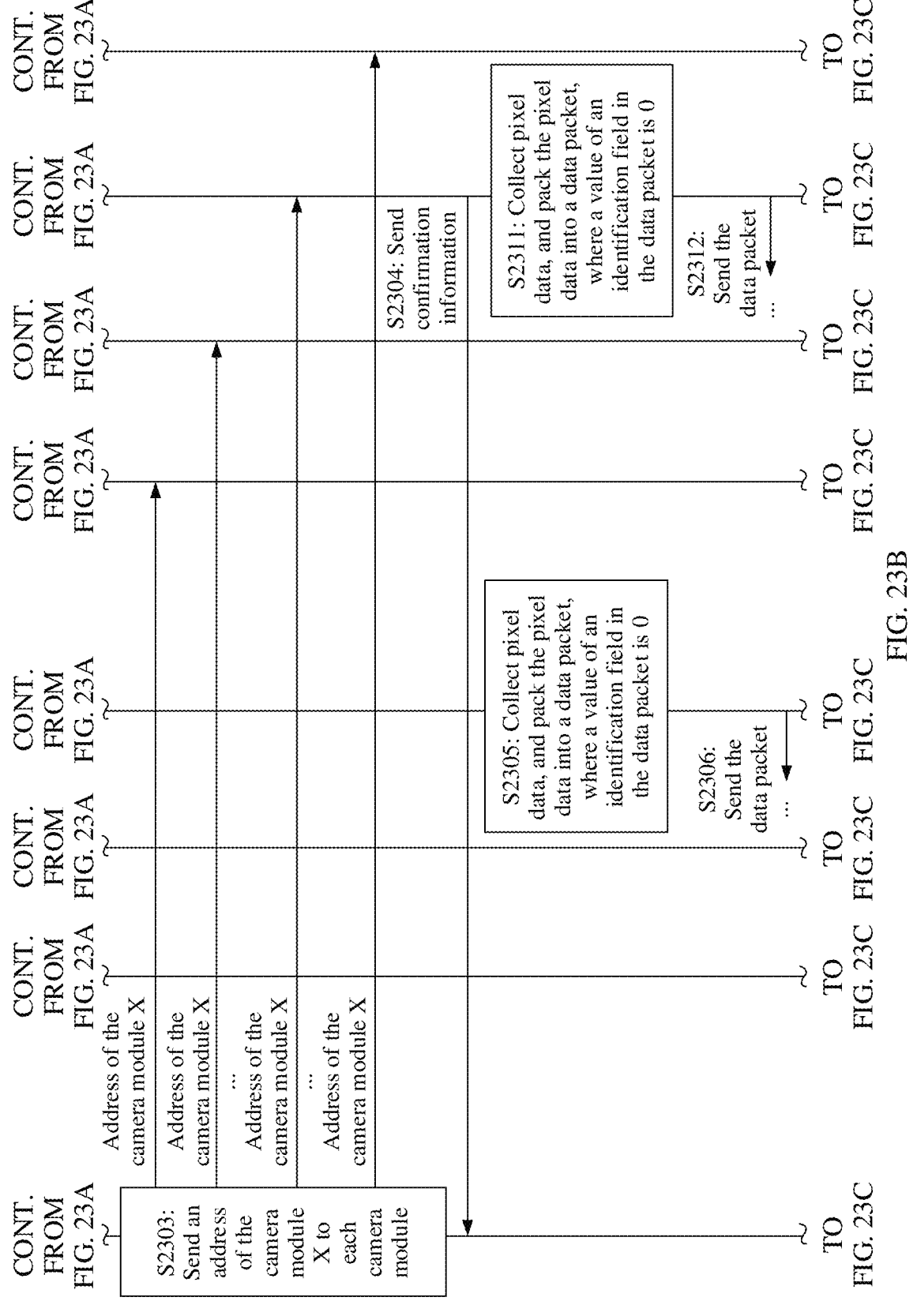
Figure 23C:
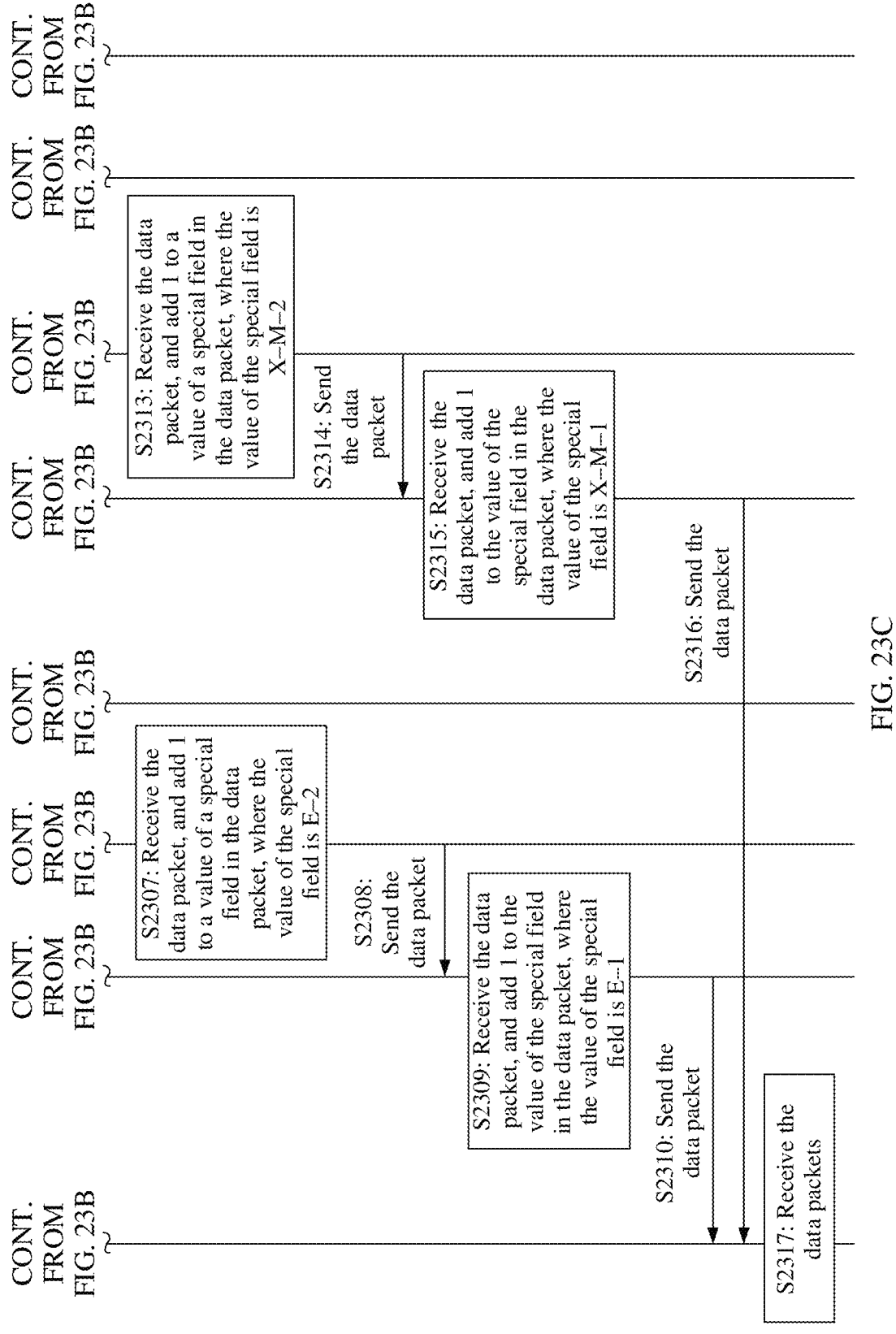

FIG. 23A to FIG. 23C are a flowchart of a data transmission method according to Embodiment 3 of this application.

An electronic device 100 is provided with a front-facing camera module and a rear-facing camera module. The front-facing camera module includes M camera modules such as a camera module 1, a camera module 2, . . . , a camera module E, . . . , and a camera module M. The rear-facing camera module includes N–M camera modules such as a camera module M+1, a camera module M+2, . . . , a camera module X, . . . , and a camera module N.

For example, when X is 4, M is 2, and N is 5, the front-facing camera module includes two camera modules, such as a camera module 1 and a camera module 2. The rear-facing camera module includes 3 camera modules, such as a camera module 3, a camera module 4, and a camera module 5.

The front-facing camera module is connected to a first downlink interface of the processor 910, and the rear-facing camera module is connected to a second downlink interface of the processor 910. Specifically, refer to the embodiment shown in FIG. 21. Details are not described herein again in this application.

When a user enables a primary camera (for example, the camera module X, where X is a positive integer greater than M and less than or equal to N) of the rear-facing camera module to photograph a distant scene, and enables a primary camera (for example, the camera module E, where E is a positive integer greater than or equal to 1 and less than or equal to M) of the front-facing camera module to record an image of user, the following describes a process in which pixel data collected by the camera module X and the camera module E is transmitted to the processor 910.

Because a data packet of the camera module X needs to be transmitted to the processor 910 by using CSI-2 protocol layers and data physical layers of the camera module M+1 to the camera module X–1, the CSI-2 protocol layers and the data physical layers of the camera module M+1 to the camera module X–1 need to be enabled, and none of application layers of the camera module M+1 to the camera module X–1 is enabled.

For example, when X is 4, M is 2, N is 5, and E is 2, after the camera module 4 is enabled and collects pixel data, a data packet of the camera module 4 needs to be transmitted to the processor 910 by using a CSI-2 protocol layer and a data physical layer of the camera module 3. Therefore, the CSI-2 protocol layer and the data physical layer of the camera module 3 need to be enabled, and an application layer of the camera module 3 is not enabled.

Because a data packet of the camera module E needs to be transmitted to the processor 910 by using CSI-2 protocol layers and data physical layers of the camera module 1 to the camera module E−1, the CSI-2 protocol layers and the data physical layers of the camera module 1 to the camera module E−1 need to be enabled, and none of application layers of the camera module 1 to the camera module E−1 is enabled.

For example, when X is 4, M is 2, N is 5, and E is 2, after the camera module 2 is enabled and collects pixel data, a data packet of the camera module 2 needs to be transmitted to the processor 910 by using a CSI-2 protocol layer and a data physical layer of the camera module 1. Therefore, the CSI-2 protocol layer and the data physical layer of the camera module 1 need to be enabled, and an application layer of the camera module 1 is not enabled.

S2301: The processor 910 sends an address of the camera module E to each camera module of the front-facing camera module.

Because a data packet of the camera module E needs to be transmitted to the processor 910 by using the CSI-2 protocol layers and the data physical layers of the camera module 1 to the camera module E−1, the CSI-2 protocol layers and the data physical layers of the camera module 1 to the camera module E−1 need to be enabled, and none of application layers of the camera module 1 to the camera module E−1 is enabled. None of CSI-2 protocol layers, data physical layers, and application layers of the camera module X+1 to the camera module N is enabled.

For example, when the user requests to enable the camera module 2 in the rear-facing camera module, the processor 910 first obtains an address of the camera module 2, and sends the address of the camera module 2 to two camera modules: the camera module 1 and the camera module 2.

The electronic device 100 stores an address of each camera module, and the electronic device 100 may control a camera module to be enabled or disabled based on the address of the camera module.

When the user requests to enable the primary camera (for example, the camera module E) of the front-facing camera module, the processor 910 of the electronic device 100 first obtains the address of the camera module E, and sends the addresses of the camera module E to the camera module 1 to the camera module M.

S2302: The camera module E sends confirmation information to the processor 910.

After the M camera modules receive the address of the camera module E, each camera module matches the received address of the camera module E with an address of the camera module. If the address of the camera module E does not match the address of the camera module, the camera module does not make any response. If the address of the camera module E matches the address of the camera module, the camera module E sends the confirmation information to the processor 910.

The processor 910 receives and responds to the confirmation information sent by the camera module E, and the processor 910 controls the camera module E to be enabled. When the camera module E is enabled, an application layer, a CSI-2 protocol layer, and a data physical layer of the camera module E are all enabled.

For example, after the two camera modules from the camera module 1 to the camera module 2 receive the address of the camera module 2, the two camera modules from the camera module 1 to the camera module 2 match the received address of the camera module 2 with an address of each camera module. If the address of the camera module 2 does not match the address of each camera module, the camera module does not make any response. If the address of the camera module 2 matches the address of each camera module, the camera module 2 sends the confirmation information to the processor 910.

The processor 910 receives and responds to the confirmation information sent by the camera module 2, and the processor 910 controls the camera module 2 to be enabled. When the camera module 2 is enabled, an application layer, a CSI-2 protocol layer, and a data physical layer of the camera module 24 are all enabled.

S2303: The processor 910 sends an address of the camera module X to each camera module of the rear-facing camera module.

Because a data packet of the camera module X needs to be transmitted to the processor 910 by using CSI-2 protocol layers and data physical layers of the camera module M+1 to the camera module X−1, the CSI-2 protocol layers and the data physical layers of the camera module M+1 to the camera module X−1 need to be enabled, and none of application layers of the camera module M+1 to the camera module X−1 is enabled. None of CSI-2 protocol layers, data physical layers, and application layers of the camera module X+1 to the camera module N is enabled.

The electronic device 100 stores an address of each camera module, and the electronic device 100 may control a camera module to be enabled or disabled based on the address of the camera module.

When the user requests to enable the primary camera (for example, the camera module X) in the rear-facing camera module, the processor 910 of the electronic device 100 first obtains the address of the camera module X, and sends the address of the camera module X to the camera module M+1 to the camera module N.

For example, when the user requests to enable the camera module 4 in the rear-facing camera module, the processor 910 first obtains an address of the camera module 4, and sends the address of the camera module 4 to three camera modules: the camera module 3, the camera module 4, and the camera module 5.

S2304: The camera module X sends confirmation information to the processor 910.

After the N−M camera modules receive the address of the camera module X, each camera module matches the received address of the camera module X with an address of the camera module. If the address of the camera module X does not match the address of the camera module, the camera module does not make any response. If the address of the camera module X matches the address of the camera modules, the camera module X sends the confirmation information to the processor 910.

The processor 910 receives and responds to the confirmation information sent by the camera module X, and the processor 910 controls the camera module X to be enabled. When the camera module X is enabled, an application layer, a CSI-2 protocol layer, and a data physical layer of the camera module X are all enabled.

For example, after the three camera modules, the camera module 3, the camera module 4, and the camera module 5, receive the address of the camera module 4, the camera module 3, the camera module 4, and the camera module 5 match the received address of the camera module 4 with an address of each camera module. If the address of the camera module 4 does not match the address of each camera module, the camera module does not make any response. If the address of the camera module 4 matches the address of each camera module, the camera module 4 sends the confirmation information to the processor 910.

The processor 910 receives and responds to the confirmation information sent by the camera module 4, and the processor 910 controls the camera module 4 to be enabled. When the camera module 4 is enabled, an application layer, a CSI-2 protocol layer, and a data physical layer of the camera module 24 are all enabled.

S2301 and S2302 and 2303 and S2304 may be performed synchronously. This is not limited in this application.

S2305: The camera module E starts to collect pixel data, and packs the pixel data into a data packet, where a value of an identification field in the data packet is 0.

For example, the camera module 2 starts to collect pixel data, packs the pixel data into a data packet, and sets a value of an identification field in the data packet to 0.

S2306: The camera module E sends the data packet to the camera module E−1.

The camera module E−1 receives the data packet of the camera module E sent by the camera module E, and first unpacks the data packet of the camera module E into a data block. The camera module E−1 detects the identification field of the camera module E, and adds 1 to the value of the identification field in the data packet of the camera module E. In this case, the value of the identification field in the data packet of the camera module X is 2, and the camera module E−1 packs the data block of the camera module E into a data packet.

By analogy, each camera module transmits the data packet of the camera module E to a next-level camera module, and each level of camera module adds 1 to the value of the identification field in the received data packet.

S2307: The camera module 2 receives a data packet, and adds 1 to the value of the identification field in the data packet, where the value of the identification field is E−2.

S2008: The camera module 2 sends the data packet to the camera module 1.

S2009: The camera module 1 receives the data packet, and adds 1 to the value of the identification field in the data packet, where the value of the identification field is E−1.

For example, the camera module 1 receives the data packet of the camera module 2 sent by the camera module 2, and first unpacks the data packet of the camera module 2 into a data block. The camera module 1 detects the identification field of the camera module 2, and adds 1 to the value of the identification field in the data packet of the camera module 2. In this case, the value of the identification field in the data packet of the camera module 2 is 1. Then, the camera module 1 packs the data block into a data packet.

S2010: The camera module 1 sends the data packet to the processor 910.

S2311: The camera module X starts to collect pixel data, and packs the pixel data into a data packet, where a value of an identification field is 0.

For example, the camera module 4 starts to collect pixel data, packs the pixel data into a data packet, and sets a value of an identification field in the data packet to 0.

S2312: The camera module X sends the data packet to the camera module X−1.

The camera module X−1 receives the data packet of the camera module X sent by the camera module X, and first unpacks the data packet of the camera module X into a data block. The camera module X−1 detects the identification field of the camera module X, and adds 1 to the value of the identification field of the camera module X. In this case, the value of the identification field of the camera module X is 2, and the camera module X−1 packs the data packet of the camera module X into a data packet.

By analogy, each camera module transmits the data packet of the camera module X to a next-level camera module, and each level of camera module adds 1 to the value of the identification field in the received data packet. S2313: The camera module M+2 receives a data packet, and adds 1 to the value of the identification field in the data packet, where the value of the identification field is X−M−2.

S2314: The camera module M+2 sends the data packet to the camera module M+1.

S2315: The camera module M+1 receives the data packet, and adds 1 to the value of the identification field in the data packet, where the value of the identification field is X−M−1.

For example, when N is 5, X is 4, and M is 2, the camera module 3 receives the data packet of the camera module 4 sent by the camera module 4, and first unpacks the data packet of the camera module 4 into a data block. The camera module 3 detects the identification field of the camera module 4, and adds 1 to the value of the identification field in the data packet of the camera module 4. In this case, the value of the identification field in the data packet of the camera module 3 is 1. Then, the camera module 3 packs the data block into a data packet.

S2316: The camera module M+1 sends the data packet to the processor 910.

S2317: The processor 910 receives the data packets of the camera module E and the camera module X.

The processor 910 receives, through the first downlink interface, the data packet that is of the camera module X and that is sent by the camera module M+1.

The processor 910 receives, through the second downlink interface, the data packet that is of the camera module E and that is sent by the camera module 1.

The processor 910 may identify, based on the value of the identification field in the data packet, a camera module to which the data packet belongs.

For example, the processor 910 first determines that the data packet received by the first downlink interface is from data collected by the rear-facing camera module. When the value of the identification field in the data packet is X−M−1, the processor 910 identifies that the data packet belongs to the camera module X in the rear-facing camera module.

The processor 910 first determines that the data packet received by the second downlink interface is from data collected by the front-facing camera module. When the value of the identification field in the data packet is E−1, the processor 910 identifies that the data packet belongs to the camera module E in the front-facing camera module.

After the processor 910 receives the data packets of the camera module E and the camera module X, a CSI-2 protocol layer unpacks the data packets of the camera module E and the camera module X into encoded data blocks, and then transmits the encoded data blocks to an application layer. The application layer may be configured to decode the encoded data blocks to obtain pixel data. Then, the application layer performs operations such as pixel data compression, pixel data combination, and image compression on the pixel data. For example, the pixel data of the camera module E is integrated into a picture and the pixel data of the camera module X is integrated into a picture, and the picture taken by the camera module E and the picture taken by the camera module X are stored in a gallery of the electronic device 100.

S2305 to S2310 and S2311 to S2316 may be performed synchronously. This is not limited in this application.

Based on the foregoing embodiments shown in FIG. 21 to FIG. 23C, the following describes an application scenario in embodiments of this application.

Figure 24A:
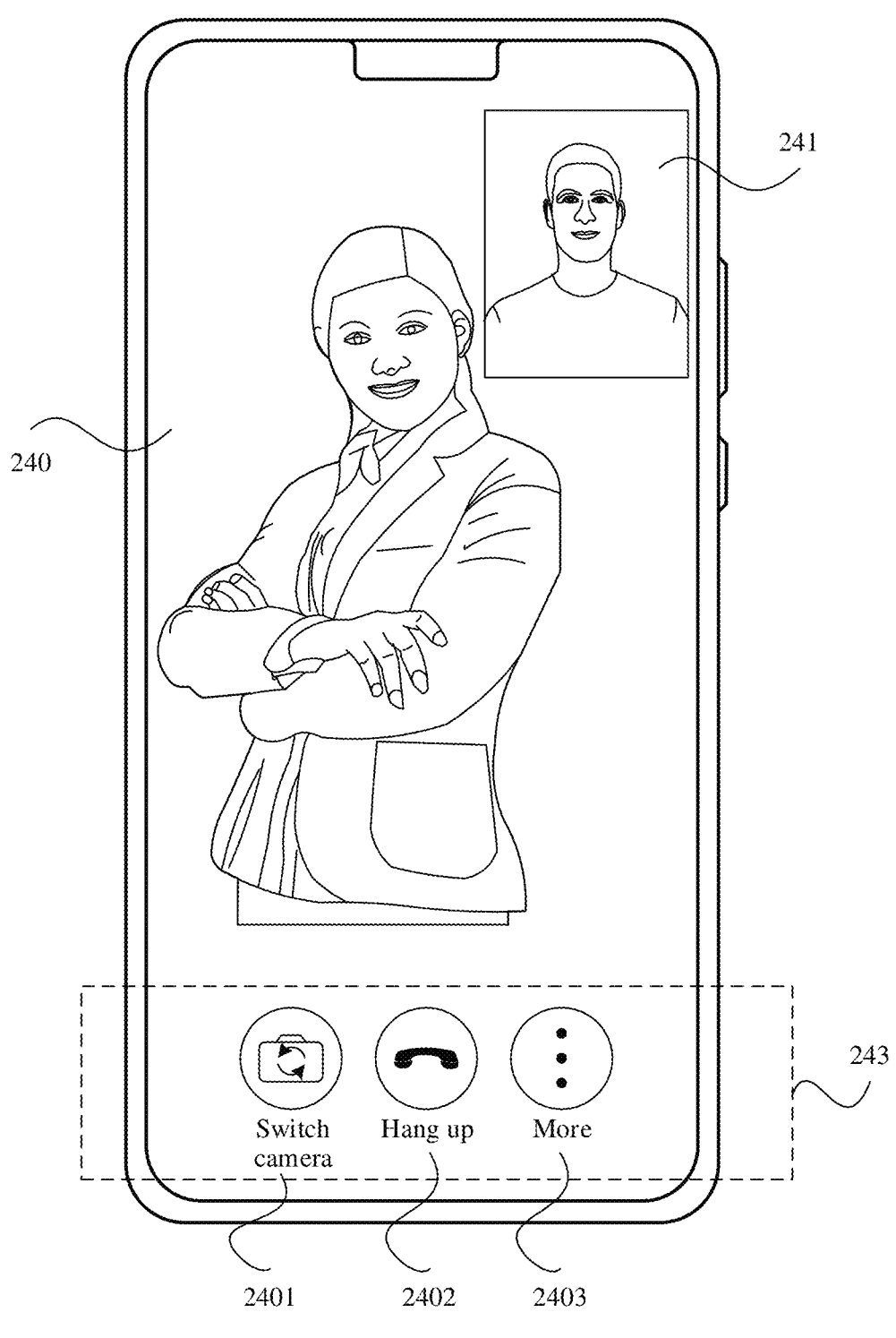
FIG. 24A to FIG. 24C are a group of UI diagrams according to an embodiment of this application.
Figure 24B:
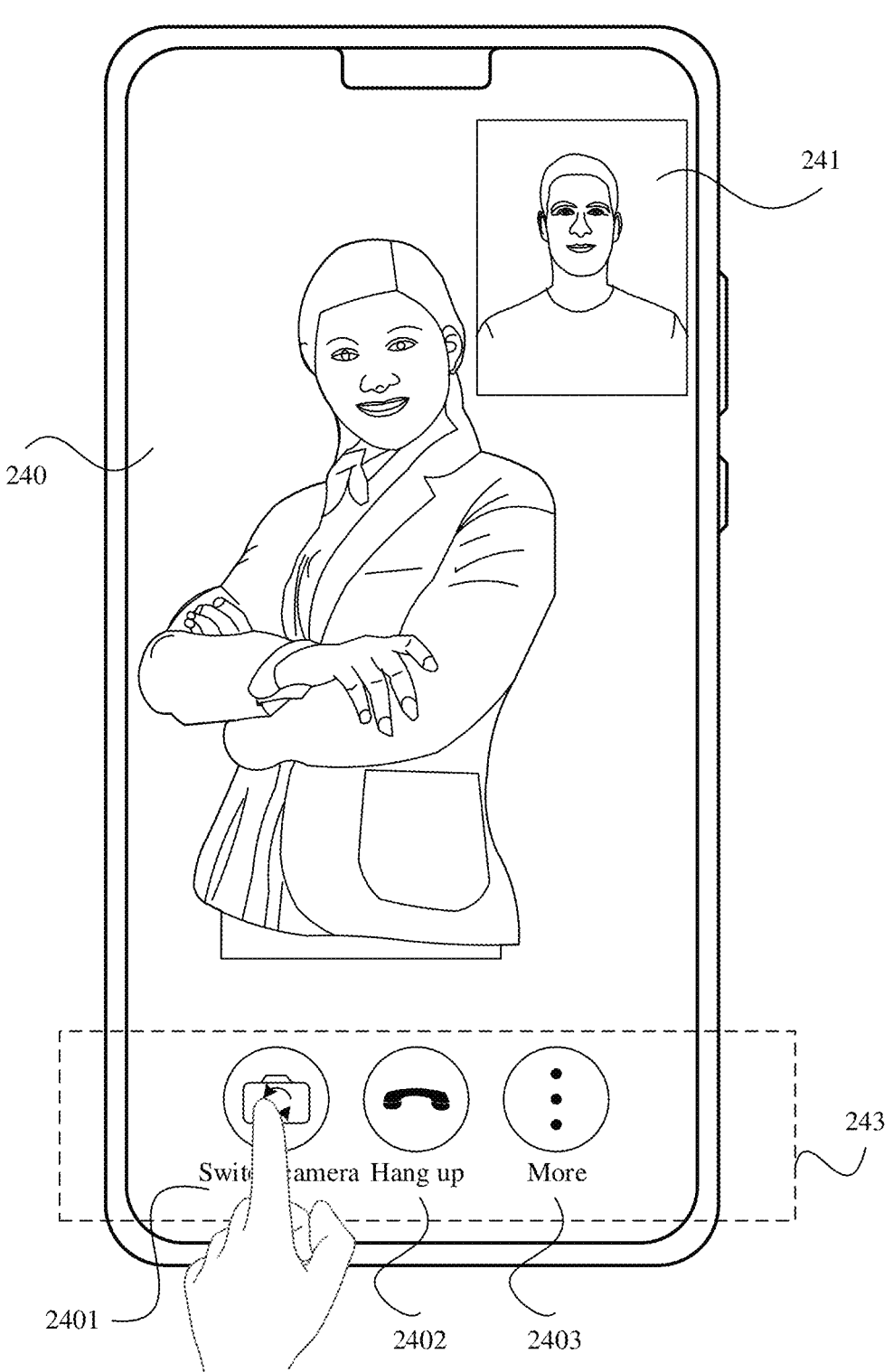
Figure 24C:
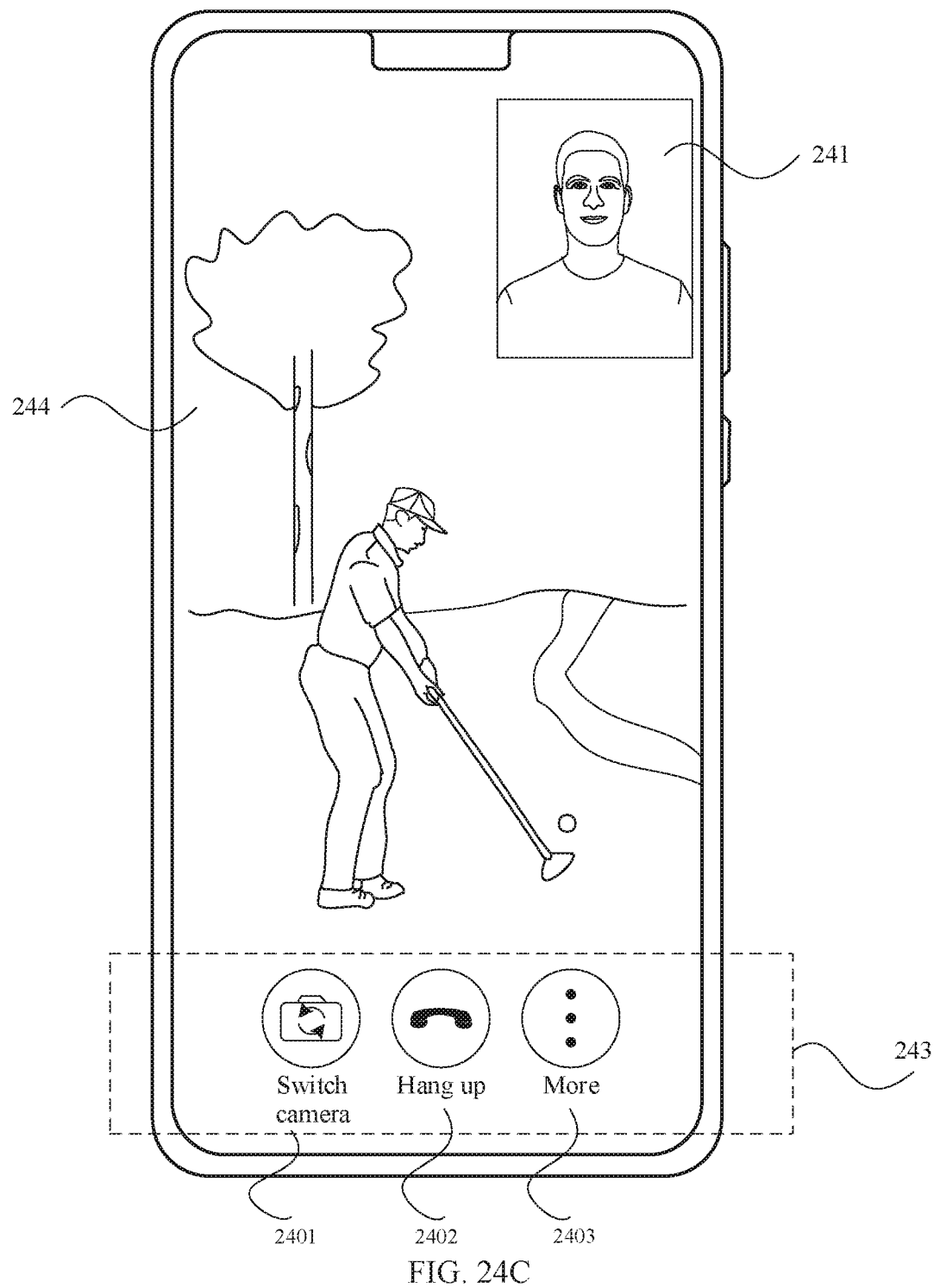

FIG. 24A to FIG. 24C are an example of UI diagrams of switching between a front-facing camera interface and a rear-facing camera interface in a current video call application scenario.

FIG. 24A shows an example of a video call application interface. The video call application interface includes a video interface 240, a video interface 241, and an operation control option 243. The video interface 240 is a user image collected by a front-facing camera module of an electronic device 100. The video interface 241 is a user image collected by another electronic device that performs a video call with the electronic device 100. The user image may be a user image collected by a front-facing camera module of the another electronic device, or may be a user image collected by a rear-facing camera module of the another electronic device. The operation control option 243 includes a camera switching control 2401, a hang-up control 2402, and a more control 2403.

As shown in FIG. 24B, when the user wants to switch a current video image to an image shot by the rear-facing camera module, the camera switching control 2401 may receive a click operation of the user, and respond to the operation of the user clicking the camera switching control 2401. As shown in FIG. 24C, the electronic device 100 displays a video image 244 shot by the rear-facing camera module.

In some embodiments, when the user has a video call with a friend, the electronic device 100 may simultaneously enable the front-facing camera module and the rear-facing camera module to collect and display images.

Figure 25A:
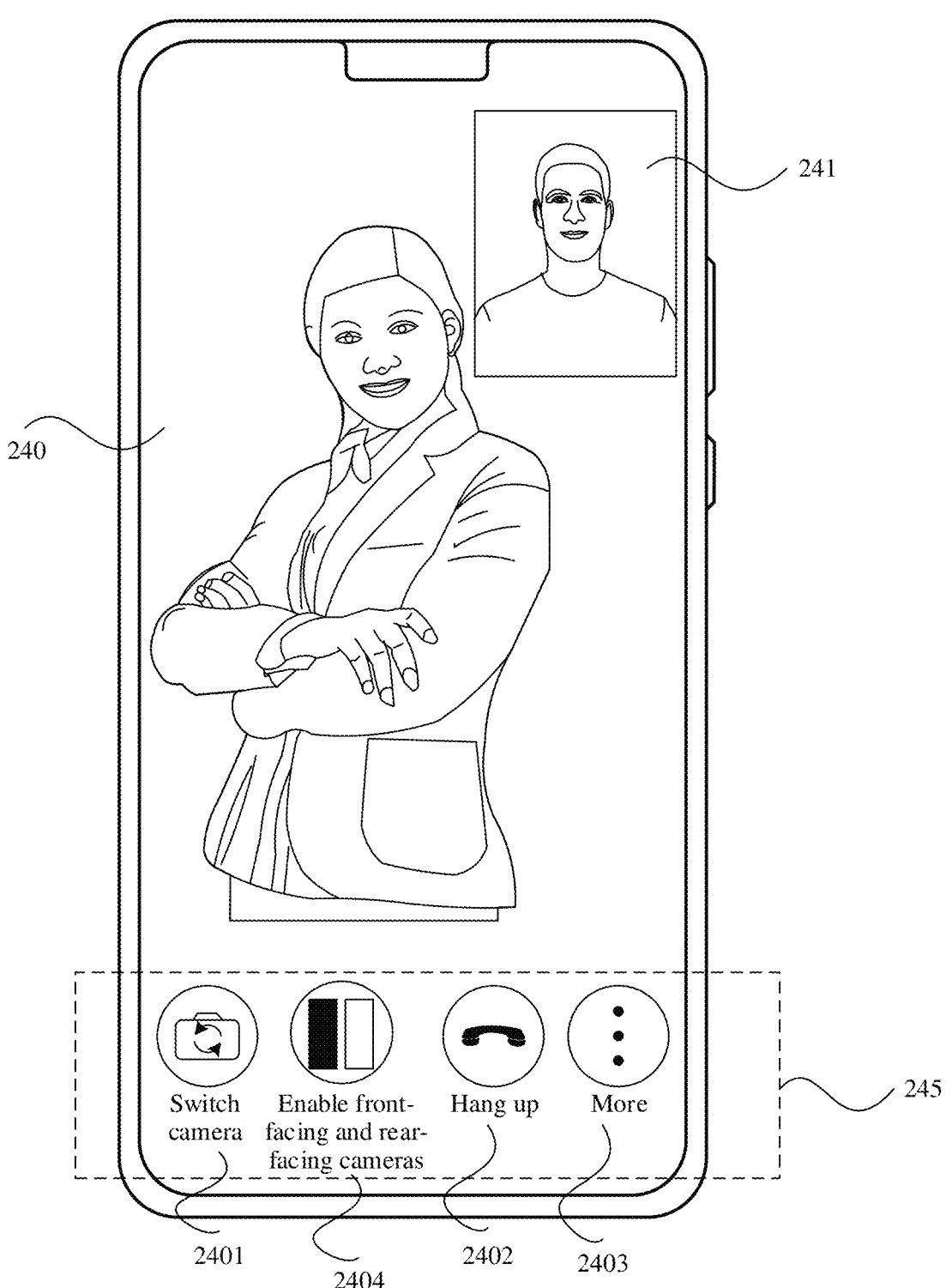
FIG. 25A to FIG. 25C are another group of UI diagrams according to an embodiment of this application.
Figure 25B:
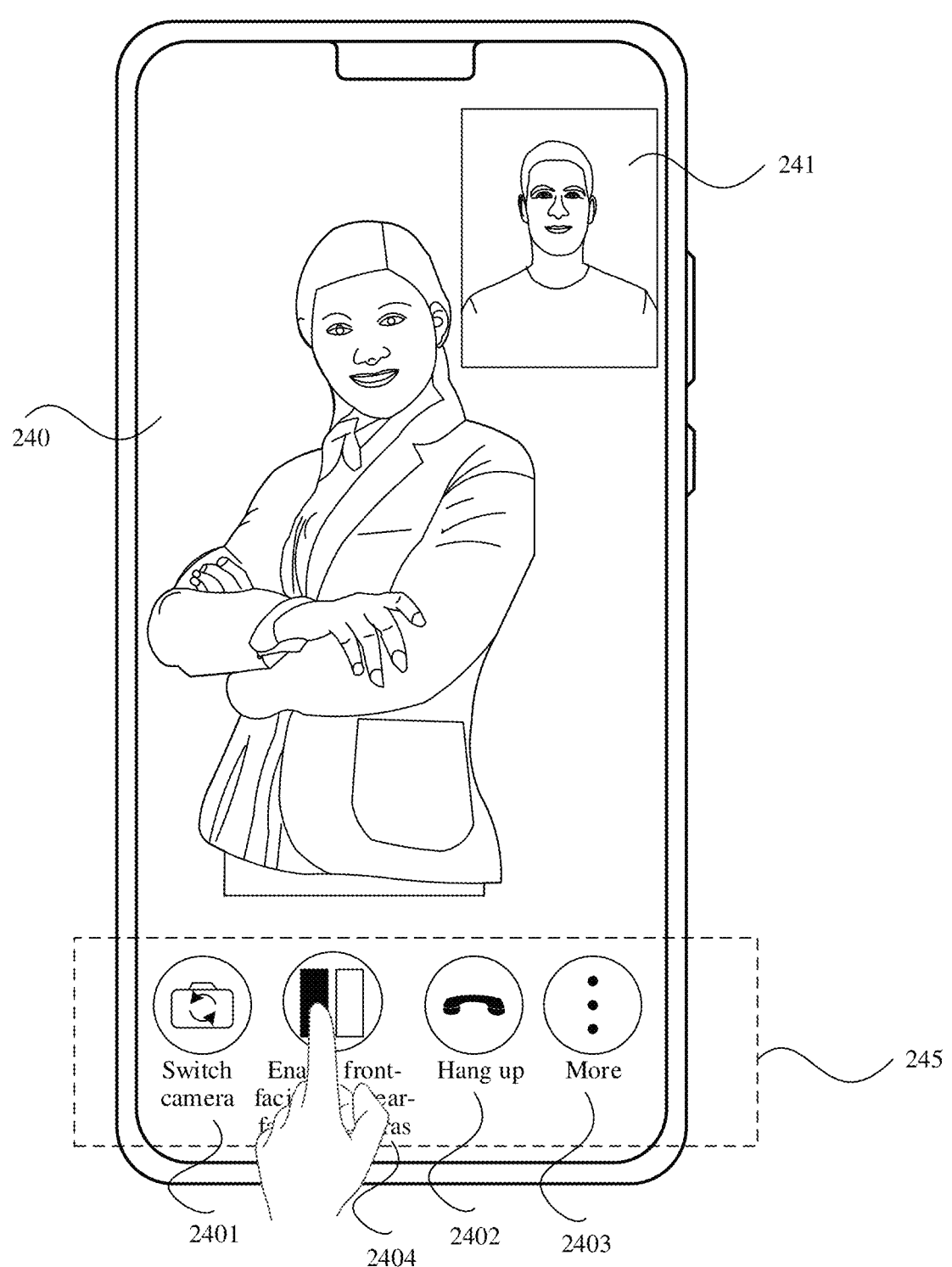
Figure 25C:
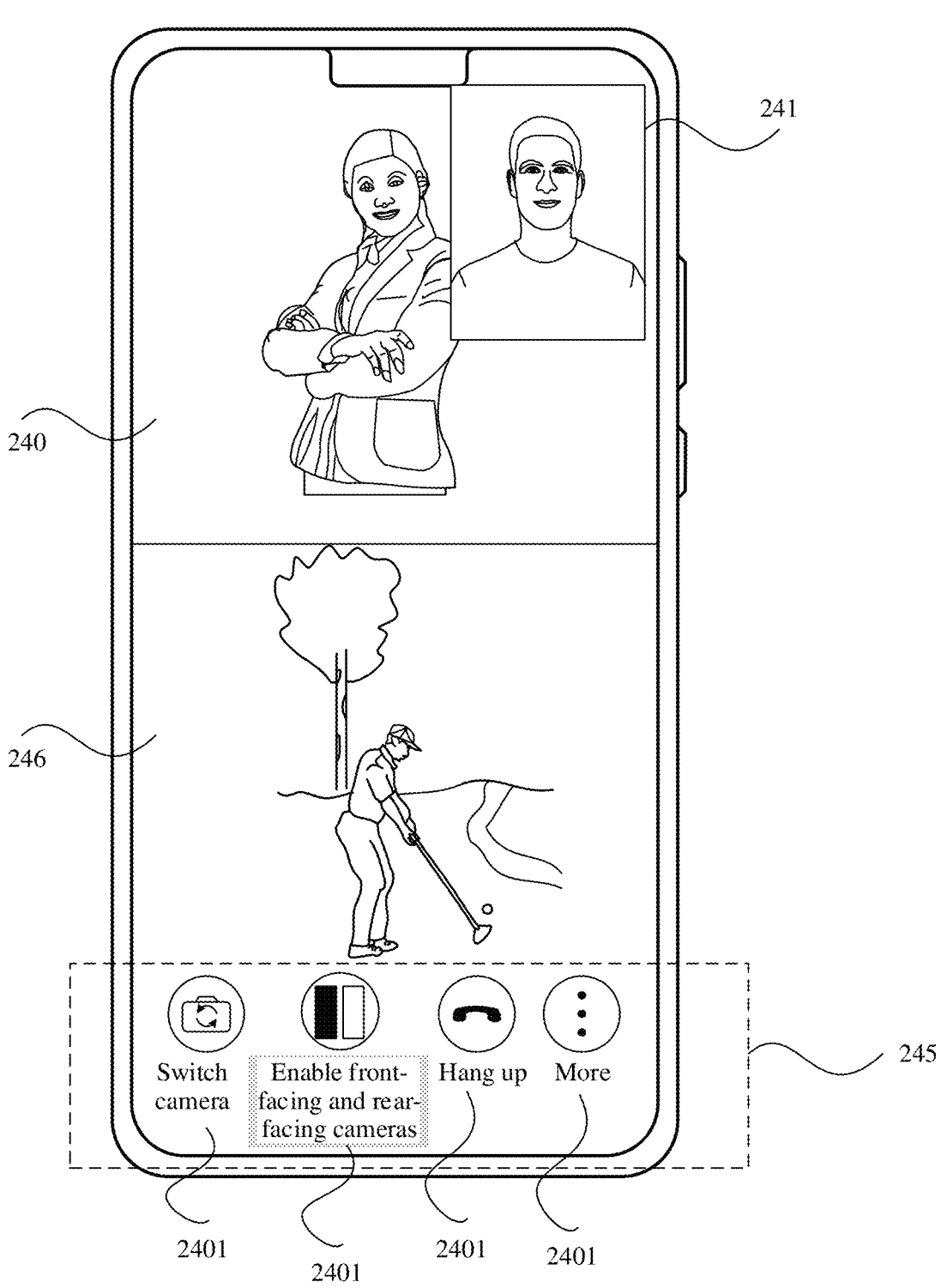

FIG. 25A to FIG. 25C are an example of UI diagrams when the electronic device 100 simultaneously enables the front-facing camera module and the rear-facing camera module to collect and display images.

FIG. 25A shows an example of a video call application interface. The video call application interface includes a video interface 240, a video interface 241, and an operation control option 244. The video interface 240 is a user image collected by a front-facing camera module of an electronic device 100. The video interface 241 is a user image collected by another electronic device that performs a video call with the electronic device 100. The user image may be a user image collected by a front-facing camera module of the another electronic device, or may be a user image collected by a rear-facing camera module of the another electronic device. The operation control option 245 includes a camera switching control 2401, a hang-up control 2402, a more control 2403, and a control 2404. The control 2404 may receive a click operation of the user. In response to the click operation of the user, the front-facing camera module and the rear-facing camera module of the electronic device 100 are enabled simultaneously to collect images.

As shown in FIG. 25B, when the user wants to simultaneously enable the front-facing camera module and the rear-facing camera module of the electronic device 100 to collect images, the control 2404 may receive a click operation of the user. In response to the click operation of the user, the electronic device 100 displays a user interface shown in FIG. 25C.

The user interface includes a video interface 240, a video interface 241, a video interface 246, and an operation control option 244. For the video interface 240, the video interface 241, and the operation control option 244, refer to the foregoing embodiment. Details are not described herein again. The video interface 246 is an image collected by the rear-facing camera module of the electronic device 100.

In this way, the user may simultaneously enable the front-facing camera module and the rear-facing camera module to collect and display images. The images collected by the front-facing camera module and the rear-facing camera module are sent to the friend who has a video call with the user. This resolves a problem that in some application scenarios, the electronic device 100 can only enable the front-facing camera module to collect and display an image, or can only enable the rear-facing camera module to collect and display an image, so that user experience is improved.

Certainly, the application scenario is also applicable to the embodiments shown in FIG. 11 to FIG. 17B, and this is not limited herein.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in embodiments may be implemented by a computer program instructing related hardware. The program may be stored in a computer-readable storage medium. When the program is run, the procedures of the methods in embodiments are performed. The foregoing storage medium includes any medium that can store program code, such as a ROM, a random access memory RAM, a magnetic disk, or an optical disc.

What is claimed is:

1. A method, comprises:

after receiving a first instruction sent by a processor, receiving, by a first camera module, a first data packet sent by a second camera module, wherein the first data packet comprises a first identification field, a value of the first identification field in the first data packet indicates a quantity of forwarding times of the first data packet, and the first data packet is received through a first downlink interface of a first physical layer of the first camera module;

identifying, by the first camera module, that the value of the first identification field in the first data packet is a first value, and modifying the first value to a second value to obtain a modified first data packet, wherein a difference between the second value and the first value is a preset value; and sending, by the first camera module, the modified first data packet to the processor through a first uplink interface of the first physical layer of the first camera module.

2. The method according to claim 1, wherein layers of the first camera module comprise a first application layer, a first protocol layer, and the first physical layer; and wherein modifying, by the first camera module, the value of the first identification field in the first data packet from the first value to the second value to obtain the modified first data packet comprises:

modifying, by the first camera module, the value of the first identification field in the first data packet from the first value to the second value by using the first protocol layer, to obtain the modified first data packet.

3. The method according to claim 1, further comprising:

collecting, by the first camera module, first data, and generating a second data packet based on the first data, wherein the second data packet comprises a second identification field, and a value of the second identification field in the second data packet is a third value; and sending, by the first camera module, the second data packet to the processor.

4. The method according to claim 3, wherein layers of the first camera module comprise a first application layer, a first protocol layer, and the first physical layer;

wherein after collecting, by the first camera module, the first data, and before generating the second data packet based on the first data, the method further comprises:

encoding, by the first camera module, the first data using the first application layer;

wherein generating, by the first camera module, the second data packet based on the first data comprises:

generating, by the first camera module, the second data packet based on encoded first data by using the first protocol layer; and wherein sending, by the first camera module, the second data packet to the processor comprises:

sending, by the first camera module, the second data packet to the processor through the first uplink interface.

5. The method according to claim 1, wherein the first data packet comprises a packet header, a data packet, and a packet footer; and wherein the first identification field in the first data packet is located in the packet header of the first data packet.

6. The method according to claim 1, wherein receiving, by the first camera module, the first instruction sent by the processor comprises:

receiving, by the first camera module through a first control interface, the first instruction sent by the processor.

54

7. An electronic device, comprising:
a processor;
a first camera module; and
a second camera module;
wherein the first camera module is configured to:
after receiving a first instruction sent by the processor, receive a first data packet sent by the second camera module, wherein the first data packet comprises a first identification field, a value of the first identification field in the first data packet indicates a quantity of forwarding times of the first data packet, and the first data packet is received through a first downlink interface of a first physical layer of the first camera module; and identify that the value of the first identification field in the first data packet is a first value, and modify the first value to a second value to obtain a modified first data packet, wherein a difference between the second value and the first value is a preset value; and send the modified first data packet to the processor through a first uplink interface of the first physical layer of the first camera module.

8. The electronic device according to claim 7, wherein layers of the first camera module comprise a first application layer, a first protocol layer, and the first physical layer; and wherein the first camera module is configured to:
receive, through the first downlink interface, the first data packet sent by the second camera module; and modify the value of the first identification field in the first data packet from the first value to the second value by using the first protocol layer to obtain the first modified data packet.

9. The electronic device according to claim 7, wherein the first camera module is further configured to:
collect first data, and generate a second data packet based on the first data, wherein the second data packet comprises a second identification field, and a value of the second identification field in the second data packet is a third value; and send the second data packet to the processor.

10. The electronic device according to claim 9, wherein layers of the first camera module comprise a first application layer, a first protocol layer, and the first physical layer and the first uplink interface is connected to a first receive port of the processor; and wherein the first camera module is further configured to:
encode the first data by using the first application layer;
generate the second data packet based on encoded first data by using the first protocol layer, wherein the second data packet comprises the second identification field, and the value of the second identification field in the second data packet is the third value; and send the second data packet to the processor through the first uplink interface.

11. The electronic device according to claim 7, further comprising a third camera module, configured to:
collect second data, and generate a third data packet based on the second data, wherein the third data packet comprises a third identification field, and a value of the third identification field in the third data packet is a third value; and send the third data packet to the processor.

12. The electronic device according to claim 11, wherein layers of the third camera module comprise a second application layer, a second protocol layer, and a second physical layer, the second physical layer comprises a second uplink interface and a second downlink interface, and the second uplink interface is connected to a second receive port of the processor; and wherein the third camera module is further configured to:

encode the second data by using the second application layer;

generate the third data packet based on encoded second data by using the second protocol layer, wherein the third data packet comprises the third identification field, and the value of the third identification field in the third data packet is the third value; and send the third data packet to the processor through the second uplink interface.

13. The electronic device according to claim 12, wherein layers of the first camera module comprise a first application layer, a first protocol layer, and the first physical layer, the first uplink interface is connected to a first receive port of the processor, and the first receive port is different from the second receive port.

14. The electronic device according to claim 12, further comprising a fourth camera module, configured to:

collect third data, and generate a fourth data packet based on the third data, wherein the fourth data packet comprises a fourth identification field, and a value of the fourth identification field in the fourth data packet is the third value; and send the fourth data packet to the third camera module; and wherein the third camera module is further configured to:

receive the fourth data packet sent by the fourth camera module; and identify that the value of the fourth identification field in the fourth data packet is the third value, and modify the value of the fourth identification field in the fourth data packet to a fourth value, wherein a difference between the fourth value and the third value is the preset value.

15. The electronic device according to claim 14, wherein layers of the fourth camera module comprise a third application layer, a third protocol layer, and a third physical layer, the third physical layer comprises a third uplink interface and a third downlink interface, and the third uplink interface is connected to the second downlink interface;

wherein the fourth camera module is configured to:

encode the third data by using the third application layer;

generate the fourth data packet based on encoded third data by using the third protocol layer, wherein the fourth data packet comprises the fourth identification field, and the value of the fourth identification field in the fourth data packet is the third value; and send the fourth data packet to the third camera module through the third uplink interface; and wherein the third camera module is further configured to:

receive, through the second downlink interface, the fourth data packet sent through the third uplink interface;

identify, by using the second protocol layer, that the value of the fourth identification field in the fourth data packet is the third value, and modify the third value to the fourth value to obtain a modified fourth data packet, wherein the difference between the third value and the fourth value is the preset value; and send the modified fourth data packet to the processor through the second uplink interface.

16. The electronic device according to claim 7, wherein the first data packet comprises a packet header, a data packet, and a packet footer; and wherein the first identification field in the first data packet is located in the packet header of the first data packet.

17. The electronic device according to claim 7, wherein the first camera module is further configured to receive, through a first control interface, the first instruction sent by the processor.

18. A non-transitory computer-readable storage medium, comprising instructions, wherein when the instructions are run on a camera module, the camera module is enabled to act as a first camera module and to perform:

after receiving a first instruction sent by a processor, receiving a first data packet sent by a second camera module, wherein the first data packet comprises a first identification field, a value of the first identification field in the first data packet indicates a quantity of forwarding times of the first data packet, and the first data packet is received through a first downlink interface of a first physical layer of the camera module;

identifying that the value of the first identification field in the first data packet is a first value, and modifying the first value to a second value to obtain a modified first data packet, wherein a difference between the second value and the first value is a preset value; and sending the modified first data packet to the processor through a first uplink interface of the first physical layer of the camera module.

19. The non-transitory computer-readable storage medium according to claim 18, wherein when the instructions are run on the camera module, the camera module is enabled to act as the first camera module and to perform:

receiving, through the first downlink interface, the first data packet sent by the second camera module;

modifying the value of the first identification field in the first data packet from the first value to the second value by using a first protocol layer to obtain the modified first data packet; and sending the modified first data packet to the processor through the first uplink interface.

20. The non-transitory computer-readable storage medium according to claim 18, wherein when the instructions are run on the camera module, the camera module is enabled to act as the first camera module and to perform:

collecting first data, and generating a second data packet based on the first data, wherein the second data packet comprises a second identification field, and a value of the second identification field in the second data packet is a third value; and sending the second data packet to the processor.

* * * * *